(12) United States Patent
Sahashi et al.

(10) Patent No.: US 6,780,114 B2
(45) Date of Patent: Aug. 24, 2004

(54) DRIVE WHEEL BEARING ASSEMBLY

(75) Inventors: Koji Sahashi, Iwata (JP); Kazuhiko Hozumi, Iwata (JP); Keisuke Sone, Iwata (JP); Masahiro Ozawa, Iwata (JP); Akira Torii, Iwata (JP); Hiroyuki Ogura, Iwata (JP); Mitsuru Umekida, Iwata (JP); Shigeaki Fukushima, Iwata (JP); Eiji Tajima, Iwata (JP); Hisashi Ohtsuki, Iwata (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 09/735,664

(22) Filed: Dec. 14, 2000

(65) Prior Publication Data

US 2001/0016520 A1 Aug. 23, 2001

(30) Foreign Application Priority Data

Dec. 15, 1999 (JP) .......................... 11-356342
Jan. 14, 2000 (JP) .......................... 2000-006690
Feb. 24, 2000 (JP) .......................... 2000-047869
Feb. 28, 2000 (JP) .......................... 2000-051419
Nov. 27, 2000 (JP) .......................... 2000-359985

(51) Int. Cl.$^7$ ................................. F16D 3/227
(52) U.S. Cl. ........................ 464/146; 464/906
(58) Field of Search ................... 464/145, 146, 464/178, 182, 906, 17; 301/105.1; 384/544

(56) References Cited

U.S. PATENT DOCUMENTS

| | | | | |
|---|---|---|---|---|
| 4,300,651 A | * | 11/1981 | Krude ...................... | 464/906 X |
| 5,230,936 A | * | 7/1993 | Misumi et al. ........ | 464/175 X |
| 5,536,075 A | | 7/1996 | Bertetti | |
| 5,607,241 A | * | 3/1997 | Fukumura ............... | 384/544 X |
| 5,975,767 A | * | 11/1999 | Mizukoshi et al. ..... | 464/145 X |
| 6,146,022 A | * | 11/2000 | Sahashi et al. ......... | 384/544 |
| 6,280,338 B1 | * | 8/2001 | Hayama et al. ......... | 464/146 |
| 6,322,452 B1 | * | 11/2001 | Kondo ..................... | 464/17 |
| 6,497,515 B1 | * | 12/2002 | Sahashi et al. ......... | 384/544 |

FOREIGN PATENT DOCUMENTS

| JP | 10-264605 | 6/1998 |
|---|---|---|
| JP | 10-325420 | 8/1998 |

OTHER PUBLICATIONS

GKN Constant Velocity Products, GKN Automotive, Inc., Auburn Hills, MI 464/906, pp. 7, 12 & 16, 1993.*
SAE Handbook, vol. 3, "On–Highway Vehicles and Off–Highway Machinery", Society of Automotive Engineers, Warrendale, PA, p. 29.51, Apr. 1998, TL151.S62 1998v.3.*

* cited by examiner

Primary Examiner—Greg Binda
(74) Attorney, Agent, or Firm—Arent Fox PLLC

(57) ABSTRACT

In a drive wheel bearing assembly, a fixed type constant velocity universal joint is coupled to a wheel bearing, mounted to one end of an intermediate shaft, and a sliding type constant velocity universal joint, is coupled to a differential, mounted to the other end portion of the intermediate shaft. One end portion of a stub shaft is connected to an inner joint ring of the constant velocity universal joint via torque transmission portions; one end portion of the intermediate shaft is connected to the other end portion of the stub shaft via torque transmission portions. A threaded portion is formed on an outer diameter portion of either the intermediate or stub shaft; a nut member threadedly engages the threaded portion; and a keeper ring is fitted into annular grooves formed on the outer diameter portion of the intermediate shaft or the stub shaft and an inner diameter portion of the nut member allowing the nut member to rotate, but not move axially.

30 Claims, 34 Drawing Sheets

DRIVE WHEEL BEARING ASSEMBLY

BACKGROUND OF THE INVENTION

1. Field of the Invention

The present invention relates to drive wheel bearing assemblies and, more particularly, to a drive wheel bearing assembly comprising drive shafts and wheel bearings for use in power transmission systems for transmitting power from the engine of vehicles to the drive wheels.

2. Description of the Background Art

The power transmission system for transmitting power from the engine of a vehicle to the drive wheels needs to respond to angular and axial displacements caused by a change in the relative positional relationship between the engine and the wheels. For example, as shown in FIG. 40, there is interposed an intermediate shaft 1 between the engine and the drive wheel, and one end of the intermediate shaft 1 is coupled to a differential via a sliding type constant velocity universal joint $J_1$, while the other end thereof is coupled to a wheel rib 2 via a fixed type constant velocity universal joint $J_2$ and a wheel bearing 8. There are installed seal boots 10a, 10b for preventing the entry of foreign matter and preventing grease from leaking outwardly, between the fixed-type constant velocity universal joint $J_2$ and the intermediate shaft 1 as well as between the sliding type constant velocity universal joint $J_1$ and the intermediate shaft 1, respectively.

The sliding type constant velocity universal joint $J_1$ is adapted to plunge to absorb axial displacements, whereas the fixed type constant velocity universal joint $J_2$ is adapted to allow only angular displacements. The sliding type constant velocity universal joint $J_1$, the fixed type constant velocity universal joint $J_2$, and the intermediate shaft 1 constitute a drive shaft 1' which is in turn provided with the wheel bearing 8 to constitute the drive wheel bearing assembly.

In the drive wheel bearing assembly, the constant velocity universal joints $J_1$, $J_2$ are provided with specified operative angles with the drive shaft 1' being mounted to the vehicle body. Since the operative angle of the constant velocity universal joints $J_1$, $J_2$ changes successively, the fixed type constant velocity universal joint $J_2$ is generally used outboard of the vehicle, whereas the sliding type constant velocity universal joint $J_1$ is used inboard of the vehicle, thereby responding to a change in operative angle.

The fixed type constant velocity universal joint $J_2$ located on the outboard side mainly comprises an inner joint ring 4 mounted to the other end of the intermediate shaft 1, an outer joint ring 3 connected to the wheel bearing 8, a plurality of torque transmission bearing balls 5 which are incorporated in between the track grooves of the inner joint ring 4 and the outer joint ring 3, and retainers 6 which are interposed between the outer spherical surface of the inner joint ring 4 and the inner spherical surface of the outer joint ring 3 to retain the torque transmission bearing balls 5.

The wheel bearing 8 mounted concentrically to the fixed type constant velocity universal joint $J_2$ comprises a hub ring 7 into which a stem portion 11 of the outer joint ring 3 is inserted and which is connected by a nut 12 to allow torque to be transmitted by means of serrations. The wheel bearing 8 is so adapted as to rotatably support said hub ring 7, to which the wheel rib 2 is fixed, against a knuckle 9 connected to the vehicle body via a plurality of rows of bearing balls 13a, 13b. For example, there is also another structure available for connecting the wheel bearing 8 to the constant velocity universal joint $J_2$, as shown in FIG. 41 (Japanese Patent Laid-Open publication No. Hei 10-264605).

The structure shown in FIG. 41 is adapted to form one race 14a of a plurality of rows of races 14a, 14b directly on the outer diameter portion of the hub ring 7, whereas the other race 14b is formed on the outer diameter portion of a separate inner ring 15 which is press fitted over a reduced diameter shoulder portion of the hub ring 7. An extended portion 16t or a reduced diameter shoulder portion of the hub ring 7 extended axially, is connected with an auxiliary ring 17 and the end portion of the extended portion 16 is caulked, thereby providing the bearing balls 13a, 13b with a specified preload. Serrations 18a, 18b are formed on the outer diameter portion of the extended portion 16 and on the inner diameter portion of the auxiliary ring 17, respectively. In addition, serrations 19a, 19b are formed on the outer diameter portion of the auxiliary ring 17 and on the inner diameter portion of the outer joint ring 3 of the constant velocity universal joint $J_2$, respectively. The inner diameter portion of the outer joint ring 3 is adapted to fit over the outer diameter portion of the auxiliary ring 17, thereby allowing the serrations 18a, 18b, 19a, 19b of the extended portion 16 of the hub ring 7, the auxiliary ring 17, and the outer joint ring 3 to serve to transmit torque. Annular grooves are formed circumferentially on the engagement surfaces of the auxiliary ring 17 and the outer joint ring 3, and a keeper ring 20 is thereby allowed to sit in the annular grooves and thus engageably mounted therein. Incidentally, for example, as another connection structure similar to the one in the foregoing, also available is the one disclosed in U.S. Pat. No. 5,536,075.

Incidentally, the structure shown in FIG. 41 allows the constant velocity universal joints $J_2$ and the wheel bearing 8 to be freely mounted thereto or dismounted therefrom. However, in the assembly process, it is necessary to mount the drive shaft 1' to the wheel bearing 8, where said drive shaft 1' comprises the fixed type constant velocity universal joint $J_2$ located on the outboard side, the sliding type constant velocity universal joint $J_1$ located on the inboard side (refer to FIG. 40), and the intermediate shaft 1. The drive shaft 1' comprising the two constant velocity universal joints. $J_1$, $J_2$ and the intermediate shaft 1 was axially long and heavy, thus making it difficult to be handled and to improve efficiency of assembly.

In addition, the seal boots 10a, 10b have to be more frequently replaced than other parts. In particular, the seal boot 10a located on the outboard side has a shorter life than the seal boot 10b located on the inboard side due to more frequent cracks or scratches caused by small stones or obstacles.

Furthermore, the seal boots 10a, 10b are generally formed of rubber, however, recent years have seen a greater use of resinous boots which are higher in hardness than the rubber boots, more resistant to damage caused by cracks or scratches, and more reliable in durability. However, it is still difficult to totally eliminate the possibility of damage even with the boots of this type, thus remaining the boots susceptible to improvement. Under the aforementioned circumstances, it is now desired to improve the replacement efficiency of boots.

Upon replacement of the seal boot 10a on the outboard side, the drive shaft 1', which is axially long and heavy, has to be once dismounted from the vehicle body, then the sliding type constant velocity universal joint $J_1$ on the inboard side is disassembled, and then the seal boot 10a has to be replaced from the inboard side. This causes a decrease in efficiency of the replacement.

For example, Japanese Patent Laid-Open Publication No.Hei 10-325420 discloses an assembly for saving time and manpower for disassembling the constant velocity universal joint $J_1$ located on the inboard side. The assembly allows the opening edge of the reduced diameter side of a boot on the outboard side to be equal in diameter to or greater than the fixed portion of the enlarged diameter side of a boot on the inboard side in order to allow the boot on the outboard side to pass over the outer circumference of the boot on the inboard side so that the boot on the outboard side can be replaced with the constant velocity universal joint on the inboard side remaining in place.

However, the assembly disclosed in Japanese Patent Laid-Open Publication No.Hei 10-325420 presented the following problems. That is, an increase in the space volume inside the boot causes correspondingly an increase in the amount of grease to be filled therein. This caused the centrifugal force due to rotation to increase, thereby leading to an increase in expansion of the boot and leaving in particular a durability problem at high speeds. In addition, a spacer added to the intermediate shaft causes an increase in the weight of the intermediate shaft, thus causing an increase in consumption of fuel and making it difficult to reduce the weight of the assembly. In addition, an increase in the space of the outer diameter portion may cause a problem of interfering with the surrounding parts to occur.

On the other hand, as shown in FIG. 41, there are formed annular grooves on the engagement surfaces of the outer joint ring 3 and the auxiliary ring 17, on which the serrations 18, 19 are formed, and the keeper ring 20 sits in the annular grooves to allow the constant velocity universal joint $J_2$ and the wheel bearing 8 to be connected to each other to transmit torque. This shows that the serrations fit too tightly to each other to prevent circumferential play would make it difficult to assure the engagement of the keeper ring 20 in place (in the annular grooves), and thus the serrations have to be loosely engaged with each others. This in turn causes wearing or feeling of the serrations 18, 19 to be degraded due to the circumferential play.

In addition, the assembly is provided with the extended portion 16, or the edge portion of the reduced diameter shoulder of the hub ring 7 extended axially, then the auxiliary ring 17 is press fitted over the extended portion 16, and thereafter the outer joint ring 3 of the constant velocity universal joint $J_2$ is coupled to the extended portion 16. Accordingly, the extended portion 16 provided on the edge portion of the hub ring 7 causes not only an increase in weight of the entire assembly but also some degradation in steering performance due to a displacement of the joint center in an axially inboard direction. In other words, the steering angle of the constant velocity universal joint $J_2$ is made smaller, so that the turning radius of the vehicle is made larger even with the same allowable operative angle of the constant velocity universal joint $J_2$.

In general, it is said that the joint center lying on the axis of the king pin will cause no moment to act on the constant velocity universal joint $J_2$ upon turning the vehicle and thus provides improved running stability. However, the aforementioned structure allows the joint center to be displaced in an axially inboard direction and thus causes some degradation in running stability.

Furthermore, suppose that the constant velocity universal joints $J_2$ and the wheel bearing 8 are adapted to be freely mounted or dismounted as described in the foregoing, and the inner ring 15 has been dislodged from the hub ring 7, the inner ring 15 being fitted over the reduced diameter shoulder portion of the hub ring 7 and provided with the race located on the inboard side. In this case, there is a danger that the wheel is dislodged from the vehicle body and therefore certain robust fastener means have to be provided to prevent the inner ring 15 from, dislodging from the hub ring 7. However, such robust fastener means would cause the structure to become more complicated or an increase in number of the parts, and thus would not be preferably provided.

Furthermore, it is also necessary to follow the procedures for re-setting the preload all over again to mount or dismount the constant velocity universal joint $J_2$ and the wheel bearing 8 for replacement or the like. However, the re-setting or caulking would possibly cause a lack or an excess of preload which may have an adverse effect on the rigidity and life of the bearing, therefore leaving a good deal desired to be solved. In addition, the size of the bearing assembly is determined in terms of the weight of the vehicle to some extent irrespective of the piston displacement. However, the constant velocity universal joint is chosen from a pre-sorted collection of graded sizes in accordance with the piston displacement or the engine torque, and thus there are several joint sizes available for the same type of vehicle. This provides a large number of combinations between the bearing assembly and the constant velocity universal joint, thus making the aforementioned caulking complicated in the manufacturing steps.

SUMMARY OF THE INVENTION

Objects of the present invention are to simplify assembling and disassembling procedures or replacement of parts, improve the performance of vehicles, and provide reduced weight and size. To achieve these objects, a drive wheel bearing assembly according to the present-invention has a fixed type constant velocity universal joint, coupled to a wheel bearing, mounted to one end portion of an intermediate shaft, and a sliding type constant velocity universal joint, coupled to a differential, mounted to the other end portion of said intermediate shaft. The drive wheel bearing assembly is characterized in that one end portion of a stub shaft is connected to an inner joint ring of said fixed type constant velocity universal joint via torque transmission portions; one end portion of said intermediate shaft is connected to the other end portion of the stub shaft via torque transmission portions; a threaded portion is formed on an outer diameter portion of either the intermediate shaft or the stub shaft; a nut member threadedly engages the threaded portion; and a keeper ring is fitted into annular grooves formed on the other outer diameter portion of said intermediate shaft or said stub shaft and an inner diameter portion of said nut member to allow said nut member not to move axially but to be rotatable.

The drive wheel bearing assembly according to the present invention has the stub shaft integrated with the fixed type constant velocity universal joint and allows the intermediate shaft to be mounted to or dismounted from the stub shaft. This allows assembling and disassembling procedures or the replacement of the boot to be simplified, thus improving the workability thereof and the functions such as the steering function and running stability of the vehicles, and reducing in weight and size of the assembly.

According to an embodiment of the present invention, the stub shaft and the intermediate shaft may be mounted to or dismounted from each other by means of the connecting structure comprising the nut member and the keeper ring. Accordingly, the inner joint ring of the fixed type constant velocity universal joint can be tightly fitted over the stub shaft, and the stub shaft can be tightly fitted over the intermediate shaft, thereby preventing circumferential play of the torque transmission portions.

According to another embodiment of the present invention, making the maximum outer diameter of the fixed type constant velocity universal joint smaller than the outer diameter of the wheel bearing would allow an entire unit comprising the wheel bearing and the fixed type constant velocity universal joint to be mounted to and dismounted from the vehicle body.

According to still another embodiment of the present invention, of said stub shaft and the intermediate shaft, making at least the stub shaft hollow would make it possible to reduce the weight of the drive wheel bearing assembly.

In addition, the drive wheel bearing assembly according to the present invention has a fixed type constant velocity universal joint, coupled to a wheel bearing, mounted to one end portion of an intermediate shaft, and a sliding type constant velocity universal joint, coupled to a differential, mounted to the other end portion of said intermediate shaft. The drive wheel bearing assembly is characterized by comprising a stub shaft connected to an inner joint ring of the fixed type constant velocity universal joint by means of torque transmission portions and an engagement portion, formed on an outer diameter portion of one end thereof, and connected detachably to the intermediate shaft by means of torque transmission portions and an engagement portion, formed on an inner diameter portion of the other end thereof. The drive wheel bearing assembly is also characterized in that the torque transmission portions on the other end portion of the stub shaft are made larger in diameter than the torque transmission portions on the one end portion.

Furthermore, according to the present invention, the drive wheel bearing assembly is characterized by comprising a stub shaft-connected to an inner joint ring of the fixed type constant velocity universal joint by means of torque transmission portions and an engagement portion, formed on an outer diameter portion of one end thereof, and connected detachably to the hollow intermediate shaft by means of torque transmission portions and an engagement portion, formed on an outer diameter portion of the other end thereof. The drive wheel bearing assembly is characterized in that the torque transmission portions on the other end portion of the stub shaft are made larger in diameter than the torque transmission portions on the one end portion.

The drive wheel bearing assembly is provided with a structure in which the one end portion of the stub shaft engages the inner joint ring of said fixed type constant velocity universal joint via the torque transmission portions and an engagement portion, and the intermediate shaft is detachably connected to the outer diameter portion extended from the one end portion of the stub shaft via the torque transmission portions and the engagement portion formed the other end portion of said stub shaft. The stub shaft is thereby integrated with the fixed type constant velocity universal joint to unitize the wheel bearing, the constant velocity universal joint, and the stub shaft.

Accordingly, the intermediate shaft is mounted to or dismounted from the integrated stub shaft. This allows assembling and disassembling procedures or the replacement of the boot to be simplified, thus improving the workability thereof and the functions such as the steering function and running stability of the vehicles, and reducing in weight and size of the assembly.

According to another embodiment of the present invention, the torque transmission portions may be preferably formed of serrations engaged with each other. In addition, according to still another embodiment of the present invention, the engagement portion can be adapted to have a protruding member arranged on an outer diameter portion of the one end portion of the stub shaft and on an outer diameter portion or an inner diameter portion on the one end portion of the intermediate shaft in order to prevent axial movement thereof at an end portion of the torque transmission portions.

Furthermore, the drive wheel bearing assembly according to the present invention has a fixed type constant velocity universal joint, coupled to a wheel bearing, mounted to one end portion of an intermediate shaft, and a sliding type constant velocity universal joint, coupled to a differential, mounted to the other end portion of said intermediate shaft. The drive wheel bearing assembly is characterized in that an allowable plunging down to a bottom portion of an outer joint ring of said sliding type constant velocity universal joint is set to at least a width of an inner joint ring of said fixed type constant velocity universal joint at a minimum operative angle of the sliding type constant velocity universal joint.

In the present invention, the allowable plunging down to the bottom portion of the outer joint ring of the sliding type constant velocity universal joint is set to at least the width of the inner joint ring of the fixed type constant velocity universal joint at the minimum operative angle of the sliding type constant velocity universal joint. For this reason, a sliding portion of the sliding type constant velocity universal joint is only slid toward the bottom portion of the outer joint ring, thereby allowing the intermediate shaft to be dismounted from the inner joint ring of the fixed type constant velocity universal joint without causing said sliding portion to interfere with the bottom portion of the outer joint ring. Therefore, it is not necessary to dismount the drive shaft from the vehicle body.

According to another embodiment of the present invention, the stem portion of the outer joint ring of said fixed type constant velocity universal joint may be preferably made hollow, and the hollow portion may preferably be allowed to communicate with a house portion of the outer joint ring. With such a structure, it is made possible to push out the intermediate shaft located at the house portion of the outer joint ring of the fixed type constant velocity universal joint from the hollow portion of said wheel bearing, thus facilitating dismounting of the intermediate shaft. In addition, since the wheel bearing and the house portion of the outer joint ring of the fixed type constant velocity universal joint are made hollow in common to communicate with the atmosphere, thereby preventing an increase in temperature due to operation. Furthermore, it is made possible to reduce the weight of the bearing assembly. Furthermore, according to another embodiment of the present invention, in the structure in which an end cap is mounted to the communicating region between the hollow portion of said stem portion and said house portion, a communicating portion may be preferably formed substantially at the center of the end cap. The structure adapted as such would prevent the boot from being expanded or contracted due to a change in the internal temperature of the fixed type constant velocity universal joint.

According to another embodiment of the present invention, it is preferable for said wheel bearing to be plastically connected to the outer joint ring of the fixed type constant velocity universal joint. The drive wheel bearing assembly can be reduced in weight by plastically coupling the wheel bearing to the outer joint ring of the fixed type constant velocity universal joint.

According to still another embodiment of the present invention, mounting a seal boot on said stub shaft or on the outer diameter portion of the other end portion of the intermediate shaft would make it possible to replace the boot by allowing the intermediate shaft to be mounted to or dismounted from the stub shaft. Incidentally, according to another embodiment of the present invention, said seal boot may be preferably formed of resin. Use of resinous boots would make it possible to prevent loss of life of the drive wheel bearing assembly due to damage such as cracks or scratches and to provide improved durability.

Incidentally, according to another embodiment, the present invention is applicable to a structure in which one of a plurality of rows of races in said wheel bearing is formed on an outer diameter portion of a hub ring constituting the wheel bearing, and another race is formed on an outer diameter portion of a separate inner ring engaging the outer joint ring of said fixed type constant velocity universal joint.

According to still another embodiment of the present invention, opposite edges of said inner ring and hub ring may be brought into contact with each other, and a coupler collar is mounted to the abutting edge portions of said hub ring and inner ring. When the fixed type constant velocity universal joint is dismounted from the hub ring and inner rings coupled by the coupler collar to each other, this would allow said inner ring to remain in the fixed type constant velocity universal joint and thus prevent the inner ring from being dislodged from the wheel bearing, thus providing a structure which allows the inner ring and hub ring to be readily separable from the fixed type constant velocity universal joint.

Furthermore, such a structure has been employed in which the hub ring abuts axially the inner ring, thereby reducing the size of the entire assembly in the axial direction and providing more flexibility in design. That is, when displaced in an outboard direction, the center of the fixed type constant velocity universal joint to be connected to the hub ring and inner ring can sit on the king pin axis. The center of joint sitting on the king pin axis would allow the fixed type constant velocity universal joint to be acted upon by no moment upon turning the vehicles thus providing improved steering and running stability.

Furthermore, according to another embodiment, the present invention is also applicable to a structure in which at least one of the plurality of rows of races of said wheel bearing is formed integrally on the outer diameter portion of the outer joint ring of said fixed type constant velocity universal joint.

Incidentally, according to another embodiment, the present invention is applicable to a structure in which one of the plurality of rows of races in said wheel bearing is formed on the outer diameter portion of the hub ring constituting the wheel bearing, and another race is formed on the outer diameter portion of the separate inner ring engaging said hub ring.

In this case, one of the objects of the present invention is to provide a fix preload (or a self-retaining function) to obviate the necessity to perform experience-requiring re-setting of the preload, even when the fixed type constant velocity universal joint is mounted to or dismounted from the wheel bearing.

The drive wheel bearing assembly according to another embodiment of the present invention is characterized in that projections and depressions are formed on one of or both of engagement surfaces of said hub ring and said inner ring; said engagement surfaces are expanded or compressed radially to thereby connect plastically said hub ring and said inner ring to each other; serrations formed on said hub ring or said inner ring are allowed to transmit torque, and a keeper ring detachably engages an annular groove formed on said hub ring or said inner ring, allowing said keeper ring to be axially engageable therewith.

As described above, such a one-touch connectable structure with a keeper ring used instead of a conventional complicated connecting structure has been employed in which the hub ring and inner ring are plastically connected to each other to make the axial fastening pressure and the preload of the rollers independent of each other, thereby obviating the necessity of re-setting the preload required upon mounting or dismounting the constant velocity universal joint, and allowing the stabilized preload to provide stabilized bearing rigidity and bearing life. This makes it possible to make the drive wheel bearing assembly and the constant velocity universal joint independent of each other and to replace parts easily, thus allowing the constant velocity universal joint to be easily and quickly mounted and dismounted.

When located at a position accessible from outside, said keeper ring can employ any shape such as rectangular, circular, or elliptical in cross section. However, when located at a position inaccessible from outside, the keeper ring is given a circular cross section according to another embodiment of the present invention. The keeper ring made circular in cross section is acted upon by a specified axial force, thereby allowing said keeper ring to contract radially by itself to be withdrawn.

For example, the following structures are available to allow the serrations of the hub ring or the inner ring to transmit torque.

(1) A structure according to another embodiment of the present invention in which an outer diameter surface of the hub ring and an inner diameter surface of the fixed type constant velocity universal joint, extended from the engagement surfaces between the hub ring and the inner ring are connected engageably by serrations to each other, (2) A structure according to still another embodiment of the present invention in which an outer diameter surface of the inner ring and an inner diameter surface of the fixed type constant velocity universal joint are connected engageably by serrations to each other, (3) A structure according to still further embodiment of the present invention in which an inner diameter surface of the inner ring and an outer diameter surface of the fixed type constant velocity universal joint are connected engageably by serrations to each other.

(4) A structure according to another embodiment of the present invention in which the inner diameter surface of the hub ring and an outer diameter surface outboard of a torque transmission coupling shaft are connected engageably by serrations to each other, and an outer diameter surface inboard of the torque transmission coupling shaft and an inner diameter surface of an edge portion outboard of the outer joint ring are connected engageably by serrations to each other.

(5) A structure according to still another embodiment of the present invention in which the inner diameter surface of the hub ring and the outer diameter surface outboard of the torque transmission coupling shaft which also serves as an inner ring are connected engageably by serrations to each other, and the outer diameter surface inboard of the torque transmission coupling shaft and the inner diameter surface of an edge portion outboard of the outer joint ring are connected engageably by serrations to each other.

(6) A structure according to still another embodiment of the present invention in which the inner diameter surface of the hub ring and the outer diameter surface outboard of the torque transmission coupling shaft, also serving as the inner ring, are connected engageably by serrations to each other, and the inner diameter surface inboard of the torque transmission coupling shaft and the outer diameter surface of an edge portion outboard of the outer joint ring are connected engageably by serrations to each other.

Incidentally, heat treatment can be performed on the torque transmission serrations described above, as required.

Any one of the aforementioned structures (1) to (6) can be provided with a serration connecting region on the engagement surfaces except for plastically connected regions between the hub ring and inner ring, thereby providing an increase in torque to be possibly transmitted.

According to another embodiment, the present invention is characterized in that the inner diameter surface of said hub ring and an outer diameter surface outboard of a torque transmission coupling shaft are connected engageably by serrations to each other; an outer diameter surface inboard of the torque transmission coupling shaft and an inner diameter surface of an edge portion outboard of said outer joint ring are connected engageably by serrations to each other; a reduced diameter edge portion inboard of said hub ring is plastically deformed radially outwards by caulking to be fixedly pressed against said inner ring in its outboard direction; and an edge portion of the torque transmission coupling shaft inserted from its outboard side into the inner diameter portion of said hub ring and the outer joint ring are axially coupled to each other by detachable coupling means.

According to still another embodiment, the present invention is characterized in that the inner diameter surface of said hub ring and the outer diameter surface outboard of the torque transmission coupling shaft are connected engageably by serrations to each other; the outer diameter surface inboard of the torque transmission coupling shaft and the inner diameter surface of an edge portion outboard of said outer joint ring are connected engageably by serrations to each other; the outer diameter of the torque transmission coupling shaft engaging the serrations of said outer joint ring is made larger at least than said inner ring; the edge portion outboard of said torque transmission coupling shaft is plastically deformed radially outwards by caulking to be fixedly pressed against said inner ring in its outboard direction; and the edge portion of the torque transmission coupling shaft inserted from an outboard side into the inner diameter portion of said hub ring and the outer joint ring are axially coupled to each other by detachable coupling means.

According to still another embodiment, the present invention is characterized by comprising a torque transmission coupling shaft for also serving as the inner ring allowed to engage said hub ring. This invention is also characterized in that the inner diameter surface of said hub ring and the outer diameter surface outboard of the torque transmission coupling shaft are connected engageably by serrations to each other; the outer diameter surface inboard of the torque transmission coupling shaft and the inner diameter surface of an edge portion outboard of said outer joint ring are connected engageably by serrations to each other; and the edge portion outboard of said torque transmission coupling shaft is plastically deformed radially outwards by caulking to be fixedly pressed against said torque transmission coupling shaft in its outboard direction; and said torque transmission coupling shaft and the outer joint ring are thereby axially coupled to each other by detachable coupling means.

According to still further another embodiment, the present invention is characterized in that the inner diameter surface of said hub ring and the outer diameter surface outboard of the torque transmission coupling shaft, also serving as the inner ring, are connected engageably by serrations to each other; the inner diameter surface inboard of the torque transmission coupling shaft and the outer diameter surface of an edge portion outboard of the outer joint ring are connected engageably by serrations to each other; the edge portion outboard of said torque transmission coupling shaft is plastically deformed radially outwards by caulking to be fixedly pressed against said torque transmission coupling shaft in its outboard direction; and said torque transmission coupling shaft and the outer joint ring are axially coupled to each other by detachable coupling means.

Moreover, according to another embodiment, the present invention is characterized in that a collar portion seated on a rim portion of a bore of the hub ring is provided on the edge portion outboard of said torque transmission coupling shaft, and pins or bolts are inserted radially detachably into the edge portion outboard of said outer joint ring so as to at least axially engage said torque transmission coupling shaft.

According to still another embodiment, the present invention is characterized in that the collar portion seated on the rim portion of the bore of the hub ring is provided on the edge portion outboard of said torque transmission coupling shaft; annular grooves are formed on serrations between the edge portion outboard of said outer joint ring and said torque transmission coupling shaft; and a keeper ring is mounted detachably into said annular grooves.

In addition, according to another embodiment, the present invention is characterized in that annular grooves are formed on serrations between said torque transmission coupling shaft, and said hub ring and outer joint ring, and a keeper ring is mounted detachably into said annular grooves.

According to another embodiment, the present invention is characterized in that annular grooves are formed on serrations between said torque transmission coupling shaft and said outer joint ring, and a keeper ring is mounted detachably into said annular grooves.

Moreover, according to still another embodiment, the present invention is characterized in that the edge portion inboard of said hub ring is extended to the inner diameter surface of the outer joint ring of said constant velocity universal joint; an outer diameter surface of the extended portion and the inner diameter surface of said outer joint ring are connected engageably by serrations to each other; and said hub ring and said outer joint ring are fastened axially by bolts and nuts, providing a given maximum fastening force, thereby pressing the edge surface outboard of said outer joint ring against an edge surface of the inner ring at a given pressure.

According to still another embodiment, the present invention is characterized in that heat treatment is performed on a portion leading from seal engagement surfaces immediately near a race outboard of said hub ring to said serration-formed region, and on a serration-formed region of said outer joint ring.

According to still another embodiment, the present invention is characterized in that said fastening bolt is press fitted into said outer joint ring.

According to still another embodiment, the present invention is characterized in that said fastening bolt is fixedly clipped to said outer joint ring.

According to still another embodiment, the present invention is characterized in that said fastening bolt is fixed to said outer joint ring by press fitting a seal plate therein.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 22(A) shows the surfaces before plastically coupled to each other and FIG. 22(B) shows the surfaces after plastically coupled to each other;

FIG. 36(A) shows a first modified example of the embodiment and FIG. 36(B) shows a second modified example thereof;

DESCRIPTION OF PREFERRED EMBODIMENTS

Figure 1:
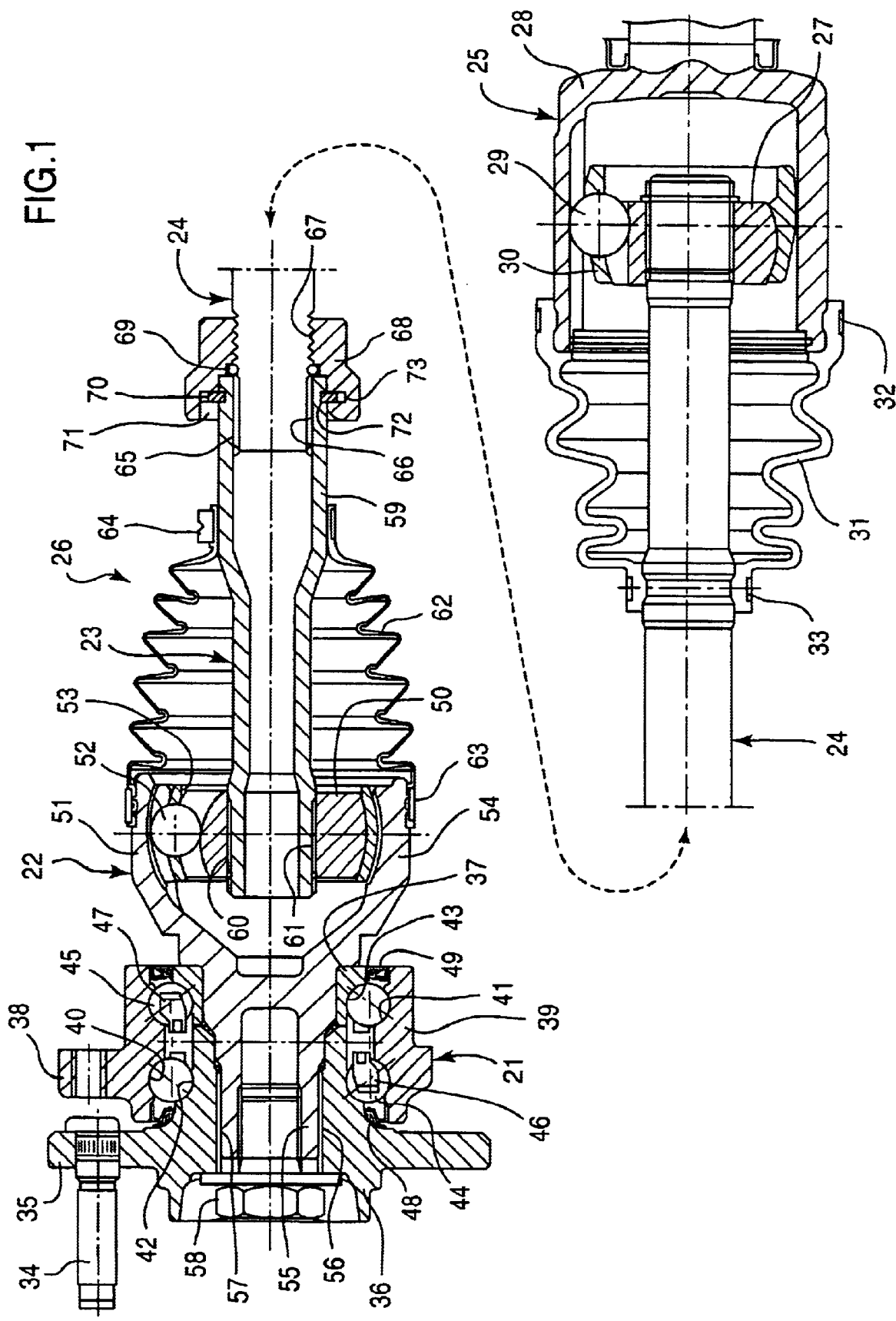
FIG. 1 is a cross-sectional view illustrating an embodiment of a drive wheel bearing assembly according to the present invention.

An embodiment shown in FIG. 1 has a structure in which a wheel bearing 21 is integrally unitized with a fixed type constant velocity universal joint, and the fixed type constant velocity universal joint 22 is mounted to one end of an intermediate shaft 24 via a stub shaft 23, while a sliding type constant velocity universal joint 25 connected to a differential is mounted to the other end of the intermediate shaft 24. The fixed type constant velocity universal joint 22 and the wheel bearing 21 are unitized to form a bearing assembly in which the fixed type constant velocity universal joint 22, the sliding type constant velocity universal joint 25, and the intermediate shaft 24 to be connected therebetween constitute a drive shaft 26.

With the drive shaft 26 being mounted to the vehicle body, the constant velocity universal joints 22, 25 are provided with a specified operative angle. The operative angle of the constant velocity universal joints 22, 25 changes when an empty vehicle is filled with passengers. The operative angle of the constant velocity universal joints 22, 25 also changes in a variety of occasions, that is, when the vehicle running on an uneven spot on a road bounds, when the vehicle runs on the shoulder of a road, or when the vehicle is jacked up.

In addition, even when the vehicle is accelerated or decelerated in a short time, the operative angle of the constant velocity universal joints 22, 25 changes successively due to displacement of the center of gravity of the vehicle. In general, taking the foregoing circumstances into account, the fixed type constant velocity universal joint 22 is used outboard of the vehicle and the sliding type constant velocity universal joint 25 is used inboard thereof to cope with a change in operative angle.

The sliding type constant velocity universal joint 25 is of a double offset type. The double offset type constant velocity universal joint 25 comprises an inner joint ring 27 which is mounted to one end of the intermediate shaft 24 and provided with a track groove formed on the outer circumference portion thereof, an outer joint ring 28 on the inner circumference portion of which a track groove is formed, a plurality of torque transmission bearing balls 29 incorporated in between the track grooves of the inner and outer joint rings 27, 28, and retainers 30 interposed between the inner and outer joint rings 27, 28 to support the torque transmission bearing balls 29.

Incidentally, the sliding type constant velocity universal joint 25 is applicable not only to the double offset type but also to a tripod type. The constant velocity universal joint of the tripod type comprises a tripod member having three legs protruding radially, an outer joint ring which has three track grooves formed axially on the inner circumference portion and roller guide surfaces provided axially on the both sides of each of the track grooves, and roller members interposed between the legs of the tripod member and the outer joint ring to transmit torque.

Between the outer joint ring 28 and the intermediate shaft 24, there is provided a seal boot 31 to prevent foreign matter from entering the constant velocity universal joint 25 and to prevent the leakage of the grease filled therein. The boot 31 is formed of rubber or resin in the shape of bellows, with the enlarged diameter edge portion inserted over the outer diameter portion of the house of the outer joint ring 28 and the reduced diameter edge portion being inserted over the intermediate shaft 24, each of the portions being fixedly fastened by boot belts 32, 33.

Figure 40:
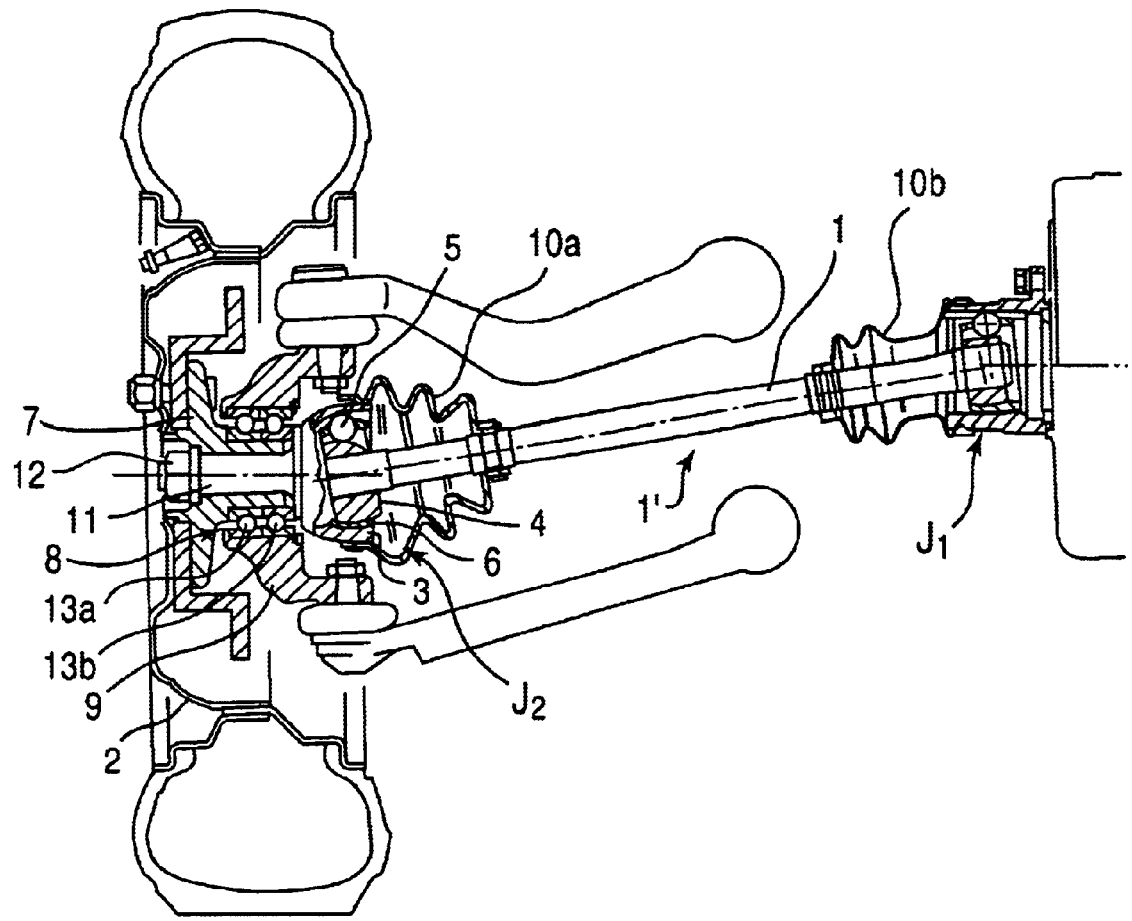
FIG. 40 is a cross-sectional view illustrating a power transmission system for transmitting power from the engine of a vehicle to a drive wheel.
Figure 41:
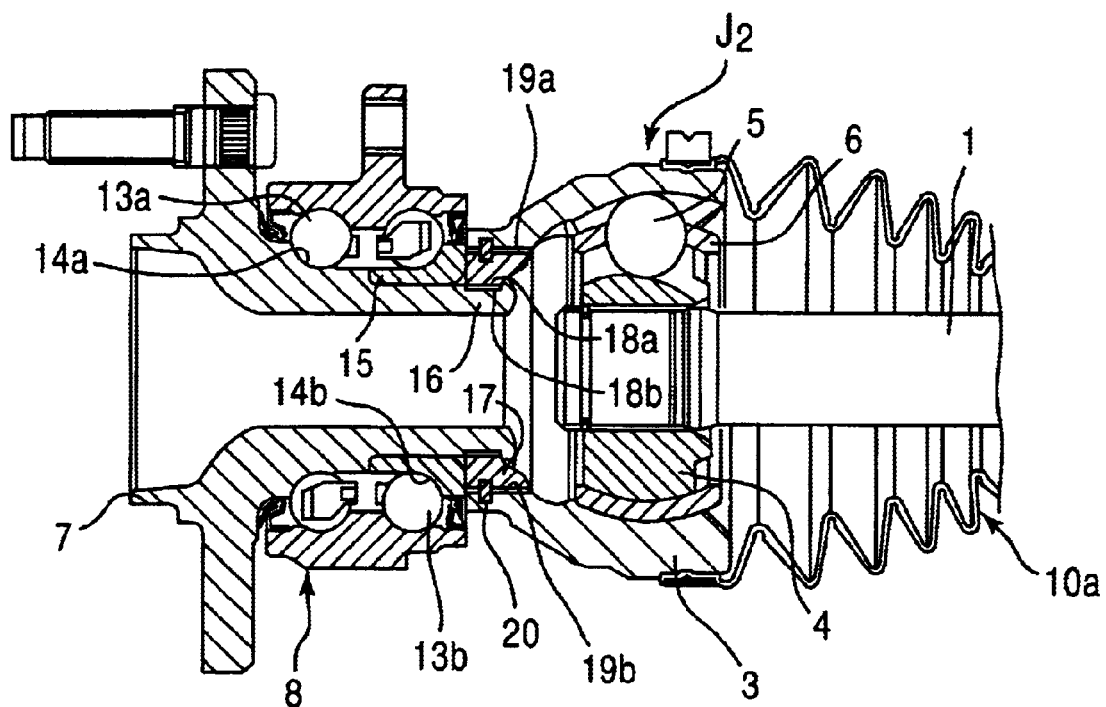
FIG. 41 is a cross-sectional view illustrating a prior-art wheel bearing and constant velocity universal joint.

The wheel bearing 21 comprises a hub ring 36 with a wheel mounting flange 35 having hub bolts 34 arranged circumferentially thereon at regular intervals to fix the wheel rib 2 (refer to FIG. 40), an inner ring 37 separate from the hub ring 36 and inserted over the shoulder portion of an outer joint ring 51, and an outer ring 39 having, on the outer circumference portion thereof, a vehicle mounting flange 38 to which a knuckle (not shown) is bolted to be fixed to the vehicle body.

The hub ring 36, the inner ring 37, and the outer ring 39 constitute a plurality of rows of angular ball bearings. There are formed a plurality of rows of races 40, 41 on the inner diameter surface of the outer ring 39. Opposite to the races 40, 41, there are formed one race 42 on the outer circumference surface of the hub ring 36 and the other race 43 on the outer circumference surface of the inner ring 37, respectively. There are arranged a plurality of rows of rollers 44, 45 in the races between the outer ring 39, and the hub ring 36 and the inner ring 37. The rollers 44, 45 in each of the rows are supported circumferentially at regular intervals by means of retainers 46, 47, respectively. Incidentally., there are provided seals 48, 49 between the hub ring 36, the inner ring 37, and the outer ring 39 to prevent the entry of foreign matter or the leakage of the grease filled therein.

On the other hand, the fixed type constant velocity universal joint 22 comprises an inner joint ring 50 mounted to one end of the stub shaft 23 and provided with a track groove on the outer circumference portion thereof, the outer joint ring 51 on the inner circumference portion of which a track groove is formed, a plurality of torque transmission bearing balls 52 incorporated in between the track grooves of the inner and outer joint rings 50, 51, and retainers 53 interposed between the inner and outer joint rings 50, 51 to support the torque transmission bearing balls 52. The outer joint ring 51 has a housing portion 54 formed generally in the shape of a dome and a stem portion 55 integrated with the housing portion 54. Incidentally, as the fixed type constant velocity universal joint 22, a joint of an under-cut free type is also applicable here.

The stem portion 55 of the outer joint ring 51 is inserted into the bore of the hub ring 36 to be connected to each other such that torque can be transmitted between the wheel bearing 21 and the hub ring 36 by mating the serrations 56, 57 with each other, which are formed on the outer diameter portion of the stem portion 55 and on inner diameter portion of the hub ring 36. The wheel bearing 21 is also bolted to the constant velocity universal joint 22 by a bolt 58. It is to be understood that the aforementioned serrations are meant to include splines.

On the other hand, the stub shaft 23 is inserted into the inner joint ring 50 of the constant velocity universal joint 22. The stub shaft 23 has a hollow enlarged diameter portion 59 on the edge portion inboard thereof and is aligned concentrically with the constant velocity universal joint 22. There are formed serrations 60, 61 extending axially on the outer diameter portion of the edge portion outboard of the stub shaft 23 and on the inner diameter portion of the inner joint ring 50 of the constant velocity universal joint 22, respectively.

The edge portion outboard of the stub shaft 23 is inserted into the inner joint ring 50 to mate the serrations 60, 61 with one another, thereby allowing torque transmission between the stub shaft 23 and the inner joint ring 50 of the constant velocity universal joint 22. In addition, the stub shaft 23 is fixedly positioned on the inner joint ring 50 by means of snap rings or the like, whereby the stub shaft 23 is prevented from dislodging from the inner joint ring 50.

Between the outer joint ring 51 of the constant velocity universal joint 22 and the stub shaft 23, there is a seal boot 62 provided to prevent foreign matter from entering the constant velocity universal joint 22 and the leakage of the grease filled therein. The boot 62 can be formed of rubber or resin in the shape of bellows. The enlarged diameter edge portion of the boot 62 is inserted over the outer diameter portion of the house portion of the outer joint ring 51 of the constant velocity universal joint 22, while the reduced diameter edge portion thereof is inserted over the outer diameter edge portion of the enlarged diameter portion of the stub shaft 23, each of the portions being fixedly fastened by boot belts 63, 64.

The intermediate shaft 24 is detachably mounted to the edge portion of the enlarged diameter portion 59 of the stub shaft 23, which extends from the constant velocity universal joint 22. There are formed serrations 65, 66 on the outer diameter portion of one end of the intermediate shaft 24 and on the inner diameter portion of the enlarged diameter portion 59 of the stub shaft 23, respectively. In addition, a threaded portion 67 is formed on the outer diameter portion inboard of the serrations 65 of the intermediate shaft 24. The intermediate shaft 24 is inserted into the enlarged diameter portion 59 of the stub shaft 23 to mate the serrations 65, 66 with each other, whereby torque can be transmitted between the intermediate shaft 24 and the stub shaft 23.

Figure 2:
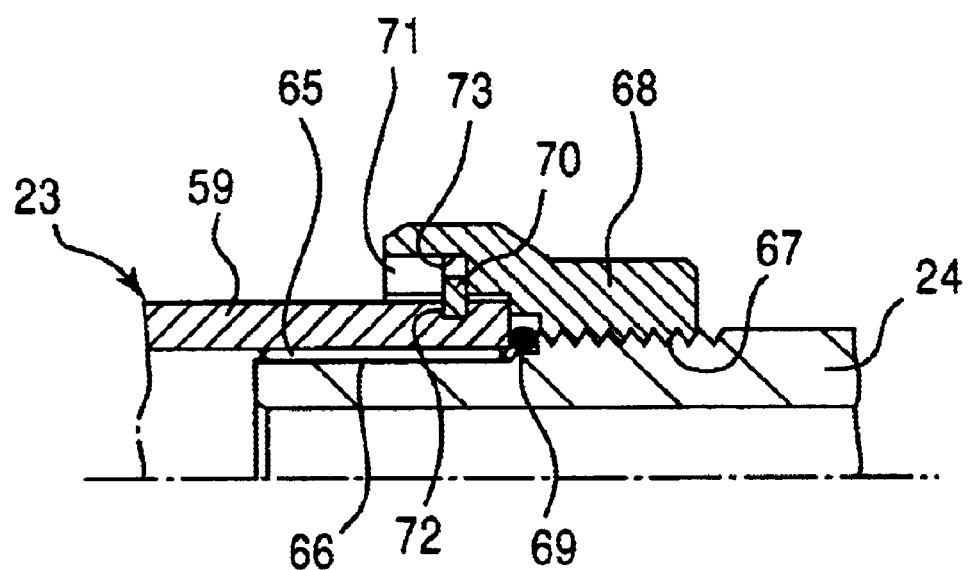
FIG. 2 is an enlarged partially cross-sectional view illustrating an engagement portion of the intermediate shaft and the stub shaft of FIG. 1.

A nut member 68 is threaded onto the threaded portion 67 of the intermediate shaft 24, whereby the nut member 68 connects the intermediate shaft 24 and the stub shaft 23 to each other (refer to FIG. 2). Incidentally, there is provided an O-ring 69 on the opening edge portion of the stub shaft 23 to prevent the entry of moisture or dust particles. In addition, there are formed annular grooves 72, 73 on the outer diameter portion of the enlarge diameter portion 59 of the stub shaft 23 and on the inner diameter portion of the enlarge diameter portion of the nut member 68, which is threaded onto the stub shaft 23, respectively, with a keeper ring 70 being tightly held in between the annular grooves 72, 73. The keeper ring 70 prevents the nut member 68 from dislodging from the stub shaft 23.

Figure 3:
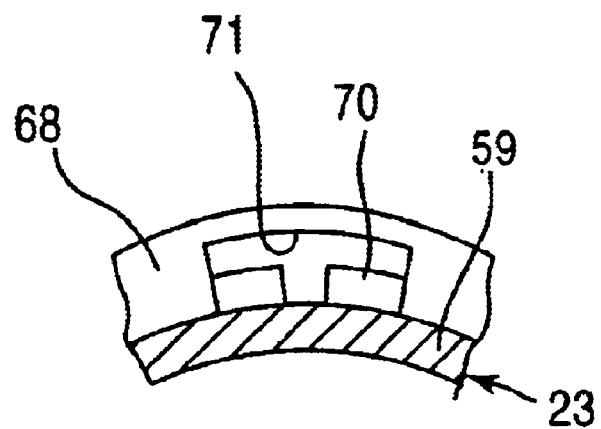
FIG. 3 is a side view illustrating the nut member of FIG. 2, viewed from its outboard side.

The intermediate shaft 24 and the stub shaft 23 are connected to make it possible to transmit torque by means of the serrations 65, 66, also being connected detachably to each other by means of the nut member 68 and the keeper ring 70. The keeper ring 70 is formed in the shape of a letter C to make it possible to expand against the resilience thereof, also having an opening or a window 71 provided on the edge portion outboard of the nut member 68 so that the keeper ring 70 can be expanded in diameter with a jig upon removal of the nut member 68 (refer to FIG. 3).

Figure 4:
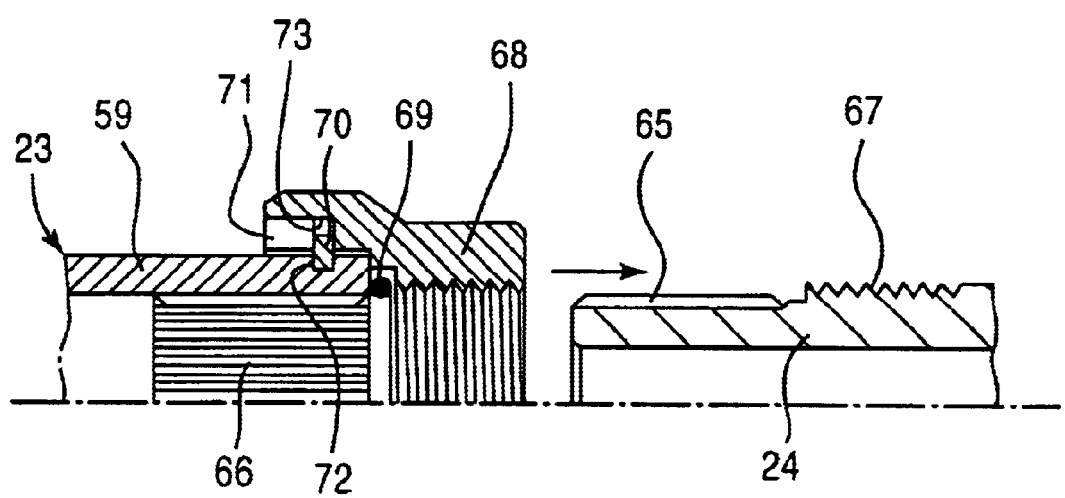
FIG. 4 is an enlarged partially cross-sectional view illustrating the stub shaft of FIG. 2 from which the intermediate shaft is dismounted.

With the drive wheel bearing assembly, the intermediate shaft 24 may be dismounted from the stub shaft 23 in the following manner. First, the nut member 68 retained on the stub shaft 23 by the keeper ring 70 is turned, whereby the intermediate shaft 24 threaded into the nut member 68 moves in an axially inboard direction to allow the serrations 65 of the intermediate shaft 24 to be disengaged from the serrations 66 of the stub shaft 23 (refer to FIG. 4). The intermediate shaft 24 is allowed to move in an axially inboard direction, even with the sliding type constant velocity universal joint 25 being mounted to the differential, because of an allowable plunging space between the sliding portion of the sliding type constant velocity universal joint 25 (the inner joint ring 27, the bearing balls 29, and the retainers 30) and the bottom portion of the outer joint ring 28.

With the maximum outer diameter of the fixed type constant velocity universal joint 22 being made smaller than the outer diameter of the wheel bearing 21, the entire unit comprising the constant velocity universal joint 22 and the wheel bearing 21 can be dismounted in an outboard direction from the knuckle on the vehicle body side.

Figure 6:
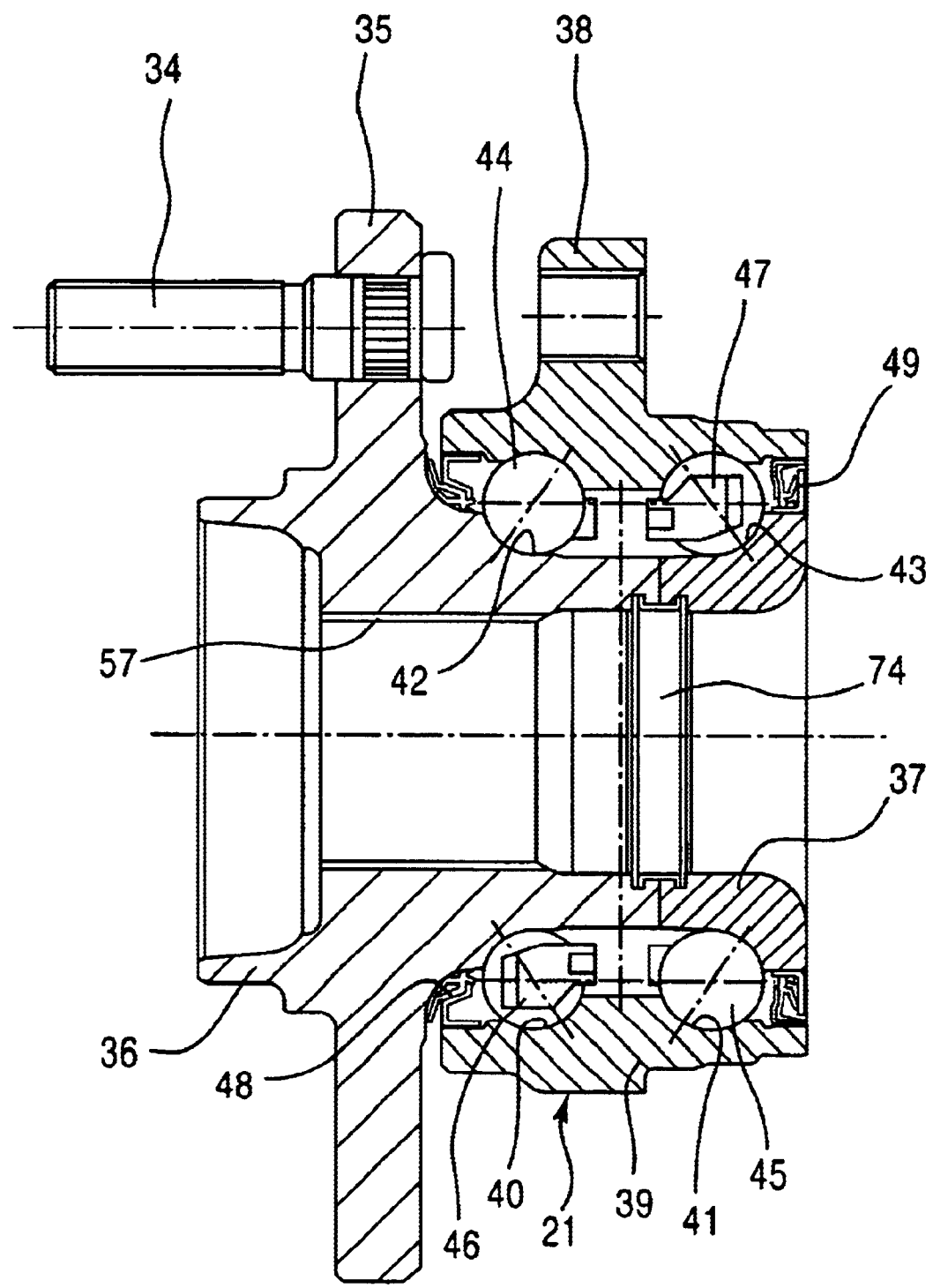
FIG. 6 is a cross-sectional view of another embodiment according to the present invention, illustrating a structure in which the hub ring and the inner ring are provided with a coupler collar to make the wheel bearing and the fixed type constant velocity universal joint separable.
Figure 7:
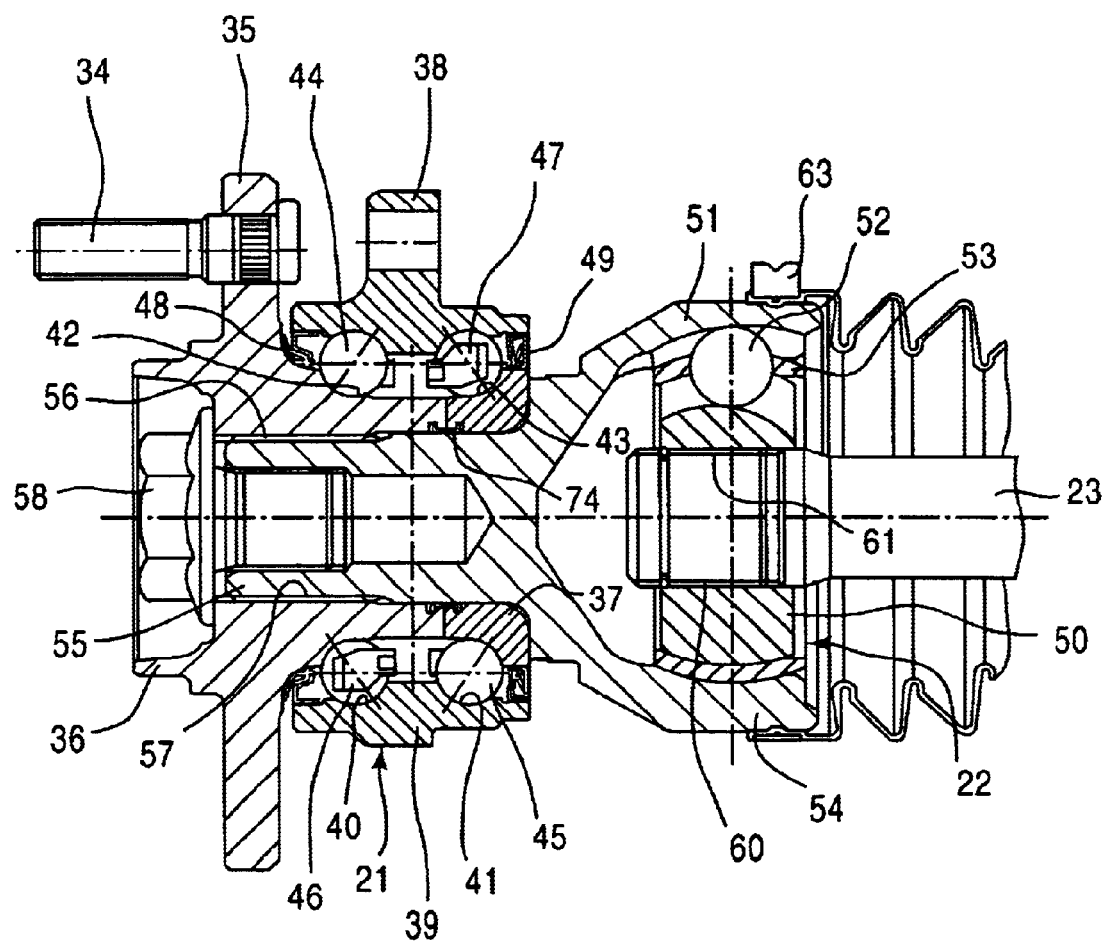
FIG. 7 is a cross-sectional view illustrating the fixed type constant velocity universal joint bolted to the wheel bearing of FIG. 6.

In addition, suppose that a coupler collar 74 is mounted to the abutting edge portions of the hub ring 36 and the inner ring 37, as shown in FIGS. 6 and 7. With this structure, the inner ring 37 remains on the outer joint ring 51 without dislodging from the wheel bearing 21 when the constant velocity universal joint 22 is dismounted from the wheel bearing 21 with the hub ring 36 being abutted against the inner ring 37. The constant velocity universal joint 22 can thereby be readily separated from the wheel bearing 21. This makes it possible to replace only the wheel bearing 21 or the constant velocity universal joint 22.

Incidentally, the structure having the coupler collar 74 with the hub ring 36 being abutted against the inner ring 37, the diameter of the serrations on the hub ring 36 can be enlarged and thereby the number of teeth of serrations 57 can be increased. In addition, since the capacity of torque transmission can be increased in the coupling portion between the hub ring 36 and the constant velocity universal joint 22, the engagement width of serrations can be designed to be reduced. This allows the axial dimension of the entire assembly to be reduced, and the rigidity of the hub ring 36 and the constant velocity universal joint 22 to be improved as well. In addition, the outer diameter of the stem portion of the constant velocity universal joint 22 can be enlarged, whereby the stem portion 55 can be made hollow and thus the entire assembly can be further reduced in weight.

Figure 5:
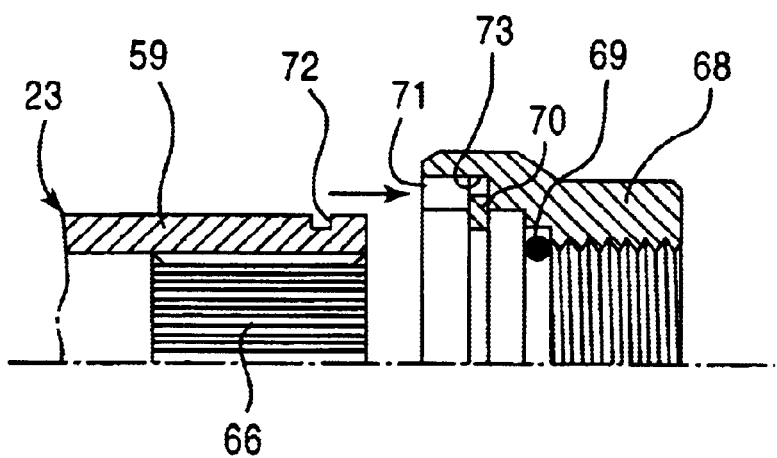
FIG. 5 is an enlarged partially cross-sectional view illustrating the stub shaft of FIG. 4 from which the nut member is dismounted.

After the intermediate shaft 24 has been disengaged from the stub shaft 23, the keeper ring 70 is enlarged in diameter with a jig against the resilience thereof from the window 71 provided on the edge surface outboard of the nut member 68, and thereafter the nut member 68 is removed from the stub shaft 23 (refer to FIG. 5). The removal of the nut member 68 makes it possible to replace the boot. That is, since the nut member 68 has been removed from the stub shaft 23, and the reduced diameter edge portion of the boot 62 is inserted over the enlarge diameter portion 59 of the stub shaft 23, the boot 62 can be dismounted from the inboard side after the boot belts 63, 64 have been removed.

The following procedure may be taken to mount the intermediate shaft 24 to the stub shaft 23 after a new boot 62 has been inserted over the stub shaft 23 from its inboard side to be mounted thereon by the boot belts 63, 64.

To mount the nut member 68 to the stub shaft 23 after the boot has been replaced, the nut member 68 is inserted over the stub shaft 23 from its inboard side and then the keeper ring 70 is engageably positioned in thy annular grooves 72, 73. Under this condition, the axial end of the intermediate shaft 24 is inserted into the stub shaft 23 through the nut member 68. Then, the nut member 68 is threaded onto the threaded portion 67 of the intermediate shaft 24 and thereafter rotated to cause the intermediate shaft 24 to move in an outboard direction. The movement of the intermediate shaft 24 in an outboard direction allows the serrations 65 of the intermediate shaft 24 and the serrations 66 of the stub shaft 23 to be engaged with each other.

Since the nut member 68 is adapted to rotate to cause the intermediate shaft 24 to move as such, the intermediate shaft 24 can tightly engage the stub shaft 23. That is, either the serrations 65 formed on the outer diameter portion of the intermediate shaft 24 or the serrations 66 formed on the inner diameter portion of the stub shaft 23 are given an angle of torsion, while the other serrations are made straight. With the serrations formed as such, rotation of the nut member 68 retained axially on the stub shaft 23 by the keeper ring 70 will allow the: intermediate shaft 24 to be press fitted into the stub shaft 23, thus providing tight serration fitting.

Figure 8:
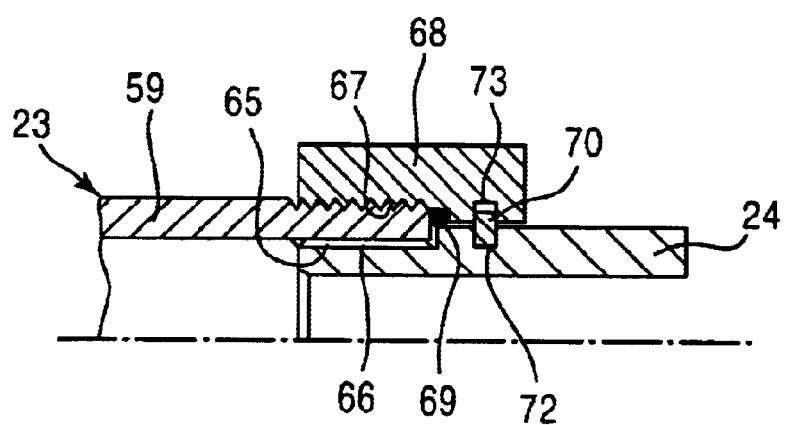
FIG. 8 is an enlarged partially cross-sectional view illustrating another structure of the intermediate shaft and the stub shaft connected to each other.
Figure 9:
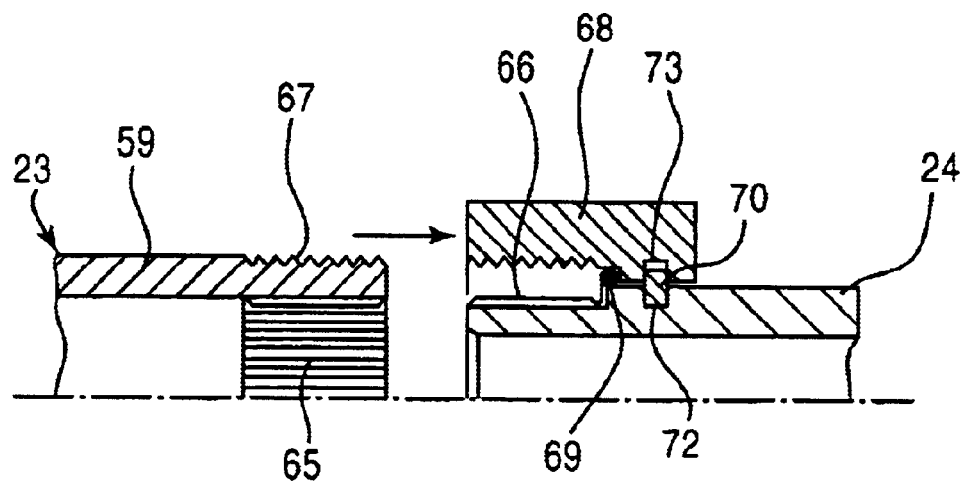
FIG. 9 is an enlarged partially cross-sectional view illustrating the intermediate shaft dismounted from the stub shaft of FIG. 8.

Incidentally, in the aforementioned embodiment, it is necessary to remove the nut member 68 from the stub shaft 23 to replace the boot upon removal of the intermediate shaft 24. However, as shown in FIG. 8, suppose that the threaded portion 67 is formed on the outer diameter portion of the enlarge diameter portion 59 of the stub shaft 23, and the keeper ring 70 is allowed to sit in the annular grooves 72, 73 formed on the outer diameter portion of the intermediate shaft 24 and on the inner diameter portion of the nut member 68. In this case, the nut member 68 remains on the intermediate shaft 24 after the intermediate shaft 24 has been dismounted, thus making it possible to immediately dismount the boot 62 from the stub shaft 23 (refer to FIG. 9).

Incidentally, the serrations formed on the inner diameter portion of the enlarged diameter portion 59 of the stub shaft 23 are made larger in diameter than the serrations on the outboard side engaging the inner joint ring 50, thereby allowing the teeth to be increased in number and the capacity of torque transmission to be increased at the coupling portion between the stub shaft 23 and the intermediate shaft 24. This in turn allows the engagement width of the serrations on the inner diameter portion of the enlarge diameter portion 59 of the stub shaft 23 to be reduced and the axial dimension thereof to be made smaller.

Incidentally, the hub ring 36 of the wheel bearing 21 is bolted to the outer joint ring 51 as described above, however, it is also possible to make the stem portion 55 of the outer joint ring 51 hollow to allow the edge portion of the stem portion 55 of the outer joint ring 51 inserted into the bore of the hub ring 36 to be caulked for connection. Making the stem portion 55 of the outer joint ring 51 hollow will provide advantages such as improvements in fuel consumption resulted from the reduction in weight of the assembly and in heat dissipation to prevent an increase in temperature due to driving.

Figure 10:
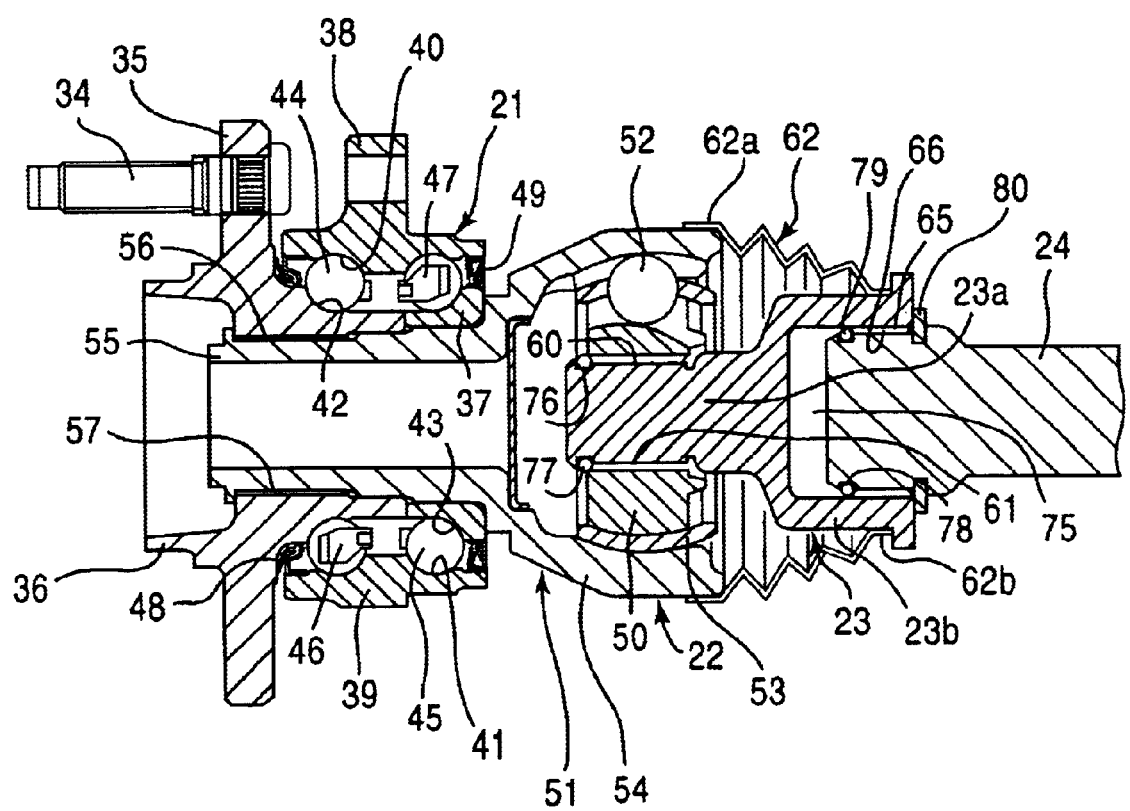
FIG. 10 is a cross-sectional view illustrating a drive wheel bearing assembly according to an embodiment of the present invention.
Figure 11:
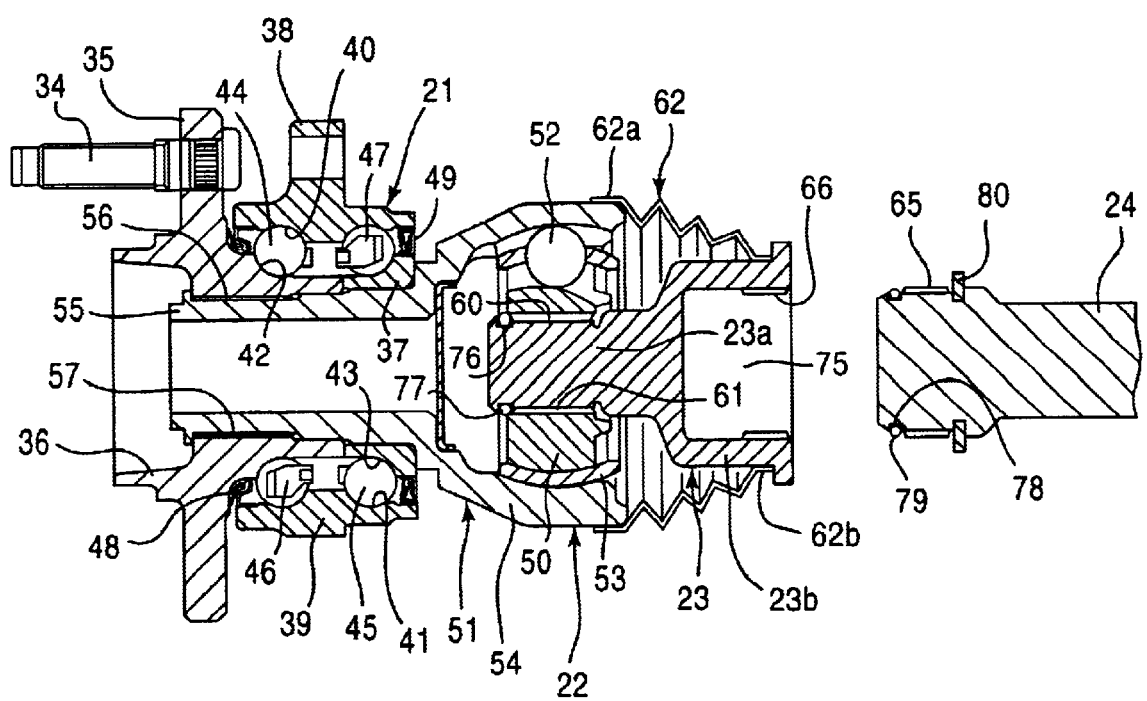
FIG. 11 is a cross-sectional view illustrating the drive wheel bearing assembly of FIG. 10 from which the intermediate shaft is dismounted.

Now, shown in FIG. 10 is another embodiment having a structure in which the stem portion 55 of the outer joint ring 51 is made hollow, and the edge portion of the stem portion 55 of the outer joint ring 51 inserted into the bore of the hub ring 36 is caulked for connection. In this embodiment, the same components as those of the embodiment of FIG. 1 are given the same reference numerals and are not repeatedly explained. FIG. 10 illustrates the embodiment with the intermediate shaft 24 being mounted, and FIG. 11 illustrates the embodiment with the intermediate shaft 24 being dismounted.

In the bearing assembly according to this embodiment, the stem portion 55 of the outer joint ring 51 is made hollow, with the serrations 56 being formed on the outer diameter portion thereof and the serrations 57 being formed on the inner diameter portion of the bore of the hub ring 36. The stem portion 55 is inserted into the bore of the hub ring 36 to allow both the serrations 56, 57 to mate with each other, whereby the outer joint ring 51 and the hub ring 36 are connected to each other so as to transmit torque therebetween.

In addition, the hub ring 36 and the outer joint ring 51 of the constant velocity universal joint 22 are connected by caulking the edge portion of the stem portion 55 which is inserted into the bore of the hut ring 36. The caulking is made possible by plastically deforming the edge portion of the stem portion 55 radially outwards or by forming projections and depressions on the outer circumference portion on the edge of the stem portion 55 such as by threading, serrating, or knurling, the projections and depressions being, for example, plastically enlarged in diameter outwardly from the inner diameter toward the outer diameter side. Making the stem portion 55 hollow as such will provide advantages such as a reduction in weight of the assembly and an improvement in the condition of heat dissipation.

Incidentally, though not shown, with the solid stem portion 55, it is possible to connect the hub ring 36 to the outer joint ring 51 by forming a male thread on the outer diameter portion of the edge of the axial portion to fasten a fixing nut onto the male thread. Incidentally, the hub ring 36 and the outer joint ring 51 can be integrated not only by a nut but also by a bolt.

The stub shaft 23 according to this embodiment is arranged concentrically with the constant velocity universal joint 22, also comprising a reduced diameter portion 23a connected to the inner joint ring 50 of the constant velocity universal joint 22, and an enlarged diameter portion 23b having a hollow portion 75 and extending integrally axially from the reduced diameter portion 23a to be enlarged in diameter. The serrations 60, 61 are formed which extend axially on the outer diameter portion of the reduced diameter portion 23a of the stub shaft 23 and on the inner diameter portion of the inner joint ring 50 of the constant velocity universal joint 22, respectively. The reduced diameter portion 23a of the stub shaft 23 is inserted into the inner joint ring 50 of the constant velocity universal joint 22 to allow the serrations 60, 61 to mate with each other, thereby making it possible to transmit torque between the stub shaft 23 and the inner joint ring 50 of the constant velocity universal joint 22.

An annular groove 76 is formed circumferentially on the edge portion of the serrations 60 of the stub shaft 23, and a protruding member or a clip 77 is accommodated in the annular groove 76. The clip 77 stands radially above the outer diameter portion of the reduced diameter portion 23a of the stub shaft 23, thereby allowing the clip 77 to engage the edge portion of the serrations 61 of the inner joint ring 50 and thus the stub shaft 23 to be prevented from moving axially relative to the inner joint ring 50. Accordingly, the serrations 60, 61 of the stub shaft 23 and the inner joint ring 50, and the clip 77 allow the stub shaft 23 and the constant velocity universal joint 22 to be connected to each other.

In this embodiment, the boot 62 is also mounted to between the outer joint ring 51 of the constant velocity universal joint 22 and the stub shaft 23. A reduced diameter portion 62b of the boot 62 is fixedly inserted over the outer diameter edge portion of the enlarged diameter portion 23b of the stub shaft 23, thereby reducing the difference in diameter between an enlarged diameter portion 62a of the boot 62 and the reduced diameter portion 62b and thus providing improved durability.

The intermediate shaft 24 is detachably inserted into the stub shaft 23, which has been described in the foregoing. That is, the serrations 65, 66 are formed which extend axially on the outer diameter portion of one end of the intermediate shaft 24 and on the inner diameter portion of the enlarged diameter portion 23b of the stub shaft 23, respectively. The intermediate shaft 24 is inserted into the enlarged diameter portion 23b of the stub shaft 23 to allow the serrations 65, 66 to mate with each other, thereby making it possible to transmit torque between the intermediate shaft 24 and the stub shaft 23.

An annular groove 78 is formed circumferentially on the edge portion of the serrations 65 of the intermediate shaft 24 and a clip 79 or a protruding member is accommodated in the annular groove 78. The clip 79 stands above the outer diameter portion of the intermediate shaft 24, thereby allowing the clip 79 to engage the edge portion of the serrations 66 on the enlarged diameter portion 23b of the stub shaft 23 so as to thus prevent the intermediate shaft 24 from moving axially relative to the stub shaft 23. Accordingly, the intermediate shaft 24 and the stub shaft 23 are connected to each other to make it possible to transmit torque therebetween by both the serrations 65, 66, and connected detachably by means of the clip 79. Incidentally, there is also mounted a seal member 80 on the opening end of the enlarged diameter portion 23b of the stub shaft 23 to prevent the entry of foreign matter or the like.

Said clip 79 has ends and is resilient and radially compressible, and the intermediate shaft 24 is mounted to the stub shaft 23 in the following manner. First, the clip 79 is allowed to sit in the annular groove 78 on the outer diameter portion of one end of the intermediate shaft 24. Then, the clip 79 is compressed radially against the resilience thereof when the one end of the intermediate shaft 24 is inserted into the enlarged diameter portion 23b of the stub shaft 23. When the clip 79 reaches the edge portion of the serrations 66 of the stub shaft 23 by inserting the intermediate shaft 24 into the stub shaft 23, the clip 79 returns to the released initial condition from the radially compressed condition due to the resilience thereof and engages the edge portion of the serrations 66, thereby preventing the intermediate shaft 24 from being axially moved.

Figure 12:
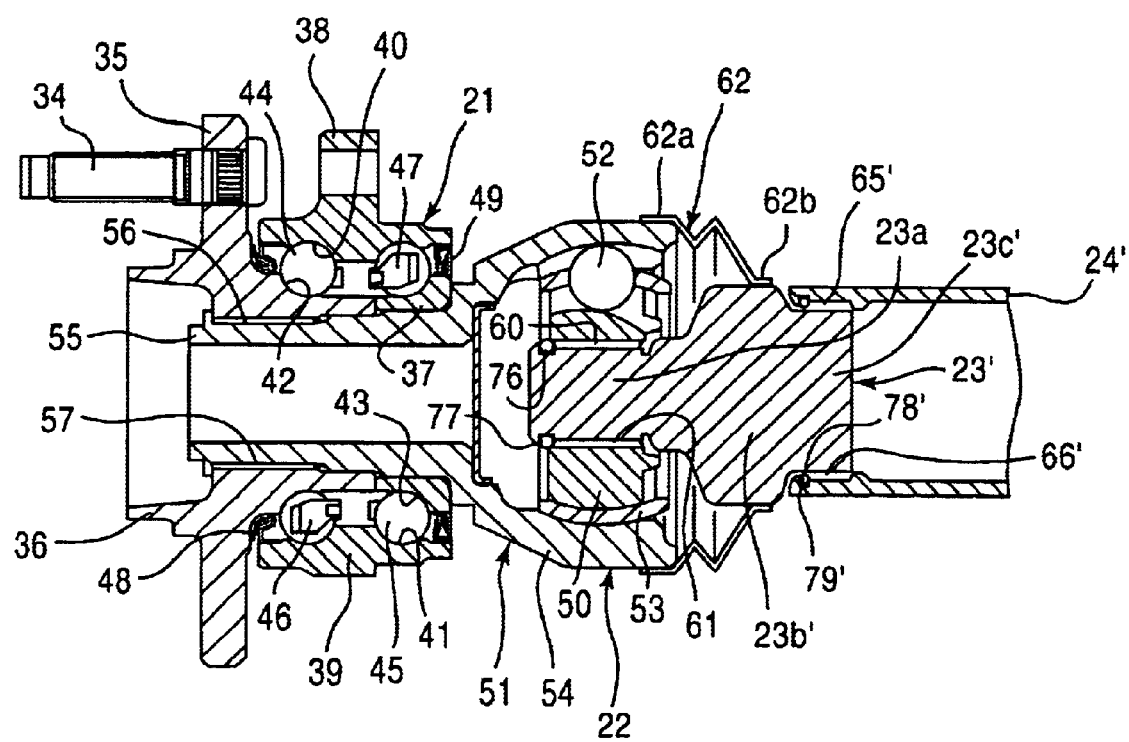
FIG. 12 is a cross-sectional view illustrating another embodiment according to the present invention.
Figure 13:
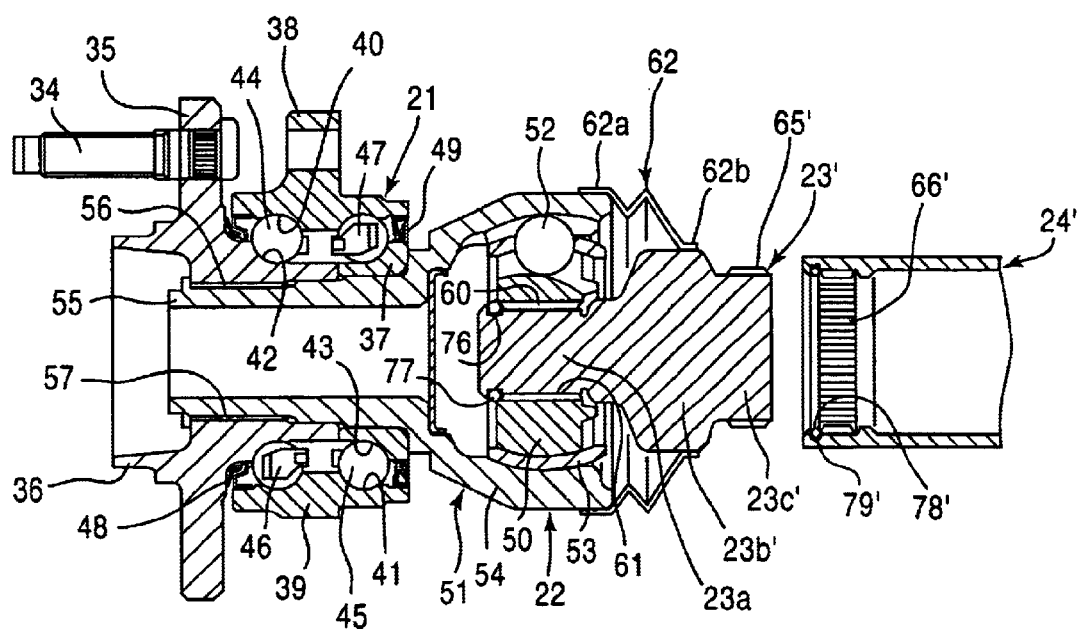
FIG. 13 is a cross-sectional view illustrating the drive wheel bearing assembly of FIG. 12 from which the intermediate shaft is dismounted.

FIGS. 12 and 13 are views of an assembly according to another embodiment of the present invention, illustrating the assembly to which an intermediate shaft 24' is mounted and the assembly to which the intermediate shaft 24' is dismounted, respectively. The embodiment of FIGS. 12 and 13 is different from that of FIGS. 10 and 11 only in a stub shaft 23' inserted into the inner joint ring 50 of the constant velocity universal joint 22 and the intermediate shaft 24'. Other components are the same as those of FIGS. 10 and 11, thus being given the same reference symbols and not repeatedly described.

The stub shaft 23' has an enlarged diameter portion 23b' generally on the axially central portion thereof, and the reduced diameter portion 62b of the boot 62 is fixedly inserted over the outer diameter portion of the enlarged diameter portion 23b'. In addition, the intermediate shaft 24' is hollowed, and serrations 65', 66' are formed which extend axially on the inner diameter portion of one end of the intermediate shaft 24' and on the outer diameter portion of an edge portion 23c' of the stub shaft 23', respectively. The intermediate shaft 24' is inserted over the edge portion 23c' of the stub shaft 23' to allow the serrations 65', 66' to mate with each other, thereby making it possible to transmit torque between the intermediate shaft 24 and the stub shaft 23'.

In addition, an annular groove 78' is formed circumferentially on the edge portion of the serrations 65' of the intermediate shaft 24', and a clip 79' or a protruding member is accommodated in the annular groove 78'. The clip 79' stands above the outer diameter portion of the intermediate shaft 24', thereby allowing the clip 79' to engage the edge portion of the serrations 66' on the edge portion 23c' of the stub shaft 23, so as to prevent the intermediate shaft 24' from moving axially relative to the stub shaft 23'. Accordingly, the intermediate shaft 24' and the stub shaft 23' are connected to each other to make it possible to transmit torque therebetween by the serrations 65', 66', also connected detachably by means of the clip 79'.

In this embodiment, the stub shaft 23 (23') is integrated with the constant velocity universal joint 22 to unitize the wheel bearing 21, the constant velocity universal joint 22, the stub shaft 23 (23'), and the boot 62. This allows the intermediate shaft 24 (24') to be mounted to the stub shaft 23 (23') upon assembling the components, also allowing the intermediate shaft 24 (24') to be dismounted from the stub shaft 23 (23') upon repair or replacement of the boot.

Furthermore, the serrations formed on the outer diameter portion of the reduced diameter portion 23a of the stub shaft 23 (23') are made larger in diameter than those formed on the inner diameter portion (the outer diameter portion of the edge portion 23c') of the enlarged diameter portion 23b of the stub shaft 23 (23'), thereby allowing the teeth to be increased in number and the capacity of torque transmission to be increased at the coupling portion between the stub shaft 23 (23') and the intermediate shaft 24 (24'). This in turn allows the engagement width of the serrations on the inner diameter portion (the outer diameter portion of the edge portion 23c') of the enlarge diameter portion 23b of the stub shaft 23 (23') to be reduced and the axial dimension of the assembly to be made smaller.

Figure 14:
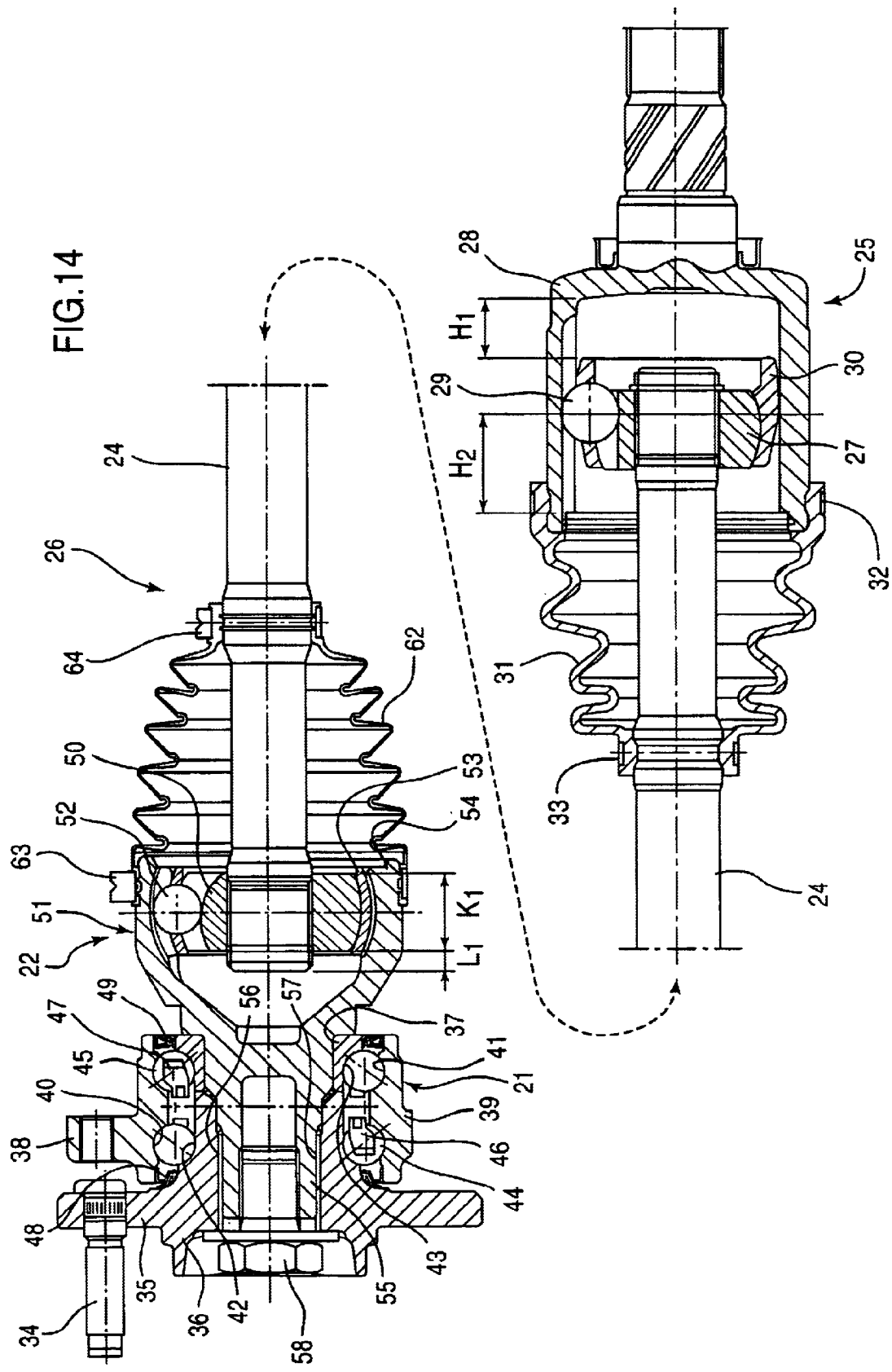
FIG. 14 is a cross-sectional view illustrating a drive wheel bearing assembly according to an embodiment of the present invention.

Now, another embodiment according to the present invention is shown in FIG. 14. Incidentally, in this embodiment, the same components as those of FIG. 1 are also given the same reference symbols and are not repeatedly described. The so-called "plunging" of said sliding type constant velocity universal joint 25 serves to absorb the axial displacement. In contrast, the fixed type constant velocity universal joint 22 is allowed only angular displacement.

This embodiment provides a structure in which the inner joint ring 50 of the fixed type constant velocity universal joint 22 is mounted to one end of the intermediate shaft 24. In addition, the boot 62 is provided between the outer joint ring 51 and the intermediate shaft 24 to prevent foreign matter from entering the fixed type constant velocity universal joint 22 and the leakage of the grease filled therein. The boot 62 may be formed of resin as well as rubber. A resinous boot is preferable to a rubber boot in that the resinous boot would provide higher surface hardness to prevent a decrease in life caused by damage such as cracks or scratches, thus providing improved durability.

In the sliding type constant velocity universal joint 25 located on the inboard side, the plunging is set in a manner such that the bottom portion of the outer joint ring 28 will not usually interfere with the sliding portion (the retainers 30 for the double offset type and the roller members for the tripod type) at the minimum operative angle, for example, when the vehicle bounds, while said sliding portion will not dislodge from the track groove of the outer joint ring 28 at the maximum operative angle, for example, when the vehicle is jacked up. An increase in plunging would cause not only an increase in weight but also the allowable operative angle to be decreased and the performance to be degraded. For these reasons, the plunging is made as small as possible in consideration of fabrication tolerances.

In this embodiment, it is necessary to set the allowable plunging $H_1$ leading to the bottom portion of the outer joint ring 28 of said sliding type constant velocity universal joint 25 at least to the width $K_1$ of the inner joint ring 50 of said fixed type constant velocity universal joint 22 at the minimum operative angle of the sliding type constant velocity universal joint 25.

As shown in FIG. 14, said allowable plunging $H_1$ is a distance over which said sliding portion moves to interfere with the bottom portion of the outer joint ring 28 at the minimum operative angle of the sliding type constant velocity universal joint 25, that is, under the condition that the sliding portion (the torque transmission bearing balls 29 and the retainers 30) of the sliding type constant velocity universal joint 25 approaches the bottom portion of the outer joint ring 28 as close as possible. In this embodiment, the allowable plunging $H_1$ is set to a dimension $(K_1+L_1)$, which is equal to the width $K_1$ of the inner joint ring 50 of the fixed type constant velocity universal joint 22 added to a projection $L_1$ above the edge surface of said inner joint ring 50 of the intermediate shaft 24.

This makes it possible to dismount the intermediate shaft 24 from the inner joint ring 50 of the fixed type constant velocity universal joint 22 by sliding the sliding portion of the sliding type constant velocity universal joint 25 in an axially inboard direction by the amount of the allowable plunging $H_1$ without dismounting the drive shaft 26 from the vehicle body.

Incidentally, the allowable plunging $H_1$ is not only of the type of the intermediate shaft 24 protruding from the edge portion of the inner joint ring 50 as employed in this embodiment, but also of the type of the intermediate shaft 24 not protruding from the edge portion of the inner joint ring 50, that is, the type of the intermediate shaft 24 coupled to the inner joint ring 50 by a snap clip on the midway of the serrations on the inner joint ring 50. In addition, since the allowable plunging $H_1$ is usually provided with a slight allowance, the intermediate shaft 24 can be dismounted if at least the width $K_1$ of the inner joint ring 50 is available at the minimum operative angle as described above.

On the other hand, an allowable plunging $H_2$ is set beyond which the center of the torque transmission bearing balls 29 goes off the track groove at the opening edge portion of the outer joint ring 28 at the maximum operative angle of the sliding type constant velocity universal joint 25. This prevents the sliding portion of the sliding type constant velocity universal joint 25 from being dislodged from the outer joint ring 28 at the maximum operative angle such as upon jacking up the vehicle.

Incidentally, in the embodiment described above, such a case is explained in which the hub ring 36 of the wheel bearing 21 and the outer joint ring 51 are bolted to each other. In addition to this, it is also possible to employ such a structure in which the stem portion 55 of the outer joint ring 51 is made hollow to communicate with the house portion 54, and the edge portion of the stem portion 55 of the outer joint ring 51 inserted into the bore of the hub ring 36 is caulked for connection.

Figure 15:
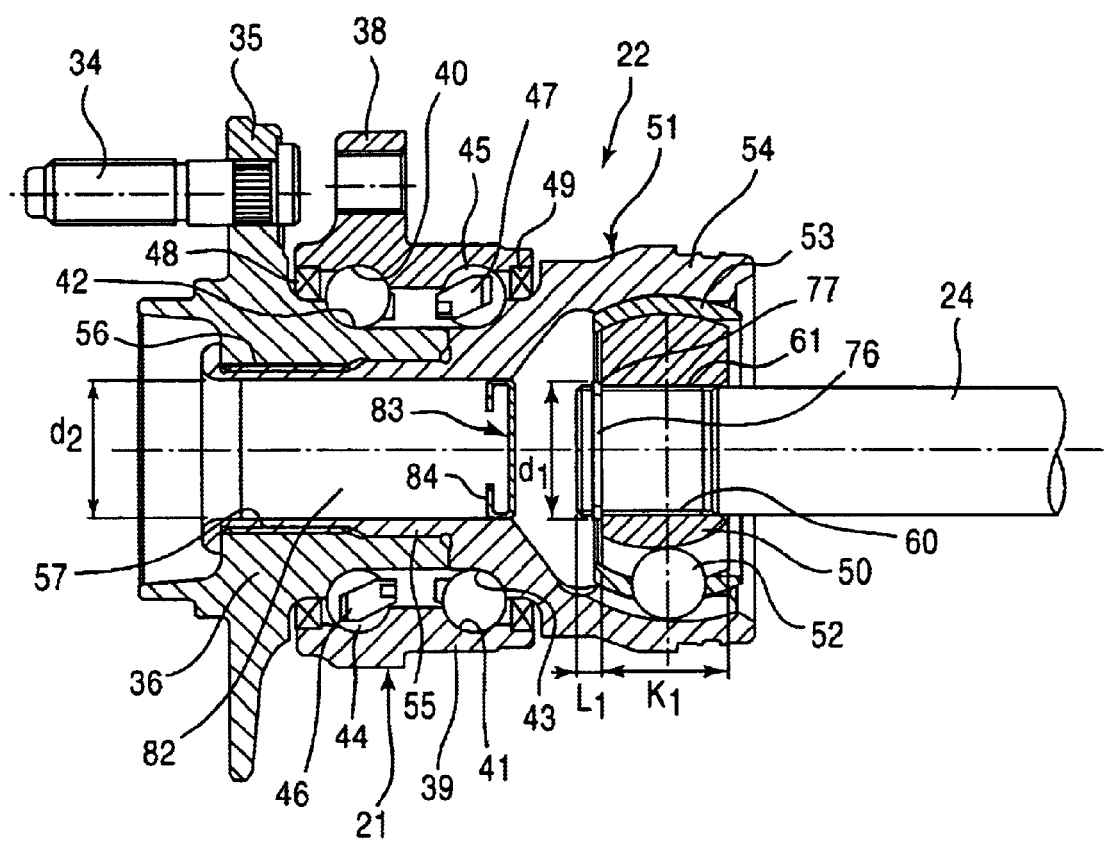
FIG. 15 is a cross-sectional view illustrating an example in which the stem portion of the fixed type constant velocity universal joint is made hollow and caulked to be connected to the hub ring.
Figure 16:
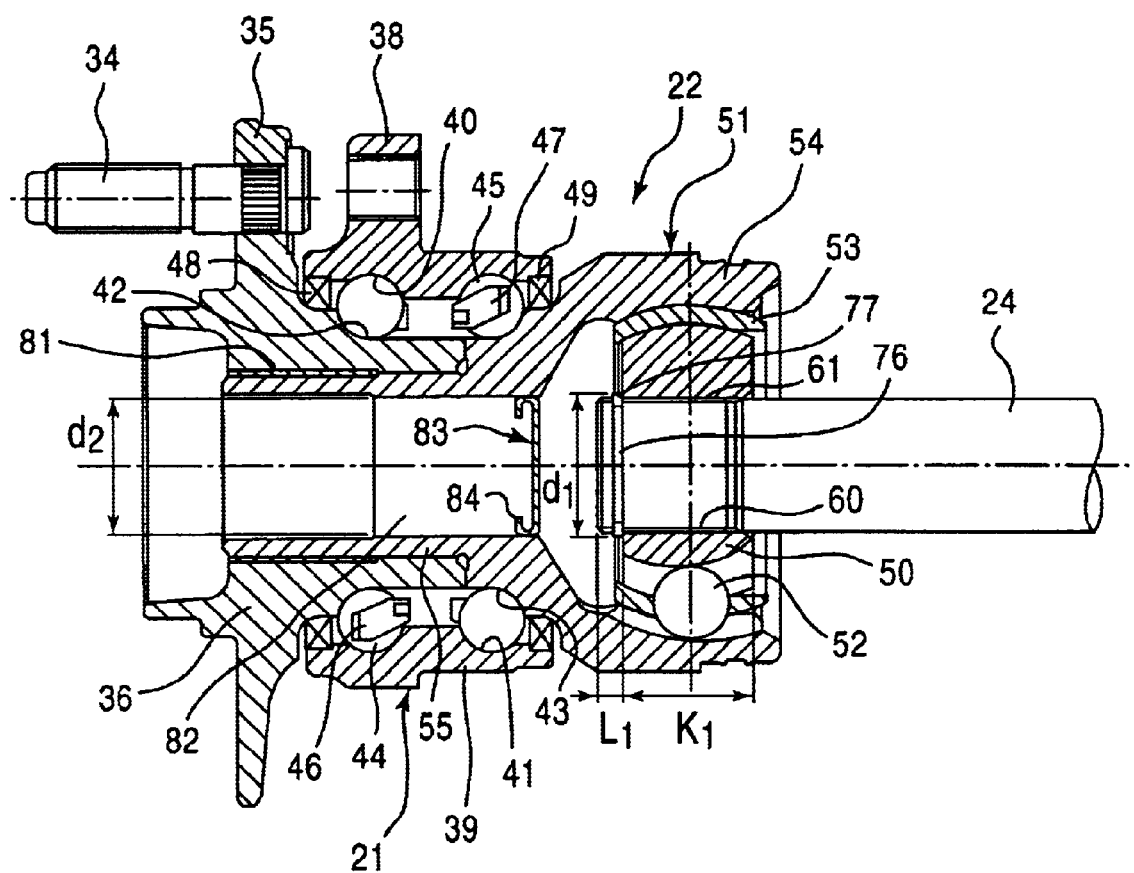
FIG. 16 is a cross-sectional view illustrating another example in which the stem portion of the fixed type constant velocity universal joint is made hollow and caulked to be connected to the hub ring.

The caulking shown in FIG. 15 illustrates a case where the edge portion of the stem portion 55 of the outer joint ring 51 is plastically deformed radially outwards. In addition, the caulking shown in FIG. 16 illustrates a case where a portion 81 of projections and depressions is formed on the outer circumference portion on the edge of the stem portion 55 such as by threading, serrating, or knurling, and the portion 81 of projections and depressions is, for example, plastically enlarged in diameter outwardly from the inner diameter toward the outer diameter side. Making the stem portion 55 of the outer joint ring 51 hollow will provide advantages such as improvements in fuel consumption resulted from the reduction in weight of the assembly and in heat dissipation to prevent an increase in temperature due to driving. Incidentally, the hollow portion of the stem portion 55 allows a shaft bore 82 to communicate with the bottom portion of the house portion 54.

Figure 17A:
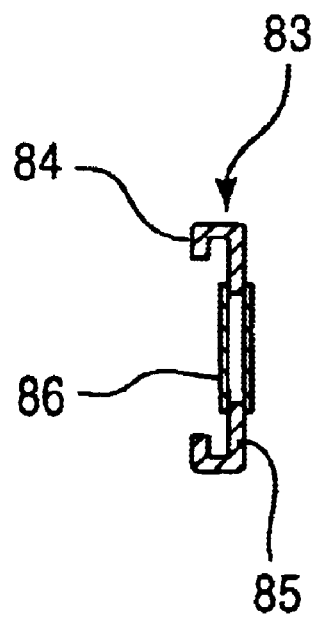
FIG. 17(a) is a cross-sectional view illustrating an example of an end cap.
Figure 17B:
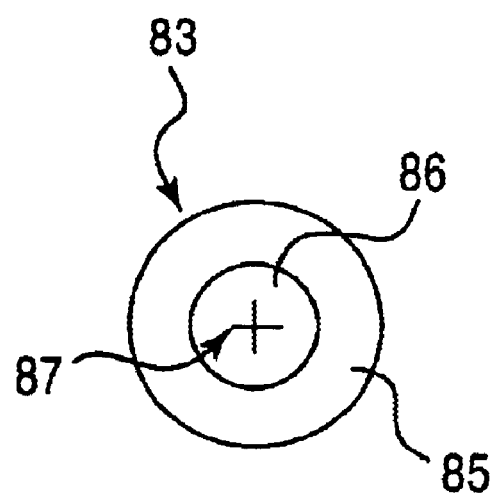
FIG. 17(b) is a side view of the end cap of FIG. 17(a)
Figure 18A:
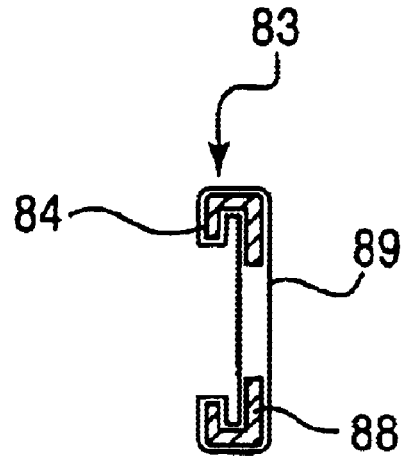
FIG. 18(a) is a cross-sectional view illustrating another example of an end cap.
Figure 18B:
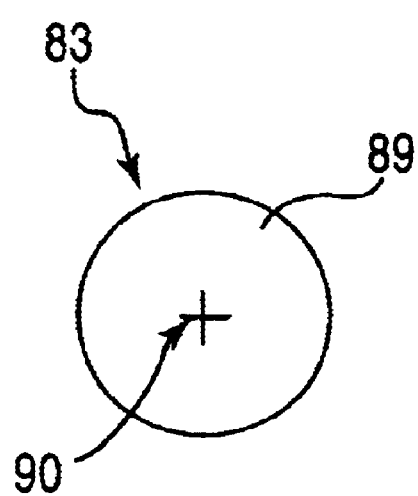
FIG. 18(b) is a side view of the end cap of FIG. 17(a)

In this embodiment, particularly when the stem portion 55 of the outer joint ring 51 is made hollow and the hollow portion (the shaft bore 82) is allowed to communicate with the inside of the house portion 54, an end cap 83 is mounted to the communicating region between the hollow portion of the stem portion 55 and the house portion 54 to prevent the leakage of the grease filled in the house portion 54. The end cap 83 is adapted to be mounted or dismounted through the hollow portion of the stem portion 55. That is, the end cap 83 is provided with an inner flange 84 having an opening on the stem portion side and can be dismounted by hooking the inner flange 84 with the hook of a jig inserted into the hollow portion. It is preferable to provide the communicating portion generally at the center of said end cap 83. For example, as shown in FIGS. 17(a) and 17(b), the communicating portion can be realized in a manner such that a hole is formed at the center of a metallic disc-shaped member 85, then an elastic body 86 formed such as of rubber for blocking the hole is attached thereto, and then a cross-shaped notch 87 is formed generally at the center of the elastic body 86. Alternatively, the communicating portion can also be realized by another structure, illustrated in FIGS. 18(a) and 18(b), in which a core metal piece 88 comprising an annular member having a hole at the center thereof is coated with an elastic body 89 formed of such as rubber with a cross-shaped notch 90 provided generally at the center thereof.

The communicating portion (notch 87 and 90) provided on the end cap 83 as such allows the fixed type constant velocity universal joint 22 to communicate with the atmosphere through the inside of the house portion 54 of the outer joint ring 51 and the hollow portion of the stem portion 55. This can prevent the boot 62 from being expanded or contracted due to a change in temperature inside the fixed type constant velocity universal joint 22, thereby making it possible to provide improved life for the boot 62.

The intermediate shaft 24 and the inner joint ring 50 are connected to each other by the serrations 60, 61, and the C-shaped clip 77 is fitted over the annular groove 76 formed on the edge portion of the intermediate shaft 24, thereby preventing the intermediate shaft 24 from dislodging from the inner joint ring 50 (refer to FIGS. 15 and 16). When the stem portion 55 of the outer joint ring 51 is made hollow to communicate with the house portion 54, it is necessary to make the inner diameter $d_2$ of the shaft bore in the stem portion 55 of the outer joint ring 51 larger than the outer diameter $d_1$ of the C-shaped dip 77. This would make it possible to allow said clip 77 to be mounted to or dismounted from the shaft bore 62 of the stem portion 55 with a tool such as snap ring pliers.

Figure 19:
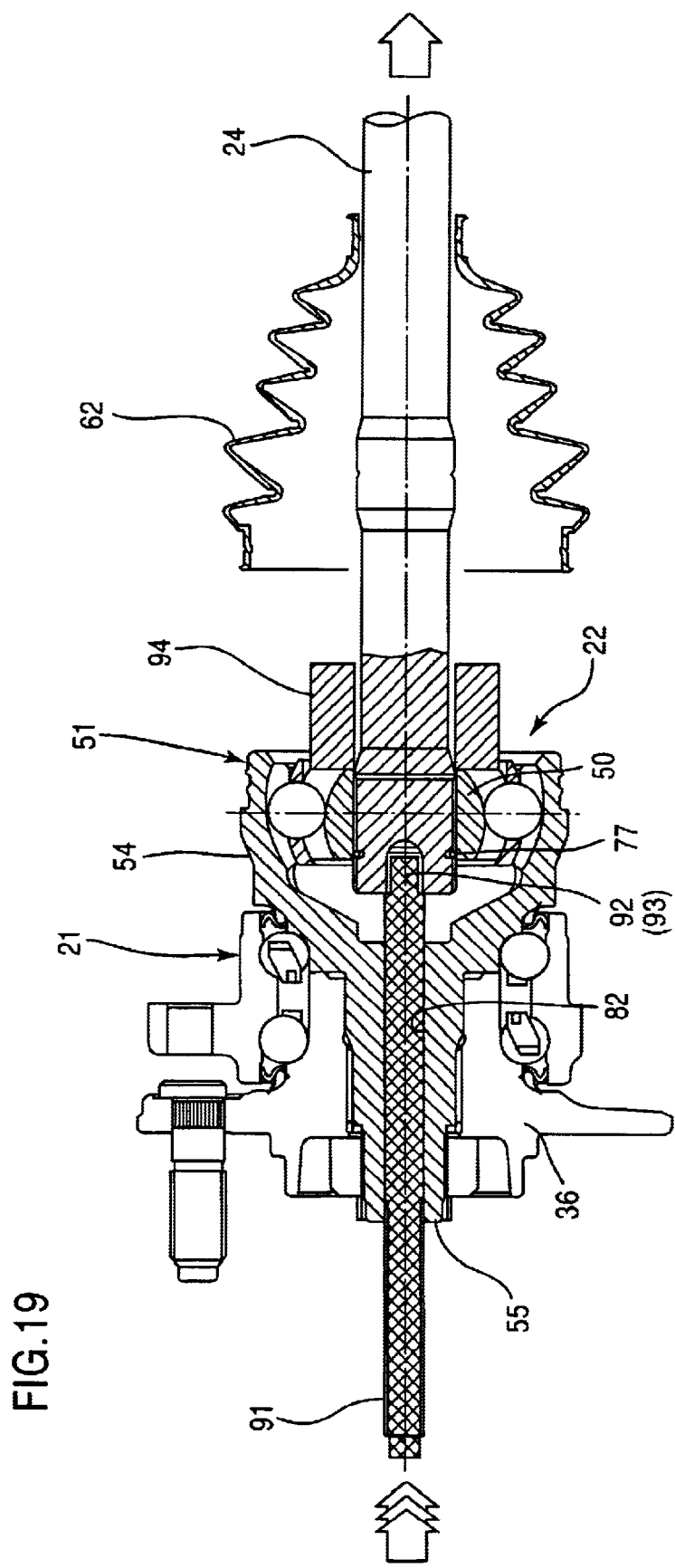
FIG. 19 is an explanatory cross-sectional view illustrating how to remove an intermediate shaft from the inner joint ring of a fixed type constant velocity universal joint.

The following procedure can be taken to dismount the intermediate shaft 24 from the inner joint ring 50, which will be explained below with reference to FIG. 19.

First, a bar-shaped tool 91 is prepared which has a diameter just enough to be inserted into the hollow portion (the shaft bore 82) in the stem portion 55 of the outer joint ring 51 and on the outer circumference portion of which a male thread is formed. In addition, there is provided a coupling assembly for connecting the tool 91 and the intermediate shaft 24 to each other. For example, the coupling assembly includes a combination of a threaded bore and a threaded shaft. That is, a threaded bore 92 is formed in the edge portion of the intermediate shaft 24, and a threaded portion 93 engageable with the threaded bore 92 is formed on one end of the tool 91.

To dismount the intermediate shaft 24 from the inner joint ring 50, the boot belts 63, 64 (refer to FIG. 14) are first removed to axially set the boot 62 aside. Then, the end cap 83 is dismounted. Subsequently, the threaded portion 93 of the tool 91 is threaded into the threaded bore 92 of the intermediate shaft 24 until the edge portion thereof reaches the bottom of the threaded bore 92. Then, the outer joint ring 51 or the inner joint ring 50 is fixed in the axial direction (in the direction of impact blow), and impact blows are applied to the tool 91 as shown by the hollow arrows to withdraw the intermediate shaft 24 from the inner joint ring 50. At this time, the inner joint ring 50 is desirably fixed, for example, with a jig 94 so as not to apply the impact blows to the inside of the joint. In this embodiment, the intermediate shaft 24 is fixedly positioned on the inner joint ring 50 by the clip 77. When applied an axial force greater than a specified value, the clip 77 is compressed radially into the annular groove 76 to allow the intermediate shaft 24 to be dislodged from the inner joint ring 50. Accordingly, since it is not necessary to dismount the clip 77 from the shaft bore 82 of the stem portion 55, the inner diameter of the shaft bore 82 may be made smaller than the outer diameter of the clip 77.

In this embodiment, the allowable plunging $H_1$, or a distance over which said sliding portion moves to interfere with the bottom portion of the outer joint ring 28, is set to the dimension (K₁+L₁) which is equal to the width K₁ of the inner joint ring 50 of the fixed type constant velocity universal joint 22 added to a projection L₁ above the edge surface of said inner joint ring 50 of the intermediate shaft 24, at the minimum operative angle of said sliding type constant velocity universal joint 25, that is, under the condition that the sliding portion (the torque transmission bearing balls 29 and the retainers 30) of the sliding type constant velocity universal joint 25 approaches the bottom portion of the outer joint ring 28 as close as possible. Accordingly, the intermediate shaft 24 can be dismounted from the inner joint ring 50 of the fixed type constant velocity universal joint 22 only by sliding the sliding portion of the sliding type constant velocity universal joint 25 in its inboard direction by the amount of the allowable plunging H₁ without dismounting the drive shaft 26 from the vehicle body. This makes it possible to replace the boot.

Figure 20:
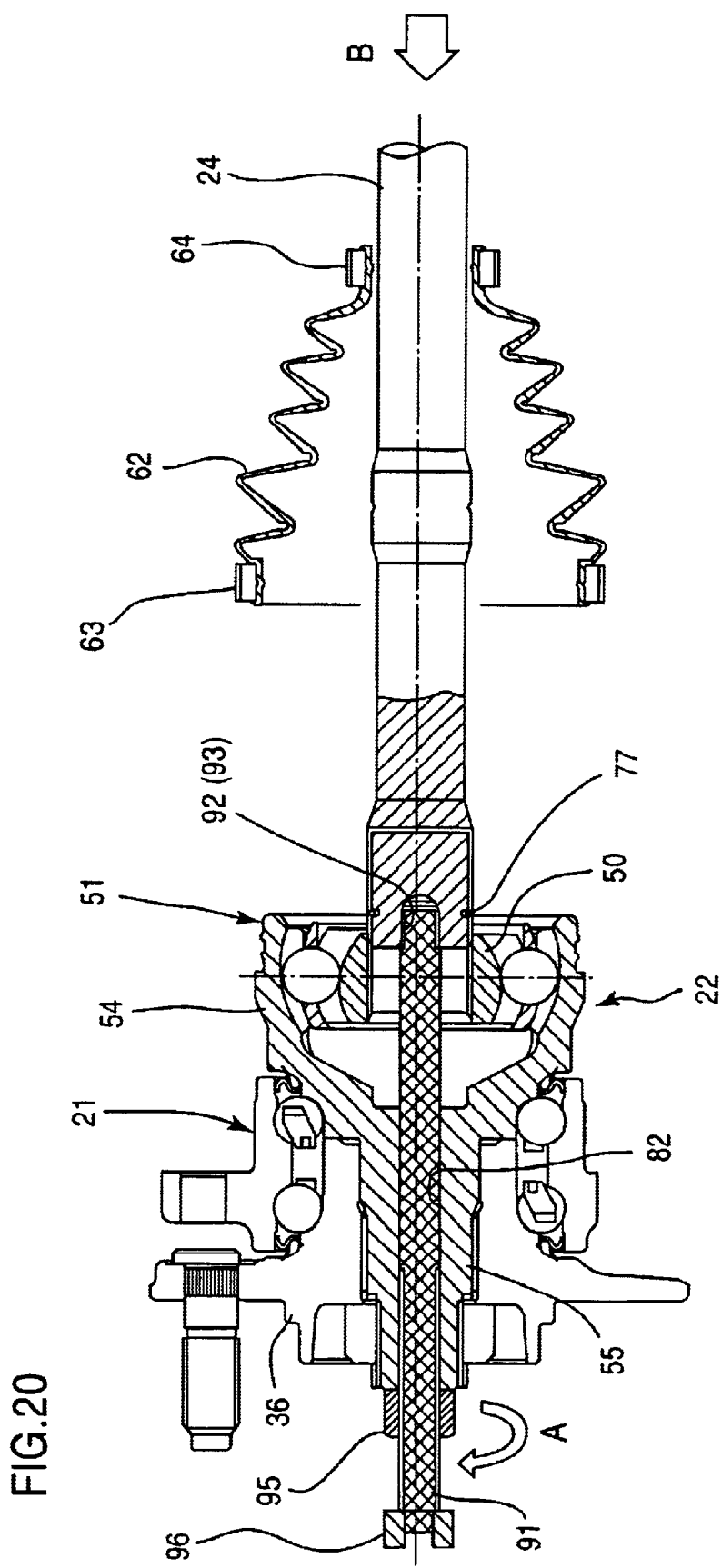
FIG. 20 is an explanatory cross-sectional view illustrating how to insert an intermediate shaft into the inner joint ring of the fixed type constant velocity universal joint.

To mount the intermediate shaft 24 to the inner joint ring 50 after the replacement of the boot 62, the boot 62 and the boot belts 63, 64 are first incorporated onto the intermediate shaft 24 as shown in FIG. 20 and then the serrations of the intermediate shaft 24 are allowed to engage the inner joint ring 50. Then, the tool 91 is inserted into the hollow portion (the shaft bore 82) of the stem portion 55 from the hub ring 36 side to thread the threaded portion 93 of the edge thereof into the threaded bore 92 of the intermediate shaft 24. Subsequently, a nut 95 is threaded into the end of the stem portion 55 of the outer joint ring 51. With the tool 91 being held with a spanner 96 or the like in the rotational direction as shown by the hollow arrow A, threading the nut 95 further onto the tool 91 will cause the intermediate shaft 24 to be pulled in conjunction with the tool 91 toward the nut 95 as shown by the hollow arrow B. This causes the serrations of the intermediate shaft 24 to be inserted into the inner joint ring 50, and the clip 77 retained in the annular groove 76 of the intermediate shaft 24 springs out radially to allow the inner joint ring 50 to be positioned in place. Then, grease is sealed within the joint and the end cap 83 is attached in place. Finally, the boot 62 is moved to be fastened by the boot belts 63, 64, and thus the assembly is completed.

Incidentally, the foregoing embodiments are given a structure in which said wheel bearing 21 has the inner ring 37 separated from the hub ring 36 fitted over the shoulder of the outer joint ring 51. In addition to this structure, for example, applicable to the embodiments are a structure in which the inboard race 43 of the plurality of inner races 42, 43 is formed directly on the shoulder of the outer joint ring 51, or a structure in which the inner ring 37 having the inboard race 43 formed thereon is press fitted over the outer diameter portion of the edge of the hub ring 36. Furthermore, the hub ring 36 of the wheel bearing 21 and the outer joint ring 51 can be bolted or caulked to each other as described in the foregoing. Alternatively, such a nut connection structure is also applicable, so long as the stem portion 55 of the outer joint ring 51 is solid, in which a male thread can be formed on the outer diameter portion of the edge of the stem portion 55 to allow a fixing nut to be threaded tightly onto the male thread, thereby connecting the hub ring 36 and the outer joint ring 51 to each other.

Now, other embodiments of the drive wheel bearing assembly according to the present invention are explained below with reference to FIGS. 21 to 39.

Figure 21:
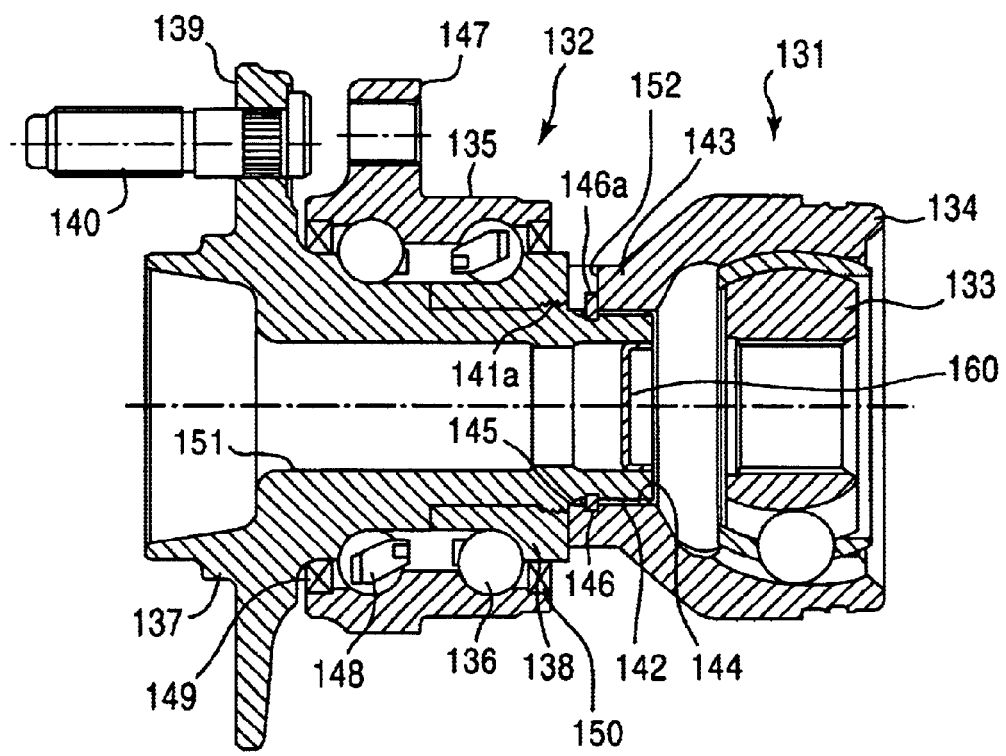
FIG. 21 is a cross-sectional view illustrating a drive wheel bearing assembly according to an embodiment of the present invention.

Referring to FIG. 21, reference number 131 designates a fixed type constant velocity universal joint and reference number 132 designates a wheel bearing. The edge portion of a drive shaft (an intermediate shaft), not illustrated, is serration engaged with the inner circumference surface of an inner joint ring 133 of the constant velocity universal joint 131, while the outer circumference surface of an outer joint ring 134 of the constant velocity universal joint 131 is covered with a boot, not illustrated, up to the drive shaft. On the other hand, the wheel bearing 132 comprises an outer ring 135 held on the vehicle body side via a knuckle, and a hub ring 137 and an inner ring 138, which are concentrically rotatably fitted into the outer ring 135 via a plurality of rows of rollers 136. The hub ring 137 and the inner ring 138 are formed of separate members to accommodate the rollers 136 and are integrated with each other by plastic coupling as described later. On the outer circumference surface outboard of the hub ring 137, a wheel mounting flange 139 is provided integrally therewith which extend radially outwards. A wheel rib, not illustrated, is mounted to the wheel mounting flange 139 by hub bolts 140 provided circumferentially at regular intervals on the rim portion of the wheel mounting flange 139 and tapered nuts (not shown).

Figure 22A:
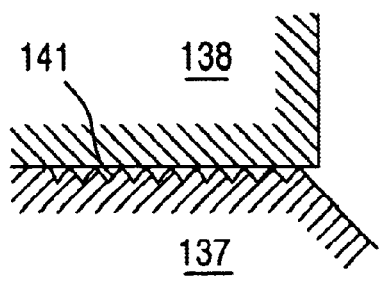
FIGS. 22(A) and (B) are cross-sectional views illustrating the engagement surfaces of the hub ring and the inner ring of FIG. 21, where
Figure 22B:
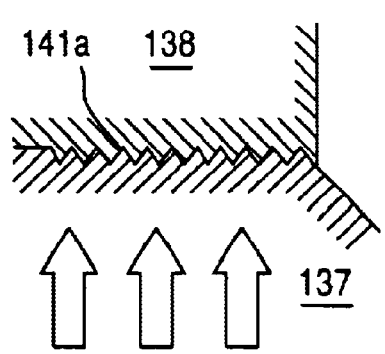

As described above, the present invention provides basically the wheel bearing 132 with a structure for connecting the inner ring 138 to the hub ring 137 and a structure for coupling the wheel bearing 132 to the constant velocity universal joint 131. In the former structure, there are formed a series of projections and depressions 141 (arbitrary projections and depressions such as in the shape of knurled lines, threads, serrations, or splines) on the outer circumference surface of the hub ring 137 as shown in FIG. 22(A). The hub ring 137 is pressurized from the inner diameter side to expand radially as shown in FIG. 22(B) in the final step of the assembly of the wheel bearing 132, thereby allowing said series of projections and depressions 141 to tightly engage the inner circumference surface of the inner ring 138 for plastic connection therebetween. The preload of the rollers 136 is so set as to be optimum at the time of completion of this plastic connection. Incidentally, to improve the engagement of the projections and depressions 141, the projections and depressions 141 may be given a relatively higher hardness than the counterpart by machine hardening, heat treatment or the like.

The structure for coupling the hub ring 137 and the inner ring 138 includes a structure of one type which allows the inner ring 138 to engage the outer circumference surface of the hub ring 137 as shown in FIG. 21 and a structure of the other type which allows the inner ring 138 to engage the inner circumference surface of the hub ring 137 like the wheel bearing 132, to be described later, shown in FIGS. 25 and 26. The projections and depressions 141 can be formed on one of or both of the engagement surfaces of the hub ring 137 and the inner ring 138 to allow the engagement surfaces to expand or contract radially, thereby making it possible to connect the both surfaces to each other plastically.

Now, in the latter structure for coupling the wheel bearing 132 and the constant velocity universal joint 131 to each other, the edge portion outboard of the hub ring 137 exceeds beyond the inner ring 138, and serrations 142 formed on the outer circumference surface of this extended portion engage serrations 144 formed on the inner circumference surface of a stem portion 143 which serves as a drive shaft of the outer joint ring 134 of the constant velocity universal joint 131.

Annular grooves 145 are formed circumferentially across the serrations 142, 144, and a C-shaped keeper ring 146 sits across these inner and outer annular grooves 145 to fit therein. The keeper ring 146 prevents the outer joint ring 134 of the constant velocity universal joint 131 from being axially dislodged from the serrations 142 of the hub ring 137.

A pair of open ends 146a of the keeper ring 146 are compressed radially to be inserted into a notch 152 formed on the edge surface of the stem portion 143. The pair of the open ends 146a are circumferentially brought into close proximity to each other to compress the keeper ring 146 radially, thereby allowing the outer member 134 of the constant velocity universal joint 131 to be readily dismounted axially from the male serrations 142 of the hub ring 137.

Incidentally, referring to FIG. 21, reference number 147 designates a vehicle mounting flange formed in one piece on the outer circumference surface of the outer ring 135 to mount to a knuckle, reference number 148 designates retainers for retaining the rollers 136 at regular intervals, and reference numbers 149, 150 designate seals arranged on the both sides of the plurality of rows of the rollers 136 to seal the radial clearance between the outer ring 135 and the hub ring 137, and the radial clearance between the outer ring 135 and the inner ring 138. The hub ring 137 is provided with a bore 151 which is sealed with a cap 160 or the like to prevent the entry of dust particles.

Figure 23:
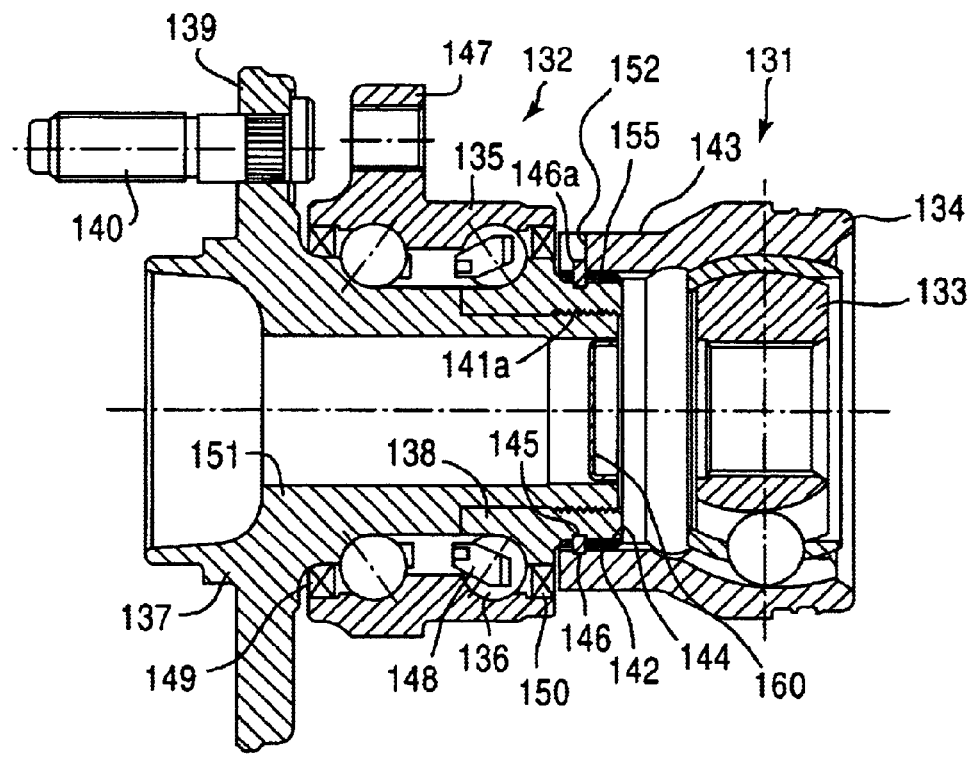
FIGS. 23 to 35 are cross-sectional views illustrating drive wheel bearing assemblies according to other embodiments of the present invention.

Now, according to an embodiment shown in FIG. 23, the edge portions inboard of the hub ring 137 and the inner ring 138 are aligned to be substantially coplanar with each other, and serrations 155 for engaging the serrations 144 provided on the inner circumference surface of the stem portion 143 of the constant velocity universal joint 131 are formed on the outer circumference surface inboard of the inner ring 138. A plastic engagement portion 141a between the hub ring 137 and the inner ring 138 provided by the projections and depressions 141 and the keeper ring 146 are the same as those of FIG. 21. Incidentally, the cap 160 is fitted into the opening end inboard of the bore 151 of the hub ring 137, thereby preventing dust particles or the like from entering the constant velocity universal joint 131.

Figure 24:
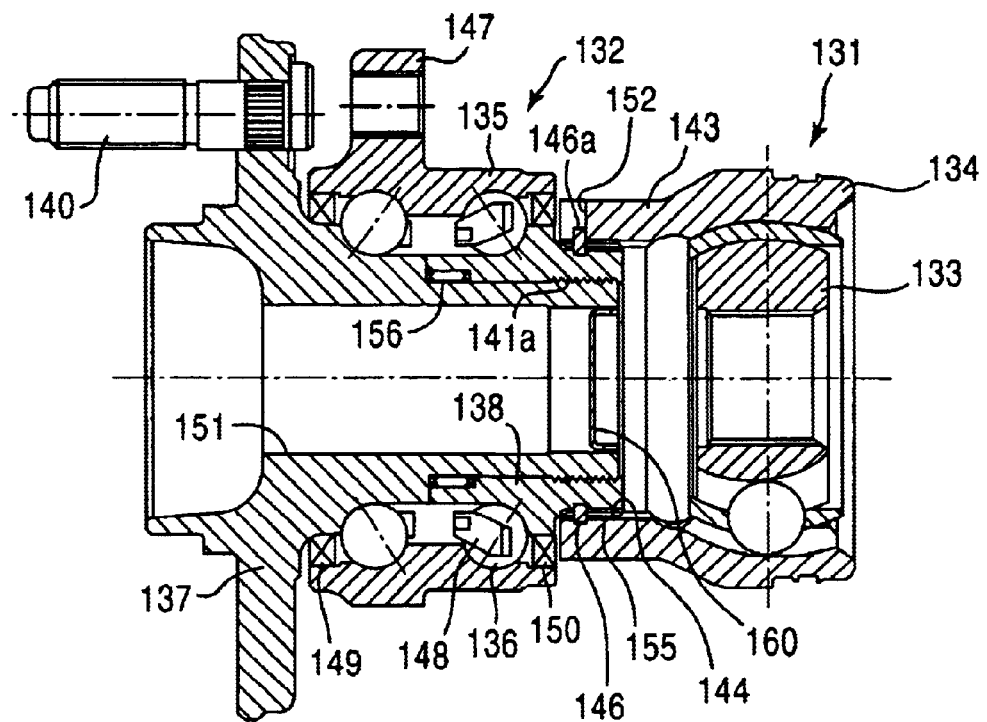

An embodiment illustrated in FIG. 24 is the embodiment of FIG. 23 to which a serration engagement portion 156 is added. The serration engagement portion 156 comprises the serrations 155 formed on the middle portion of the outer circumference surface of the hub ring 137 and the serrations 144 formed on the inner circumference surface of the edge portion outboard of the inner ring 138. The torque transmitted to the inner ring 138 via the serrations 144, 155 is transmitted to the hub ring 137 not only through the engagement portion 141a but also through the serration engagement portion 156. Thus, the serration engagement portion 156 serves to increase the capacity of torque transmission and to reduce the load of torque on the engagement portion 141a to provide improved reliability of the bearing. The plastic engagement portion 141a between the hub ring 137 and the inner ring 138 provided by the projections and depressions 141 and the keeper ring 146 are the same as those of FIGS. 21 and 23. Incidentally, the cap 160 or the like blocks the opening end inboard of the bore 151 of the hub ring 137.

Incidentally, according to the aforementioned three embodiments (FIGS. 21, 23, and 24), the serrations 142, 144, 155 are made larger in diameter than the inner diameter of the bore 151 of the hub ring 137. Accordingly, although the length of the serrations is limited in the axial direction, the serrations 142, 144, 155 can carry a substantially sufficient capacity of torque transmission.

Figure 25:
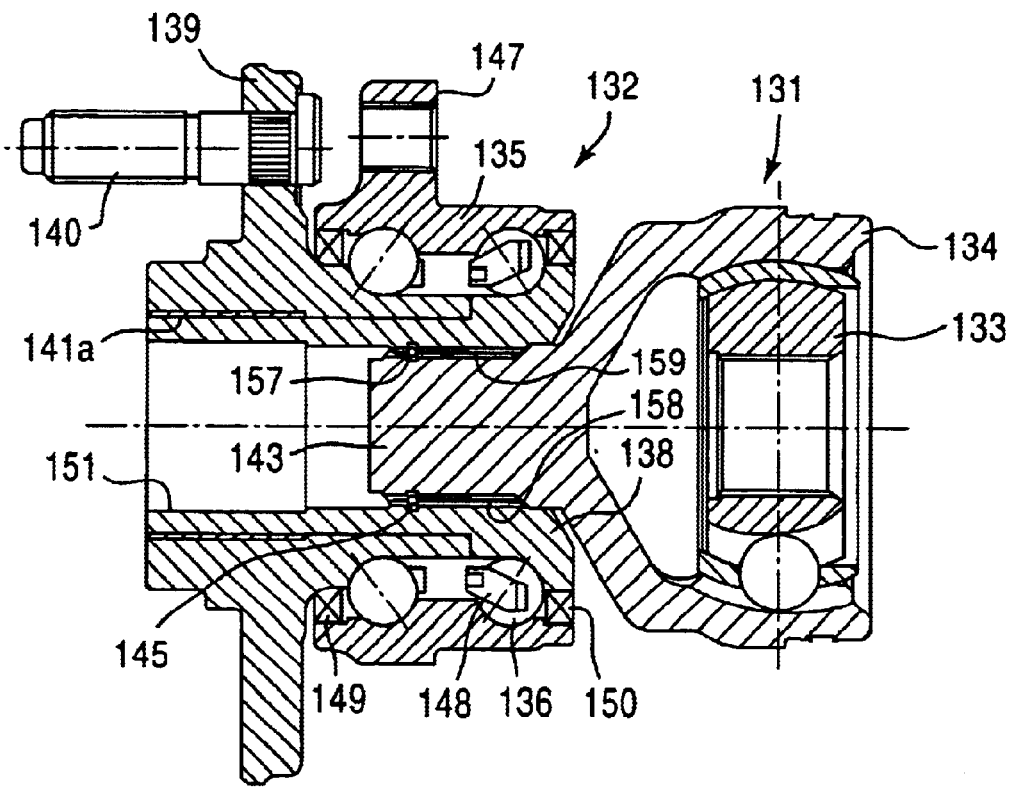

Now, according to an embodiment illustrated in FIG. 25, the inner ring 138 is adapted to extend widely over the entire width from its inboard to outboard side. The outer circumference surface of the inner ring 138 engages the inner circumference surface of the hub ring 137 at the plastic engagement portion 141a. In addition, the outer circumference surface of the stem portion 143 of the constant velocity universal joint 131 is serration engaged with the inner circumference surface of the inner ring 138. The annular grooves 145 are formed circumferentially across the serrations 158, 159 for serration engagement, and a keeper ring 157 sits across these inner and outer annular grooves 145 to fit therein. The keeper ring 157 is circularly shaped in cross section since it cannot be reached from outside. Application of specified forces, axially opposite to each other, to the wheel bearing 132 and the stem portion 143 will cause the keeper ring 157 to expand radially by itself, thus allowing the wheel bearing 132 to be dismounted from the stem portion 143.

Figure 26:
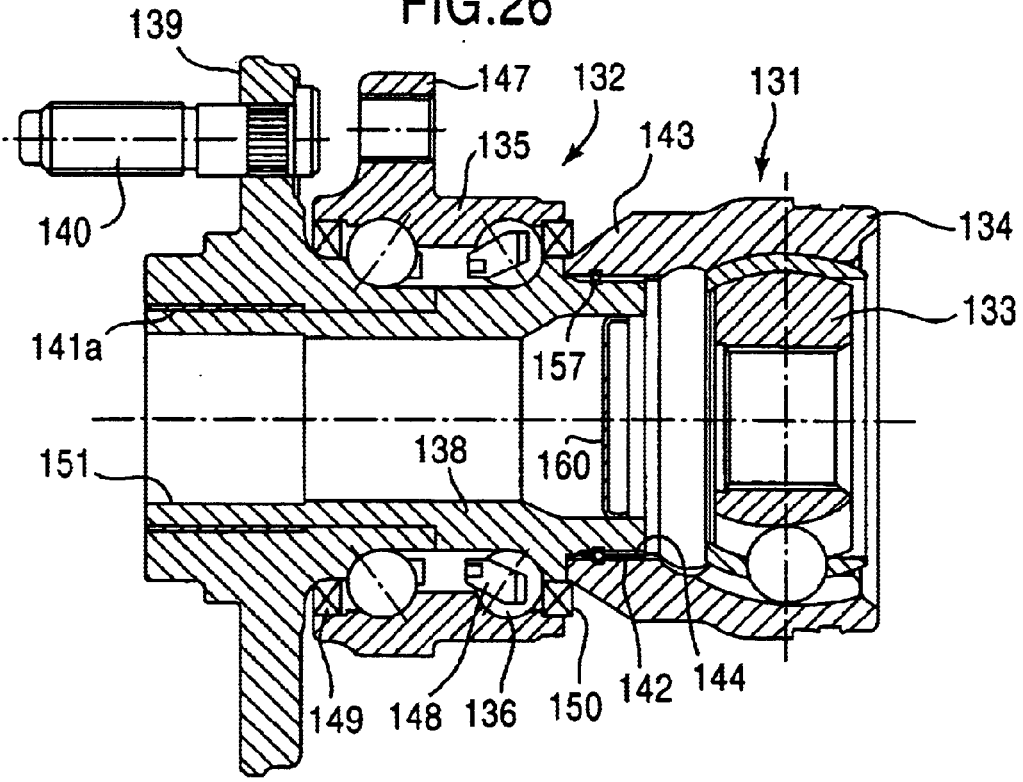

An embodiment illustrated in FIG. 26 can be taken as a modified example of the embodiment of FIG. 23 from the viewpoint of the serration engagement (by the serrations 142, 144) between the inner ring 138 and the stem portion 143. On the other hand, from the viewpoint of the plastic engagement portion 141a, the embodiment of FIG. 26 can be taken as a modified example of the embodiment of FIG. 25.

That is, according to the embodiment illustrated in FIG. 23, there is provided a clearance between the edge surface outboard of the stem portion 143 of the constant velocity universal joint 131 and the inner ring 138, and the notch 152 is formed on the stem portion 143 to allow the keeper ring 146 to be reached. On the other hand, according to the embodiment illustrated in FIG. 26, the outer diameter of the stem portion 143 of the constant velocity universal joint 131 is tapered down in its outboard direction, and the end of the tapered portion is brought into contact with the aide of the inner ring 138 to allow the keeper ring 157 to be blocked between the serrations 142, 144 in order to provide more reliable sealing. Incidentally, the keeper ring 157 is formed in the shape of a circle in cross section so as to expand radially by itself when acted upon axially by forces opposite to each other.

Referring to FIG. 26, there is fitted a seal 150 in between the outer ring 135 and the inner ring 138 of the wheel bearing 132. The inner diameter surface of the seal 150 is so arranged as to sit across the outer diameter portions of the inner ring 138 and the stem portion 143. The outer diameter portions of the inner ring 138 and the stem portion 143 are naturally desired to be coplanar with each other. The seal 150 is located on the joints between the inner ring 138 and the stem portion 143 in order to prevent dust particles from entering the constant velocity universal joint 131 through the joints. That is, the seal 150 serves as a seal for the wheel bearing 132 as well as for the constant velocity universal joint 131. Incidentally, the bore 151 in the inner ring 138 is blocked by the cap 160 or the like to prevent the entry of dust particles or the like.

Figure 27:
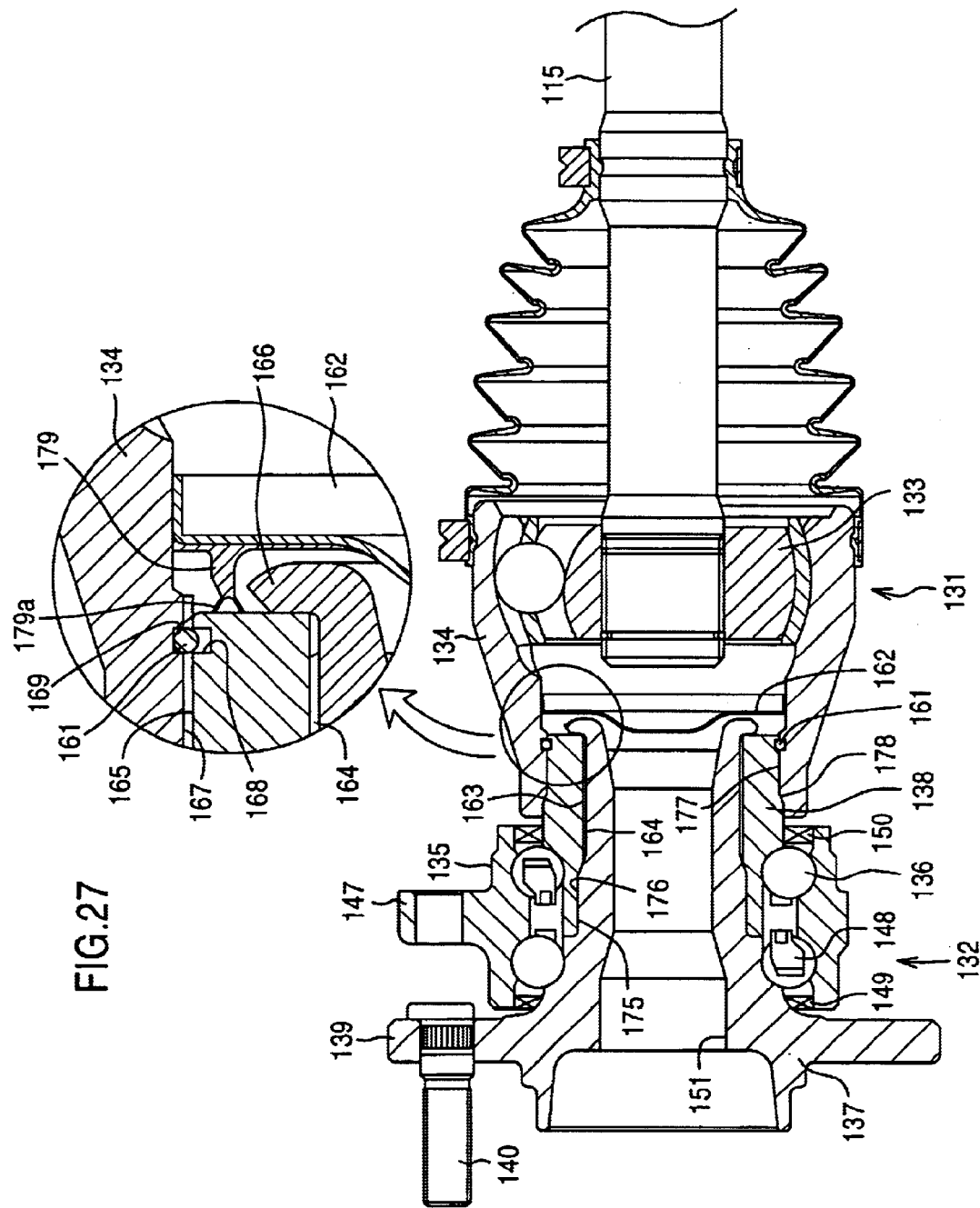

According to an embodiment illustrated in FIG. 27, there are provided serrations 163 on the outer diameter portion (on the reduced diameter side) inboard of the hub ring 137 as well as serrations 164, 165 on the inner and outer diameter portion of the inner ring 138, respectively. The serrations 164 on the inner diameter portion of the inner ring 138 engage the serrations 163 on the outer diameter portion (on the reduced diameter side) inboard of the hub ring 137. Moreover, the cylindrical portion extended from the serrations 163 (on the reduced diameter side) inboard of the hub ring 137 to the edge portion inboard thereof is plastically deformed radially outwards or toward the inner ring 138 to form a caulked portion 166, thus allowing the inner ring 138 to be fixed in place by the caulked portion 166.

On the other hand, serrations 167 formed on the inner diameter portion of the edge portion outboard of the outer joint ring 134 of the constant velocity universal joint 131 engage the serrations 165 on the outer diameter portion of the inner ring 138. Moreover, a keeper ring 161, which is formed in the shape of a circle in cross section and mounted in an annular groove 168 on the edge portion inboard of the serrations 165 on the inner ring 138, is elastically expanded radially toward an annular groove 169 provided in the serrations 167 on the inner diameter portion of the edge portion outboard of the outer joint ring 134 of the constant velocity universal joint 131, thereby preventing the inner ring 138 and the outer joint ring 134 of the constant velocity universal joint 131 from being dislodged axially from each other. The keeper ring 161 is adapted to be acted upon by a specified axial tensile force to allow the keeper ring 161 to be compressed radially by itself, thereby making it possible to withdraw the wheel bearing 132 from the constant velocity universal joint 131.

Incidentally, to align the inner ring 138 with the hub ring 137, the inner diameter portion of the edge portion outboard of the inner ring 138 is formed into an inner diameter cylindrical portion 175 by grinding, which is press fitted over an outer diameter cylindrical portion 176 which is also formed by grinding on the intermediate outer diameter portion of the hub ring 137.

Furthermore, when the serrations 167 on the outer joint ring 134 of the constant velocity universal joint 131 engage the serrations 165 on the outer diameter portion of the inner ring 138, an inner diameter cylindrical portion 177 provided by grinding on the inner diameter portion of the edge portion outboard of the outer joint ring 134 of the constant velocity universal joint 131 is guided by and then fitted over an outer diameter cylindrical portion 178 provided by grinding on the outer diameter portion of the edge portion inboard of the inner ring 138.

A seal plate 162 is press fitted into the outer joint ring 134 of the constant velocity universal joint 131 to prevent the grease filled therein from escaping in an outboard direction. In addition, a seal 179 is deposited on the seal plate 162 to prevent mud water or the like from entering the caulked portion 166 for covering the edge surface of the inner ring 138 or to prevent a decrease in strength due to rust caused thereby. The seal 179 allows a seal lip 179a thereof to come into contact with the edge surface inboard of the inner ring 138 when the constant velocity universal joint 131 is coupled to the wheel bearing 132.

Furthermore, to prevent mud water or the like from entering the coupling portion between the serrations 165 and 167 on the outer diameter portions of the constant velocity universal joint 131 and the inner ring 138, such a structure may be employed, although not illustrated, in which the seal provided on the knuckle abuts the outer diameter portion of the edge portion outboard of the outer joint ring 134 of the constant velocity universal joint 131. Alternatively, such a structure may be employed in which a seal is press fitted over the outer diameter portion of the edge portion inboard of the outer ring 135 of the wheel bearing 132, and the seal is brought into contact with the outer diameter portion of the edge portion outboard of the outer joint ring 134 of the constant velocity universal joint 131. Alternatively, a dust cover may be press fitted over the outer diameter portion of the edge portion outboard of the outer joint ring 134 of the constant velocity universal joint 131, and the clearance between the outer diameter portion of the dust cover and the inner diameter portion of the knuckle is made small to form what is called a labyrinth structure in order to prevent the entry of mud water or the like therein. In addition, to prevent the entry of mud water from the outboard side of the hub ring 137, a seal plate, not illustrated, may be fitted into the inner diameter portion of the bore 151.

Figure 28:
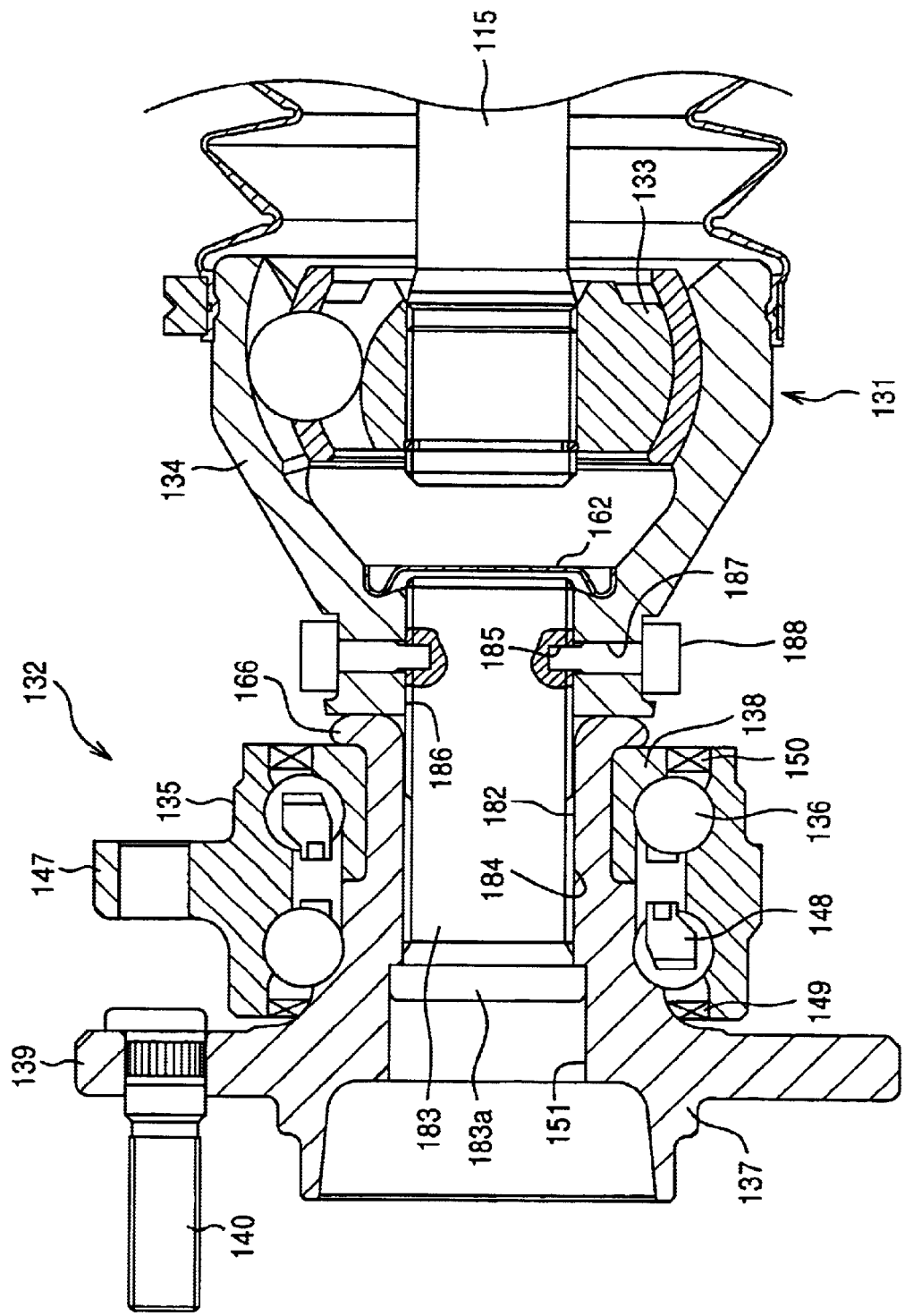

According to an embodiment illustrated in FIG. 28, there are provided torque transmission serrations 182 on the inner diameter portion of the hub ring 137. In addition, the edge portion of the reduced diameter portion inboard of the hub ring 137 is plastically deformed radially outwards to form the caulked portion 166 which in turn exerts a given pressure on the inner ring 138 in its outboard direction to fix it in place. The serrations 182 are provided only around the center of the inner diameter portion of the hub ring 137, and serrations 154 formed on the outer diameter portion of a torque transmission coupling shaft 183 are press fitted into the serrations 182 of the hub ring 137.

There is formed a collar portion 183a on the head of the torque transmission coupling shaft 183, and a circumferential groove 185 is formed inboard of the serrations 184. On the other hand, there are formed serrations 186 on the inner diameter portion of the edge portion outboard of the outer joint ring 134 of the constant velocity universal joint 131, and the serrations 186 are fitted over the serrations 184 of the torque transmission coupling shaft 183. Bolts 188 are inserted into tapped through-holes 187 which are provided radially by spot facing or the like and which are arranged circumferentially opposite to one another by 180 degrees on parallel surfaces provided by milling or the like on the outer joint ring 134. The end portions of the bolts 188 are detachably engaged with said circumferential groove 185 so as to prevent axial withdrawal of the torque transmission coupling shaft 183 from the outer joint ring 134. Incidentally, if the through-holes 187 are not tapped, press-in pins can be inserted therein instead of the bolts 188.

The seal plate 162 is arranged near the edge portion inboard of the torque transmission coupling shaft 183. The seal plate 162 is fitted into the inner diameter portion of the outer joint ring 134 to prevent the leakage of the grease filled in the outer joint ring 134 of the constant velocity universal joint 131.

Furthermore, to prevent mud water from entering the serrations 184 of the torque transmission coupling shaft 183 through the joints between the outer joint ring 134 of the constant velocity universal joint 131 and the caulked portion 166 of the hub ring 137, an annular rubber seal may be mounted to the caulked portion 166 to seal the joints between the caulked portion 166 and the outer joint ring 134 of the constant velocity universal joint 131.

Figure 29:
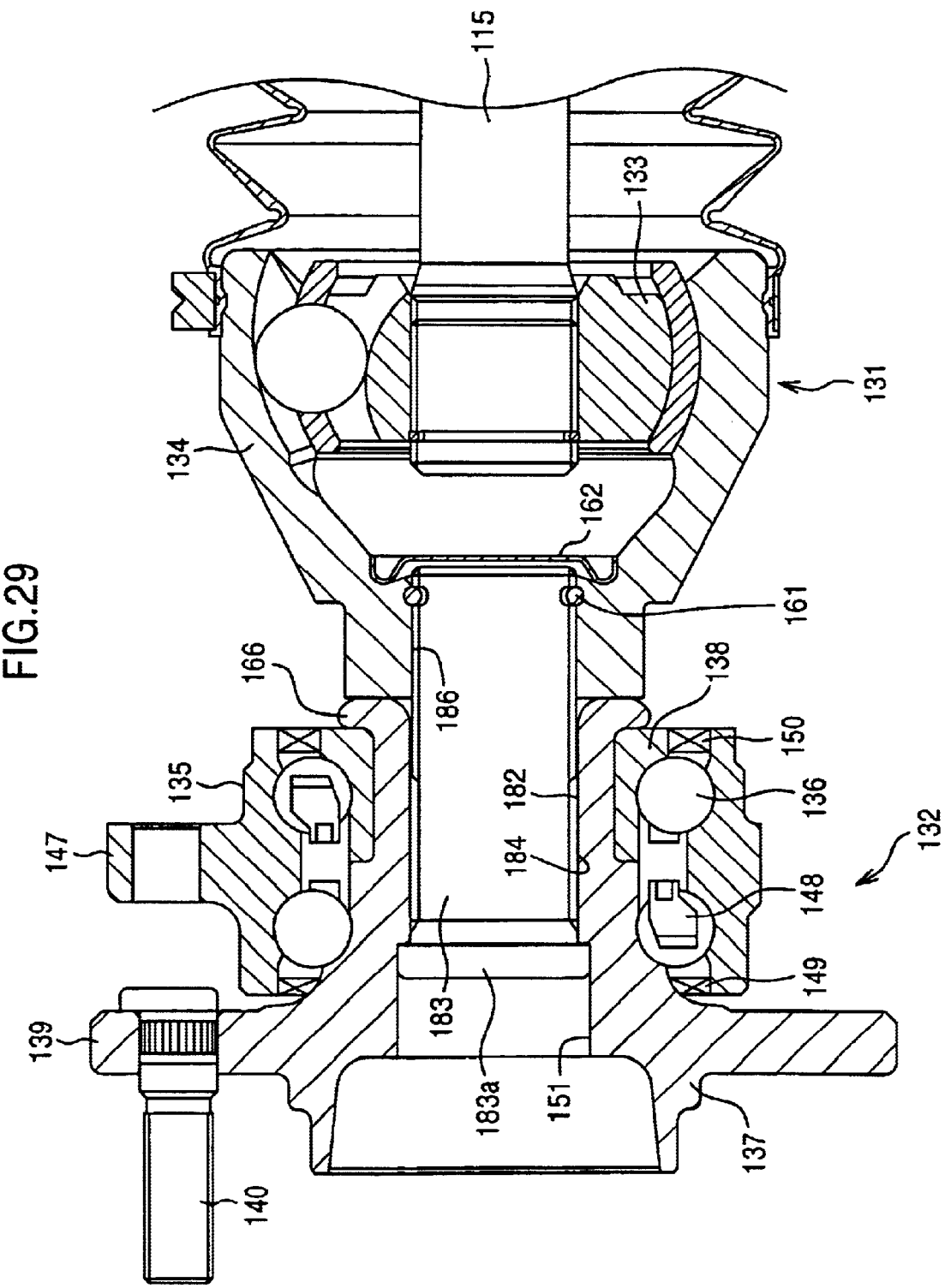

According to an embodiment illustrated in FIG. 29, the bolts 188 of FIG. 28 are replaced by the keeper ring 161, formed in the shape of a circle in cross section, to axially couple the outer joint ring 134 of the constant velocity universal joint 131 to the torque transmission coupling shaft 183 in the same manner as in the embodiment of FIG. 27. Other components are arranged in the same way as in FIG. 28. The keeper ring 161 is formed in the shape of a circle in cross section and adapted to contract radially by itself when acted upon by a specified axial tensile force, to allow withdrawal of the wheel bearing 132 from the constant velocity universal joint 131.

Figure 30:
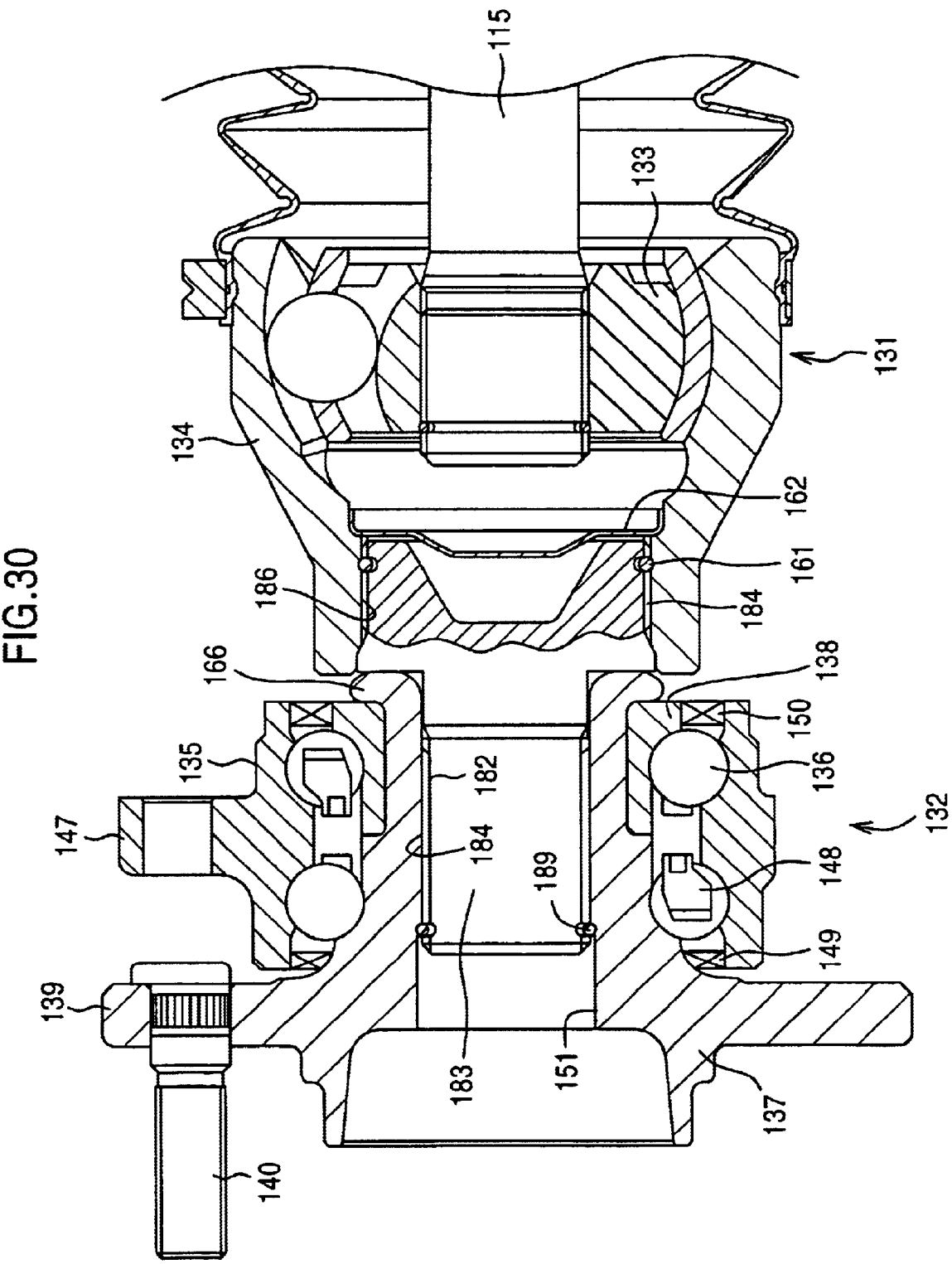

According to an embodiment illustrated in FIG. 30, the outer joint ring 134 of the constant velocity universal joint 131 is coupled axially to the torque transmission coupling shaft 183 by the keeper ring 161 as in FIG. 27. Furthermore, in place of the collar portion 183a provided on the head portion of the torque transmission coupling shaft 183 as in FIGS. 28 and 29, a keeper ring 189 is employed to prevent axial withdrawal of the hub ring 137 from the torque transmission coupling shaft 183. Other components are arranged in the same way as in FIG. 28. The keeper ring 189 is adapted to contract radially by itself when acted upon by a specified axial tensile force, to allow withdrawal of the wheel bearing 132 from the torque transmission coupling shaft 183.

Figure 31:
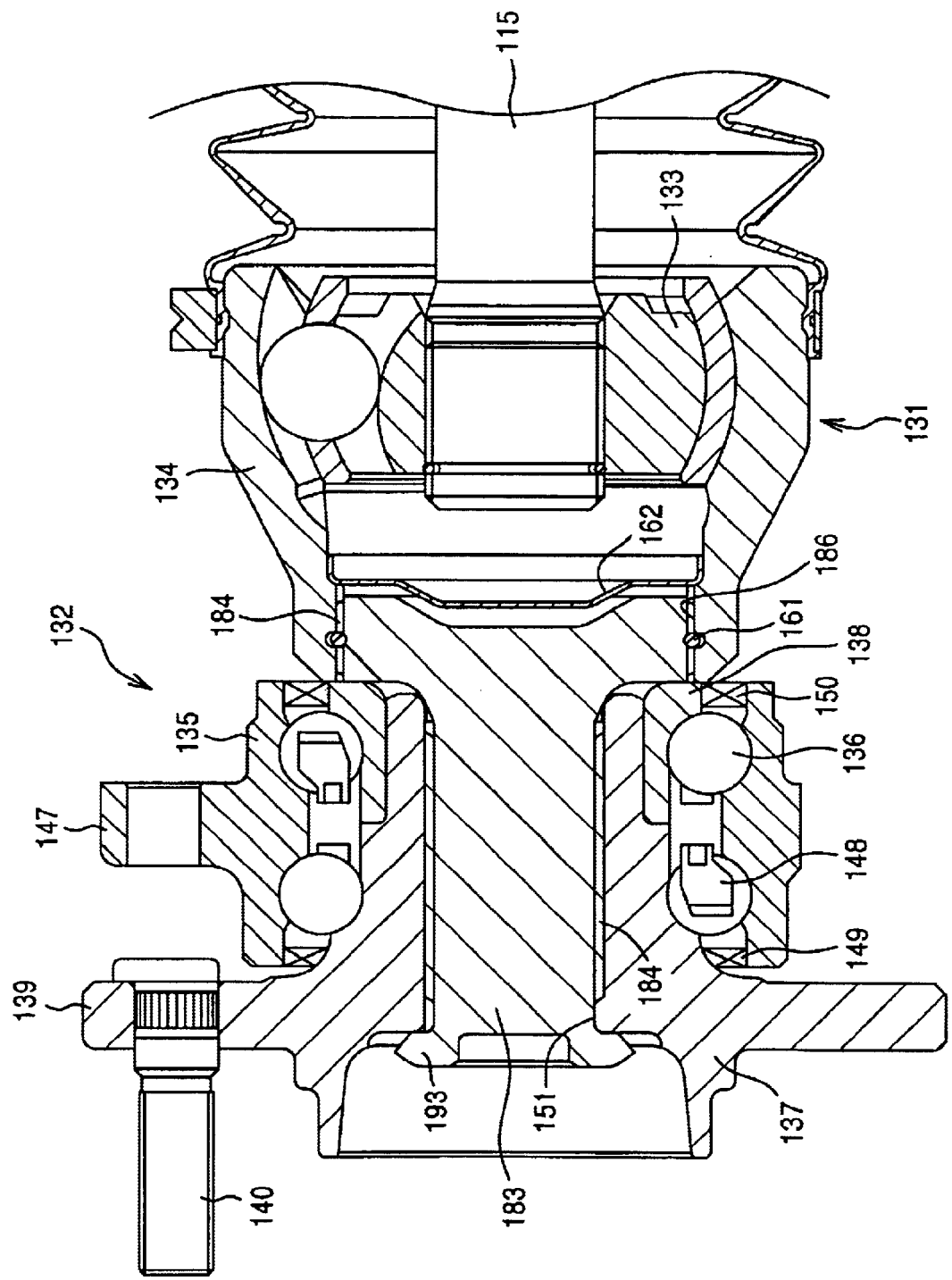

An embodiment illustrated in FIG. 31 is different in particular from those of FIGS. 28 to 30 in that a short cylindrical portion formed on the edge portion outboard of the torque transmission coupling shaft 183 is plastically deformed into a caulked portion 193, the caulked portion 193 being caulked to the opening rim of the bore 151 of the hub ring 137. Moreover, the outer diameter of the torque transmission coupling shaft 183 engaged with the serrations 186 on the outer joint ring 134 of the constant velocity universal joint 131 is made larger than the inner diameter of the inner ring 138 of the wheel bearing 132, so that the axial force caused by the caulked portion 193 is adapted to act upon the side surface of the inner ring 138 via the torque transmission coupling shaft 183. Accordingly, unlike those embodiments of FIGS. 28 to 30, this obviates the necessity for the edge portion inboard of the hub ring 137 to be expanded radially outwards to be formed into the caulked portion 166 and thus makes it possible to shorten the axial distance between the wheel bearing 132 and the constant velocity universal joint 131 by the amount of the thickness of the caulked portion 166. Other components are arranged generally in the same way as in FIGS. 28 to 30. Incidentally, the edge portion outboard of the outer joint ring 134 of the constant velocity universal joint 131 is preferably brought into contact with both sides of the seal 150 and the inner ring 138 in order to prevent the entry or mud water or the like through the wheel bearing 132 and the constant velocity universal joint 131.

Figure 32:
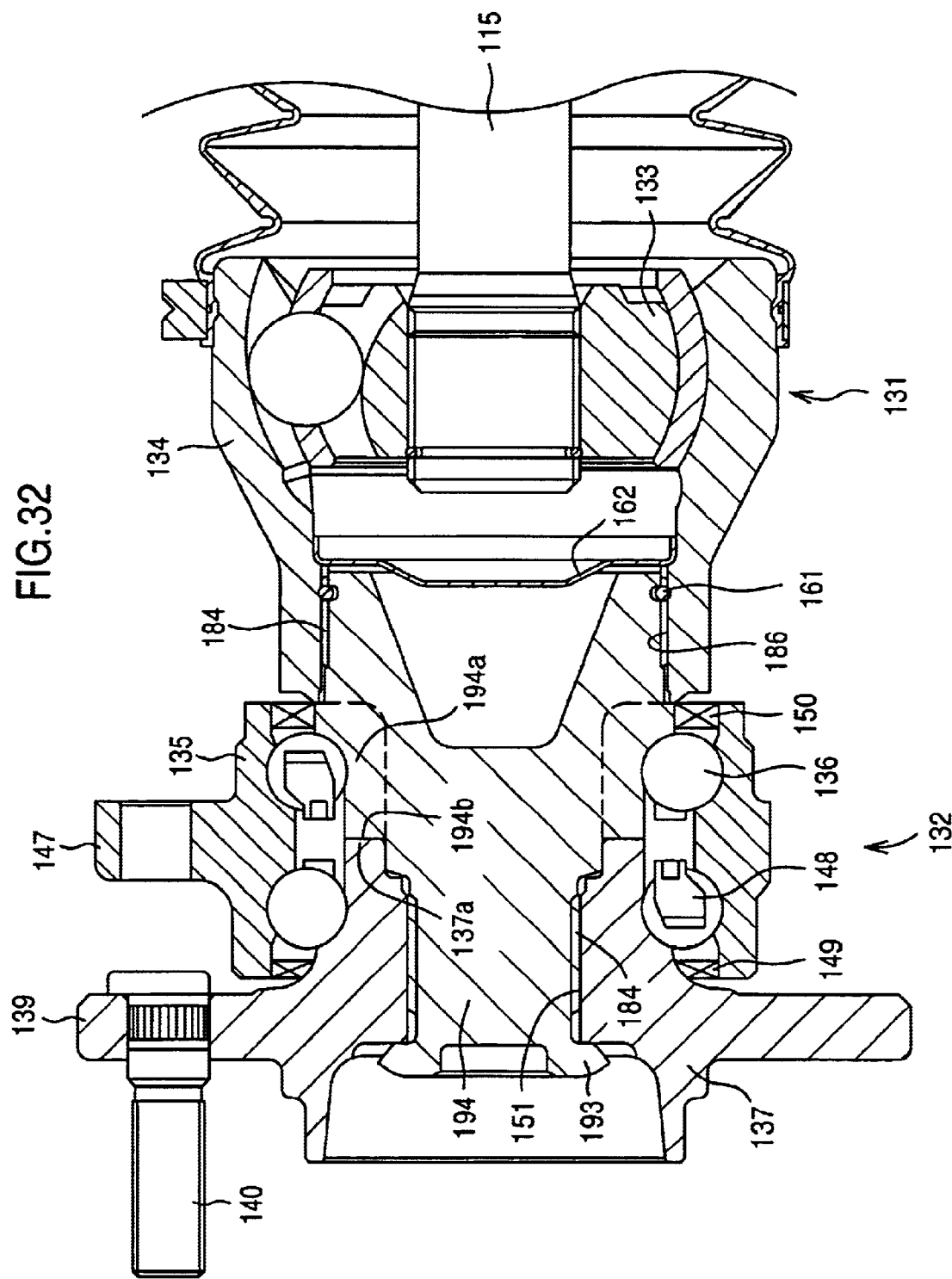

An embodiment illustrated in FIG. 32 is different in particular from that of FIG. 31 in that an inner ring 194a of the wheel bearing 132 is integrated with a torque transmission coupling shaft 194. In other words, the torque transmission coupling shaft 194 also serves as the inner ring 194a. Thus, the reduction of the inner ring 194a in number of parts allows a reduction in assembling manpower. This also makes it possible to form a larger space within the outer ring 135 when compared with the case where the caulked portion 166 is provided therein, thereby providing an improved cooling effect. In addition, a reduced diameter portion 137a of the hub ring 137 is adapted to abut a reduced diameter portion 194b of the torque transmission coupling shaft 194, and the reduced diameter portion outboard of the torque transmission coupling shaft 194 is plastically deformed radially outwards into a caulked portion 193 to secure the hub ring 137 and the torque transmission coupling shaft 194 to each other, whereby the assembly can be completed with the preload of the rollers of the wheel bearing 132 being set to a specified value (a self-retaining function). Other components are arranged in the same way as in FIG. 31.

Figure 33:
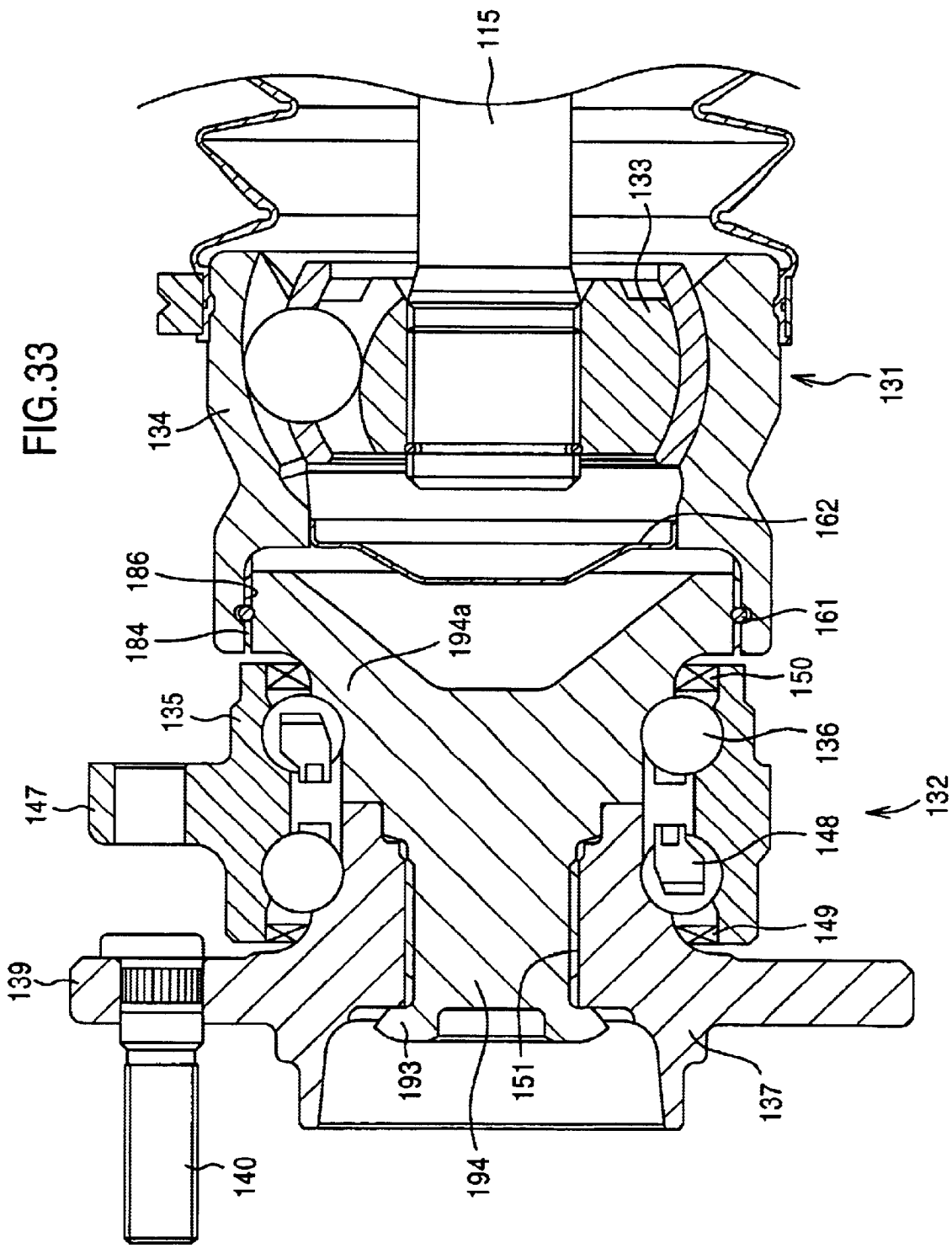

According to an embodiment illustrated in FIG. 33, like that of FIG. 32, the torque transmission coupling shaft 194 serves also as the inner ring 194a and provides a given preload to the rollers 136 by means of the caulked portion 193 of the reduced diameter portion outboard of the torque transmission coupling shaft 194 (the self-retaining function). This embodiment provides a larger outer diameter to the edge portion inboard of the torque transmission coupling shaft 194 than that of FIG. 32. This enlarged diameter portion covers the seal 150 to reduce the possibility of damage to the seal 150 due to the collision of foreign matter therewith. In addition, an increase in number of the teeth of the serrations and an increase in moment, resulted from the enlargement in diameter, makes it possible to shorten the axial length of the serrations 184 and thus to shorten the distance between the wheel bearing 132 and the constant velocity universal joint 131, thereby providing a reduction in weight and size of the assembly. Furthermore, this embodiment is different from that of FIG. 32 in that the side slip of the seal 150 inboard of the wheel bearing 132 is allowed to slide along an inclined or a perpendicular surface near the foot of the enlarged diameter portion inboard of the torque transmission coupling shaft 194, thus the sliding portion being provided with a slinger function.

Figure 34:
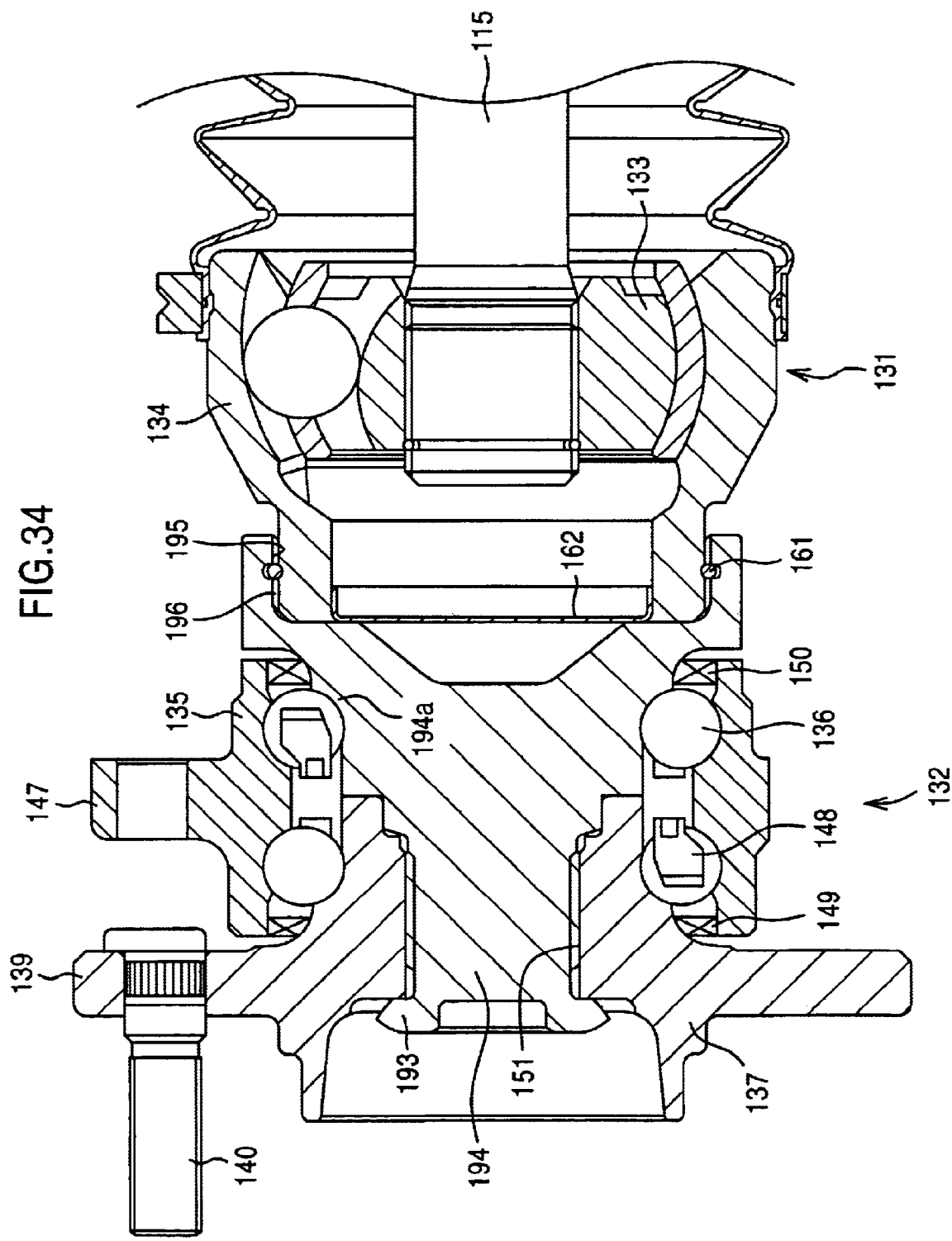

An embodiment illustrated in FIG. 34 is different from that of FIG. 33 in that the torque transmission coupling shaft 194 is engaged inside out with the serrations of the outer joint ring 134. That is, in the embodiment of FIG. 34, the outer diameter of the edge portion inboard of the torque transmission coupling shaft 194 is made larger than the outer diameter of the edge portion outboard of the outer joint ring 134. In addition, serrations 195 are formed on the inner diameter portion of the inboard edge portion, while serrations 196 are formed on the outer diameter portion of the edge portion outboard of the outer joint ring 134. Other points including the covering of the seal 150 for the protection thereof and the shortening of the distance between the wheel bearing 132 and the constant velocity universal joint 131 are the same as those of FIG. 33.

Figure 35:
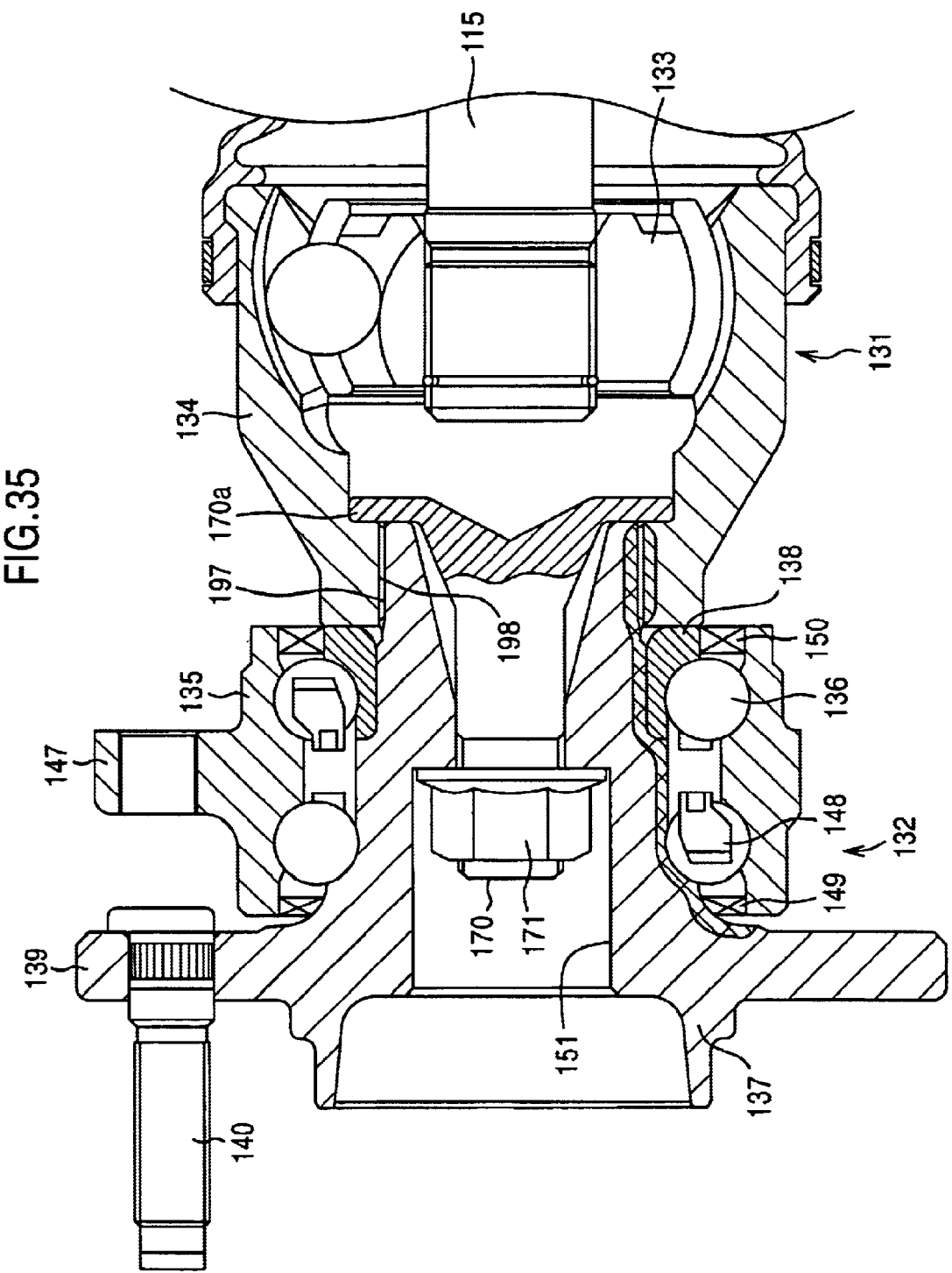

According to an embodiment illustrated in FIG. 35, a countersunk head nut 171 is tightly threaded from the outboard side of the bore 151 of the hub ring 137 onto a coupling bolt 170 inserted into the bore 151 of the hub ring 137 from the side of outer joint ring 134 of the constant velocity universal joint 131 to allow the edge portion outboard of the outer joint ring 134 of the constant velocity universal joint 131 to abut the edge surface of the inner ring 138 of the wheel bearing 132 at a given pressure, thereby providing a given preload to the rollers 136 (the self-retaining function). There is formed a flange portion 170a on the proximal portion of the coupling bolt 170. The flange portion 170a will abut and push against only the inner diameter shoulder portion of the outer joint ring 134 at the beginning of fastening the countersunk head nut 171. However, at the time of completion of the fastening, the flange portion 170a will abut both the inner diameter shoulder portion of the outer joint ring 134 and the edge portion inboard of the hub ring 137, under the condition of which the preload of the rollers 136 becomes constant since the countersunk head nut 171 is fastened most tightly.

Furthermore, the hub ring 137 is considerably extended in its inboard direction to allow serrations 197 formed on the outer diameter surface of the extended portion and serrations 198 formed on the inner diameter surface of the outer joint ring 134 of the constant velocity universal joint 131 to engage each other, thereby allowing torque transmission.

Incidentally, heat treatment can be performed on the region leading from the vicinity of the engagement surface of a seal 149 immediately near the race outboard of the hub ring 137 to the serrations 197 and on the region of the serrations 198 of the outer joint ring 134 of the constant velocity universal joint 131, thereby providing improved torque transmission and durability. The heat treatment is also performed on the inner ring 138.

Figure 36A:
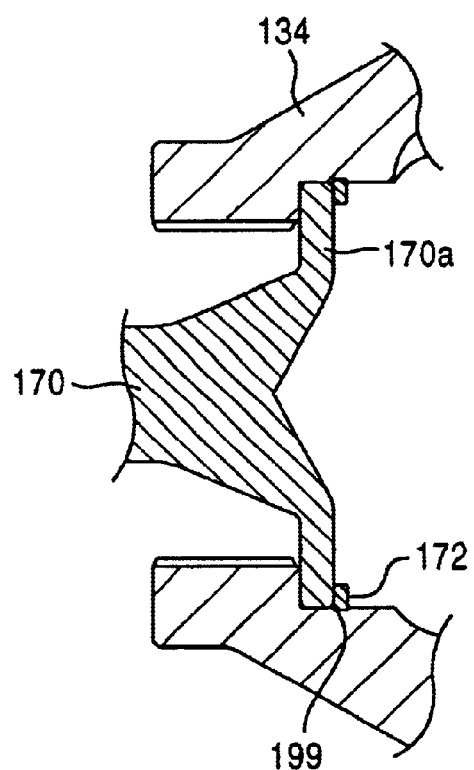
FIGS. 36(A) and 36(B) are partially cross-sectional views illustrating modified examples of the embodiment of FIG. 33, where
Figure 36B:
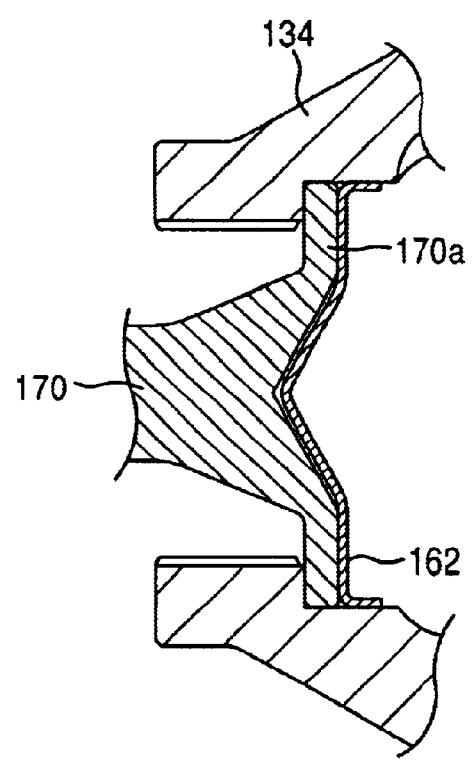

FIGS. 36(A) and (B) illustrate a structure in which the coupling bolt 170 inserted into the outer joint ring 134 of the constant velocity universal joint 131 is secured to the outer joint ring 134 to facilitate the insertion of the coupling bolt 170 into the wheel bearing 132. That is, FIG. 36(A) illustrates the outer circumferential rim portion inboard of the flange portion 170*a* which a snap ring 172 engages, while FIG. 36(B) illustrates the disc-shaped seal plate 162 which is fit to and pressed against the whole surface inboard of the flange portion 170*a*. The outer circumferential rim portion of the snap ring 172 engages a groove portion 199 on the inner diameter surface of the outer joint ring 134, while the outer circumferential rim portion of the seal plate 162*t* formed in the shape of a letter L in cross section, is engaged with the inner diameter surface of the outer joint ring 134 with the bent edge portion of the outer circumferential rim being oriented inboard to prevent withdrawal of the seal plate 162.

Figure 37:
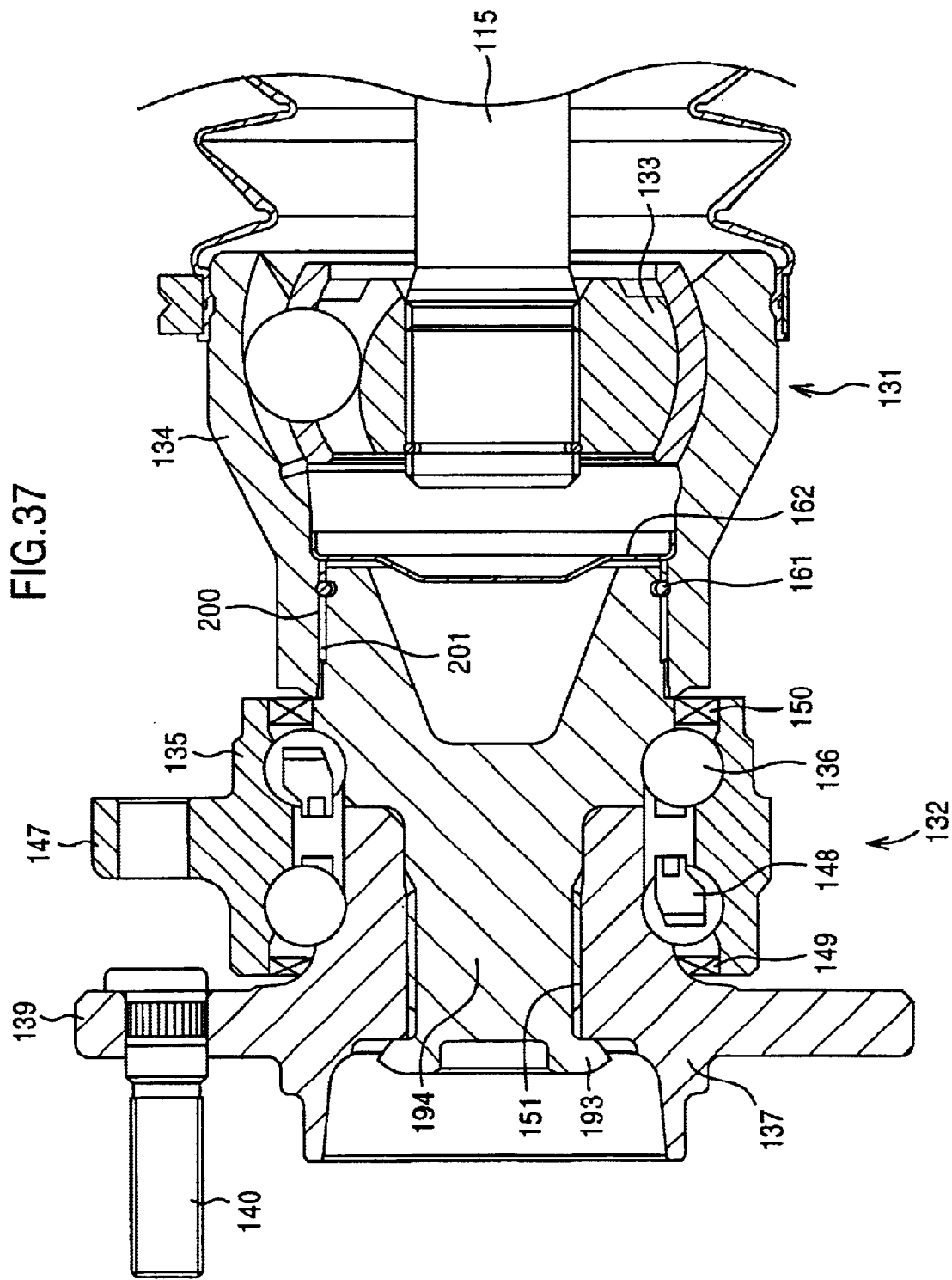
FIGS. 37 to 39 are cross-sectional views illustrating drive wheel bearing assemblies according to other embodiments of the present invention.

According to an embodiment illustrated in FIG. 37, like those of FIGS. 32 to 34, the inner ring 138 of the wheel bearing 132 is integrated with the torque transmission coupling shaft 194, and the caulked portion 193 on the edge portion outboard of the torque transmission coupling shaft 194 is allowed to provide a given preload to the rollers 136 (the self-retaining function). Although the embodiment is similar in structure to that of FIG. 32, the assembly according to this embodiment has the outer diameter shoulders of the torque transmission coupling shaft 194, which are less in number by one than that of FIG. 32. The outer diameter of the edge portion outboard of the torque transmission coupling shaft 194 is not enlarged in particular but is extended in its inboard direction with the outer diameter thereof being kept substantially the same in diameter as the outer diameter surface which the seal 150 engages. There are formed relatively long serrations 200 on the outer diameter surface of the torque transmission coupling shaft 194, and the serrations 200 are allowed to engage serrations 201 provided on the inner diameter portion of the outer joint ring 134 of the constant velocity universal joint 131. The keeper ring 161 is interposed between the serrations 200, 201 to prevent the axial relative movement of both serrations 200, 201. The keeper ring 161 is adapted to be acted upon by a specified axial tensile force to contract radially by itself, thereby making it possible to withdraw the wheel bearing 132 from the constant velocity universal joint 131. The edge portion outboard of the outer joint ring 134, with part thereof being in contact with the shoulder portion of the torque transmission coupling shaft 194, abuts a side surface of the seal 150 to prevent the entry of mud water or the like through the serrations 200, 201.

Figure 38:
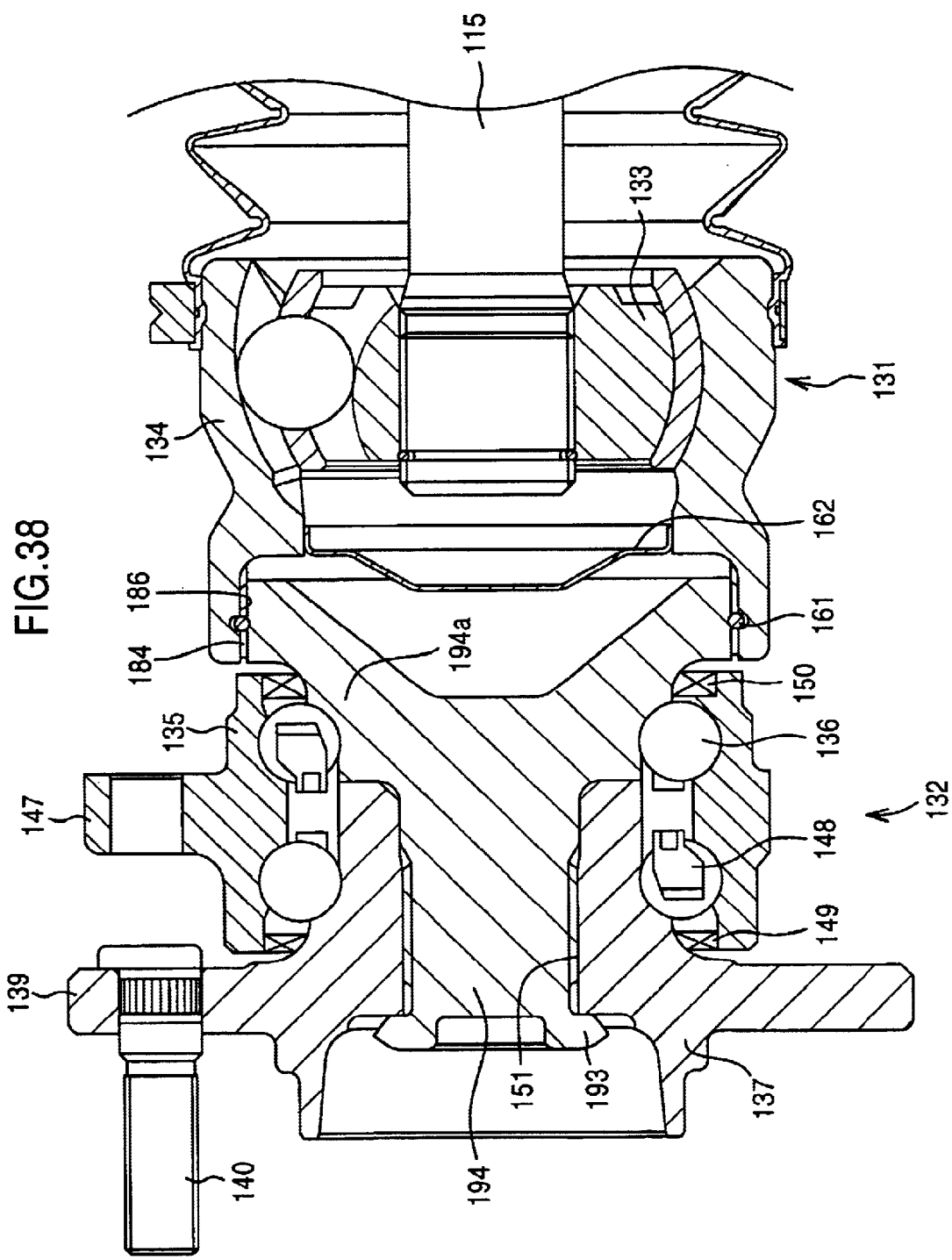

According to an embodiment illustrated in FIG. 38, like those of FIGS. 32 to 34, the inner ring 194*a* of the wheel bearing 132 is integrated with the torque transmission coupling shaft 194. The embodiment has a similar structure as that of FIG. 33 and is the same as that of FIG. 33 except that the torque transmission coupling shaft 194 is provided with the outer diameter shoulder portions less in number by one than that of FIG. 33.

Figure 39:
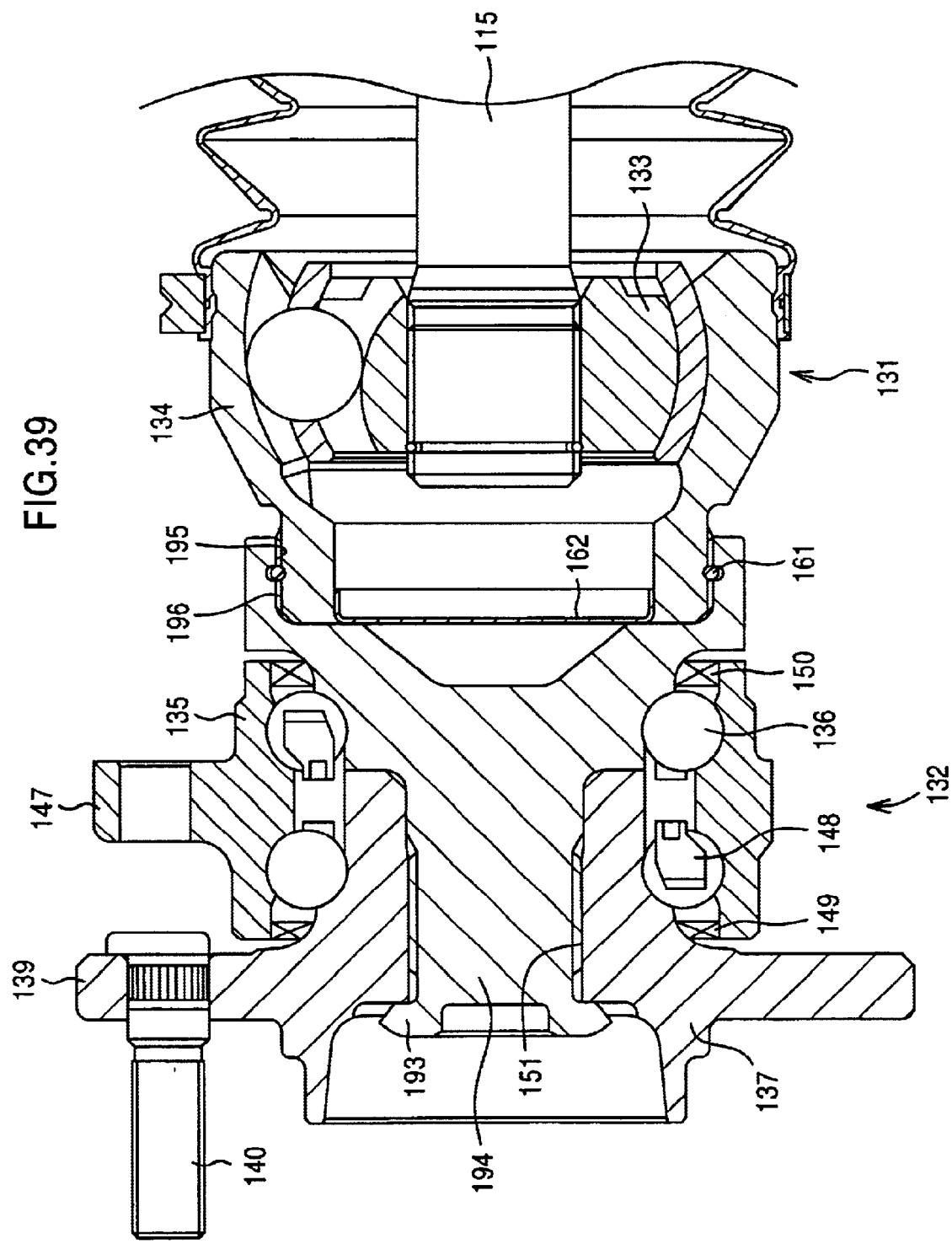

According to an embodiment illustrated in FIG. 39, like those of FIGS. 32 to 34, the inner ring 138 of the wheel bearing 132 is integrated with the torque transmission coupling shaft 194. The embodiment has a similar structure as that of FIG. 34 and is the same as that of FIG. 34 except that the torque transmission coupling shaft is provided with the outer diameter shoulder portions less in number by one than that of FIG. 34.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A drive wheel bearing assembly having a fixed type constant velocity universal joint, coupled to a wheel bearing, mounted to one end portion of an intermediate shaft, and a sliding type constant velocity universal joint, coupled to a differential, mounted to the other end portion of said intermediate shaft, wherein an allowable plunging down to a bottom portion of an outer joint ring of said sliding type constant velocity universal joint is set substantially equal to a sum of a width of an inner joint ring of said fixed type constant velocity universal joint and a length of a projection of the intermediate shaft beyond an edge surface of said inner joint ring, at a minimum operative angle of the sliding type constant velocity universal joint.

2. A drive wheel bearing assembly according to claim 1, wherein a stem portion of an outer joint ring of said fixed type constant velocity universal joint is made hollow, and the hollow portion is allowed to communicate with a house portion of the outer joint ring.

3. A drive wheel bearing assembly according to claim 1, wherein said wheel bearing is plastically connected to an outer joint ring of said fixed type constant velocity universal joint.

4. A drive wheel bearing assembly according to claim 1, wherein a seal boot is mounted on said a stub shaft or on the an outer diameter portion of the other end portion of said intermediate shaft.

5. A drive wheel bearing assembly according to claim 4, wherein said seal boot is formed of resin.

6. A drive wheel bearing assembly according to claim 1, wherein one of a plurality of rows of races in said wheel bearing is formed on an outer diameter portion of a hub ring constituting the wheel bearing, and another race is formed on an outer diameter portion of a separate inner ring engaging an outer joint ring of said fixed type constant velocity universal joint.

7. A drive wheel bearing assembly according to claim 6, wherein opposite edges of the hub ring and the separate inner ring, having said another race formed on the outer diameter portion thereof and engaging the outer joint ring of the fixed type constant velocity universal joint, are brought into contact with each other, and a coupler collar is mounted to the abutting edge portions of said hub ring and the inner ring.

8. A drive wheel bearing assembly according to claim 1, wherein at least one of a plurality of rows of races of said wheel bearing is formed integrally on an outer diameter portion of an outer joint ring of said fixed type constant velocity universal joint.

9. A drive wheel bearing assembly according to claim 1, wherein one of a plurality of rows of races in said wheel bearing is formed on an outer diameter portion of a hub ring constituting the wheel bearing, and another race is formed on an outer diameter portion of a separate inner ring abutting said hub ring.

10. A drive wheel bearing assembly according to claim 9, wherein projections and depressions are formed on one of or both of engagement surfaces of said hub ring and said inner ring; said engagement surfaces are expanded or compressed radially to thereby connect plastically said hub ring and said inner ring to each other; serrations formed on said hub ring or said inner ring are allowed to transmit torque; and a keeper ring detachably engages an annular groove formed on said hub ring or said inner ring, allowing said keeper ring to be axially engageable therewith.

11. A drive wheel bearing assembly according to claim 10, wherein said keeper ring is made circular in cross section and is acted upon by a specified axial force, thereby allowing said keeper ring to contract radially by itself to be withdrawn.

12. A drive wheel bearing assembly according to claim 10 or 11, wherein an outer diameter surface of said hub ring and an inner diameter surface of said fixed type constant velocity universal joint, extended from the engagement surfaces between said hub ring and said inner ring are connected engageably by serrations to each other.

13. A drive wheel bearing assembly according to claim 10 or 11, wherein an outer diameter surface of said inner ring and an inner diameter surface of said fixed type constant velocity universal joint are connected engageably by serrations to each other.

14. A drive wheel bearing assembly according to any one of claims 10 to 11, wherein a serration engagement region is formed on engagement surfaces except for the plastically connected region between said hub ring and said inner ring.

15. The drive wheel bearing assembly according to claim 10 or 11, wherein an inner diameter surface of said inner ring and an outer diameter surface of said fixed type constant velocity universal joint are connected engageably by serrations to each other.

16. A drive wheel bearing assembly according to claim 9, wherein the inner diameter surface of said hub ring and an outer diameter surface outboard of a torque transmission coupling shaft are connected engageably by serrations to each other; an outer diameter surface inboard of the torque transmission coupling shaft and an inner diameter surface of an edge portion outboard of said outer joint ring are connected engageably by serrations to each other; a reduced diameter edge portion inboard of said hub ring is plastically deformed radially outwards by caulking to be fixedly pressed against said inner ring in its outboard direction; and an edge portion of the torque transmission coupling shaft inserted from an outboard direction into the inner diameter portion of said hub ring and the outer joint ring are axially coupled to each other by detachable coupling means.

17. A drive wheel bearing assembly according to claim 16, wherein a collar portion seated on a rim portion of a bore of the hub ring is provided on the edge portion outboard of said torque transmission coupling shaft, and pins or bolts are inserted radially detachably into the edge portion outboard of said outer joint ring so as to at least axially engage said torque transmission coupling shaft.

18. A drive wheel bearing assembly according to claim 16, wherein the collar portion seated on the rim portion of the bore of the hub ring is provided on the edge portion outboard of said torque transmission coupling shaft; annular grooves are formed on serrations between the edge portion outboard of said outer joint ring and said torque transmission coupling shaft; and a keeper ring is mounted detachably into said annular grooves.

19. A drive wheel bearing assembly according to claim 16, wherein annular grooves are formed on serrations between said torque transmission coupling shaft, and said hub ring and outer joint ring, and a keeper ring is mounted detachably into said annular grooves.

20. A drive wheel bearing assembly according to claim 9, wherein the inner diameter surface of said hub ring and the outer diameter surface outboard of the torque transmission coupling shaft are connected engageably by serrations to each other; the outer diameter surface inboard of the torque transmission coupling shaft and the inner diameter surface of an edge portion outboard of said outer joint ring are connected engageably by serrations to each other; the outer diameter of the torque transmission coupling shaft engaging the serrations of said outer joint ring is made larger at least than said inner ring; the edge portion outboard of said torque transmission coupling shaft is plastically deformed radially outwards by caulking to be fixedly pressed against said inner ring in its outboard direction; and the edge portion of the torque transmission coupling shaft inserted from an outboard direction into the inner diameter portion of said hub ring and the outer joint ring are axially coupled to each other by detachable coupling means.

21. A drive wheel bearing assembly according to claim 9, comprising a torque transmission coupling shaft for also serving as the inner ring allowed to engage said hub ring, wherein the inner diameter surface of said hub ring and the outer diameter surface outboard of the torque transmission coupling shaft are connected engageably by serrations to each other; the outer diameter surface inboard of the torque transmission coupling shaft and the inner diameter surface of an edge portion outboard of said outer joint ring are connected engageably by serrations to each other; and the edge portion outboard of said torque transmission coupling shaft is plastically deformed radially outwards by caulking to be fixedly pressed against said torque transmission coupling shaft in its outboard direction; and said torque transmission coupling shaft and the outer joint ring are thereby axially coupled to each other by detachable coupling means.

22. A drive wheel bearing assembly according to claim 20 or 21, wherein annular grooves are formed on serrations between said torque transmission coupling shaft and said outer joint ring, and a keeper ring is mounted detachably into said annular grooves.

23. A drive wheel bearing assembly according to claim 21, wherein annular grooves are formed on serrations between said torque transmission coupling shaft and said outer joint ring, and a keeper ring is mounted detachably into said annular grooves.

24. A drive wheel bearing assembly according to claim 9, wherein the inner diameter surface of said hub ring and the outer diameter surface outboard of the torque transmission coupling shaft, also serving as the inner ring, are connected engageably by serrations to each other; the inner diameter surface inboard of the torque transmission coupling shaft and the outer diameter surface of an edge portion outboard of the outer joint ring are connected engageably by serrations to each other; the edge portion outboard of said torque transmission coupling shaft is plastically deformed radially outwards by caulking to be fixedly pressed against said torque transmission coupling shaft in its outboard direction; and said torque transmission coupling shaft and the outer joint ring are axially coupled to each other by detachable coupling means.

25. A drive wheel bearing assembly according to claim 9, wherein the edge portion inboard of said hub ring is extended to the inner diameter surface of the outer joint ring of said constant velocity universal joint; an outer diameter surface of the extended portion and the inner diameter surface of said outer joint ring are connected engageably by serrations to each other; and said hub ring and said outer joint ring are fastened axially by bolts and nuts, providing a given maximum fastening force, thereby pressing the edge surface outboard of said outer joint ring against an edge surface of the inner ring at a given pressure.

26. A drive wheel bearing assembly according to claim 25, wherein heat treatment is performed on a portion leading from seal engagement surfaces immediately near a race inboard of said hub ring to said serration-formed region, and on a serration-formed region of said outer joint ring.

27. A drive wheel bearing assembly according to claim 25 or 26, wherein said fastening bolt is press fitted into said outer joint ring.

28. A drive wheel bearing assembly according to claim 25 or 26, wherein said fastening bolt is fixedly clipped to said outer joint ring.

29. A drive wheel bearing assembly according to claim 25 or 26, wherein said fastening bolt is fixed to said outer joint ring by press fitting a seal plate therein.

30. A drive wheel bearing assembly having a fixed type constant velocity universal joint, coupled to a wheel bearing, mounted to one end portion of an intermediate shaft, and a sliding type constant velocity universal joint, coupled to a differential, mounted to the other end portion of said intermediate shaft, wherein an allowable plunging down to a bottom portion of an outer joint ring of said sliding type constant velocity universal joint is set to at least a width of an inner joint ring of said fixed type constant velocity universal joint at a minimum operative angle of the sliding type constant velocity universal joint, wherein a stem portion of an outer joint ring of said fixed type constant velocity universal joint is made hollow, and the hollow portion is allowed to communicate with a house portion of the outer joint ring, wherein an end cap is mounted to a communicating region between the hollow portion of said stem portion and said house portion, and a communicating portion is formed substantially at a center of the end cap.

* * * * *